(12) United States Patent
Kang et al.

(10) Patent No.: US 11,909,869 B2
(45) Date of Patent: Feb. 20, 2024

(54) COMMUNICATION METHOD AND RELATED PRODUCT BASED ON KEY AGREEMENT AND AUTHENTICATION

(71) Applicant: HUAWEI TECHNOLOGIES CO., LTD., Guangdong (CN)

(72) Inventors: Xin Kang, Singapore (SG); Haiguang Wang, Singapore (SG); Zhongding Lei, Singapore (SG); Bo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 17/304,587

(22) Filed: Jun. 23, 2021

(65) Prior Publication Data

US 2021/0320788 A1    Oct. 14, 2021

Related U.S. Application Data

(63) Continuation of application No. PCT/CN2018/125912, filed on Dec. 29, 2018.

(51) Int. Cl.
*H04L 9/08* (2006.01)
*H04L 9/32* (2006.01)

(52) U.S. Cl.
CPC .......... *H04L 9/0841* (2013.01); *H04L 9/0825* (2013.01); *H04L 9/0869* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 5,937,066 A | 8/1999 | Gennaro et al. | |
| 2012/0110661 A1* | 5/2012 | Tverskoy | G06F 21/445 |
| | | | 726/16 |

(Continued)

FOREIGN PATENT DOCUMENTS

| | | |
|---|---|---|
| CN | 102137397 A | 7/2011 |
| CN | 102724665 A | 10/2012 |

(Continued)

OTHER PUBLICATIONS

Gupta et al. "A Generic Construction for Efficient and Secure AKA Protocol in 5G Network," 2018 IEEE International Conference on Advanced Networks and Telecommunications Systems (ANTS), Indore, India, 2018, pp. 1-6, doi: 10.1109/ANTS.2018.8710157 ( Year: 2018).*

(Continued)

*Primary Examiner* — Bassam A Noaman
(74) *Attorney, Agent, or Firm* — Fish & Richardson P.C.

(57) ABSTRACT

Communication methods and apparatus are described. One communication method includes that user equipment (UE) sends an N1 message to a security anchor function (SEAF), where the N1 message carries a Diffie-Hellman (DH) public parameter or a DH public parameter index, the N1 message further carries an encrypted identifier of the UE, and the encrypted identifier is obtained by encrypting a permanent identifier of the UE and a first DH public key. The UE receives an authentication request that carries a random number and that is sent by the SEAF. The UE sends, to the SEAF, an authentication response used to respond to the authentication request, where the authentication response carries an authentication result calculated based on a root key and the random number.

5 Claims, 20 Drawing Sheets

(56) References Cited

U.S. PATENT DOCUMENTS

| | | | | |
|---|---|---|---|---|
| 2017/0006417 A1* | 1/2017 | Canoy | | H04B 7/18506 |
| 2020/0359203 A1* | 11/2020 | Aono | | H04W 8/12 |
| 2021/0297400 A1* | 9/2021 | Lehtovirta | | H04L 63/065 |

FOREIGN PATENT DOCUMENTS

| | | | | | |
|---|---|---|---|---|---|
| CN | 107579826 A | | 1/2018 | | |
| CN | 107809411 A | | 3/2018 | | |
| CN | 108880813 A | | 11/2018 | | |
| CN | 109041057 A | | 12/2018 | | |
| CN | 109104727 A | * | 12/2018 | | H04L 9/0816 |
| JP | 2018196056 A | | 12/2018 | | |
| WO | 2017008223 A1 | | 1/2017 | | |

OTHER PUBLICATIONS

Office Action issued in Chinese Application No. 201880100538.6 dated Jan. 4, 2022, 13 pages (with English translation).
3GPP TS 33.102 V15.1.0 (Dec. 2018), "3rd Generation Partnership Project; Technical Specification Group Services and System Aspects; 3G Security; Security architecture(Release 15)," Dec. 2018, 77 pages.
3GPP TS 33.401 V15.6.0 (Dec. 2018), "3rd Generation Partnership Project; Technical Specification Group Services and System Aspects; 3GPP System Architecture Evolution (SAE); Security architecture(Release 15)," Dec. 2018, 163 pages.
3GPP TS 33.501 V15.0.0 (Mar. 2018), "3rd Generation Partnership Project; Technical Specification Group Services and System Aspects; Security architecture and procedures for 5G system(Release 15)," 128 pages.
3GPP TS 33.501 V15.3.1 (Dec. 2018), "3rd Generation Partnership Project; Technical Specification Group Services and System Aspects; Security architecture and procedures for 5G system(Release 15)," Dec. 2018, 181 pages.
Chi et al., "Security analysis and improvement of LTE authentication and key agreement protocol," Modern Electronics Technique, vol. 37, No. 18, Sep. 2014, 4 pages.
GSMA Association, "RSP Technical Specification Version 2.0," Official Document SGP.22, Oct. 14, 2016, 229 pages.
PCT International Search Report and Written Opinion issued in International Application No. PCT/CN2018/125912 dated May 31, 2019, 16 pages (with English translation).
Vodafone, "pCR to 33.501-DH procedure with AMF for protection against passive eavesdropping," 3GPP TSG SA WG3 (Security) Meeting #89, S3-173262, Reno, USA, Nov. 27-Dec. 1, 5 pages.
Vodafone, "pCR to 33.501-DH procedure with SEAF for protection against passive eavesdropping," 3GPP TSG SA WG3 (Security) Meeting #89, S3-173263, Reno, USA, Nov. 27-Dec. 1, 6 pages.
Extended European Search Report issued in European Application No. 18944714.7 dated Nov. 16, 2021, 7 pages.
ETSI TS 133 501 V15.2.0 (Oct. 2018), "5G; Security architecture and procedures for 5G System(3GPP TS 33.501 version 15.2.0 Release 15)," Oct. 2018, 172 pages.
Liu et al., "Toward a Secure Access to 5G Network," 2018 17th IEEE International Conference On Trust, Security And Privacy In Computing And Communications, 12th IEEE International Conference On Big Data Science And Engineering (TrustCom/BigDataSE), Sep. 6, 2018, 8 pages.

* cited by examiner

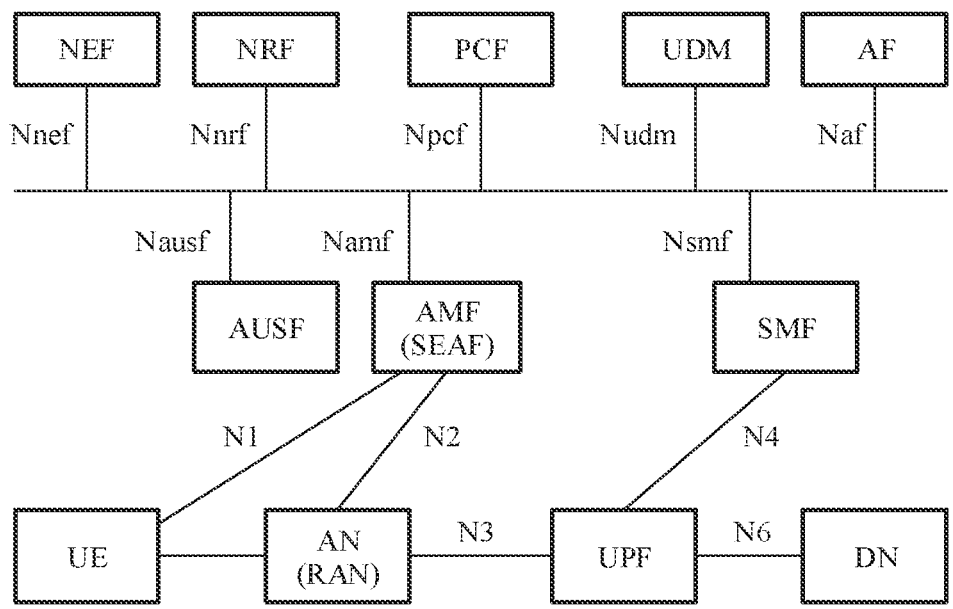
FIG. 1-A
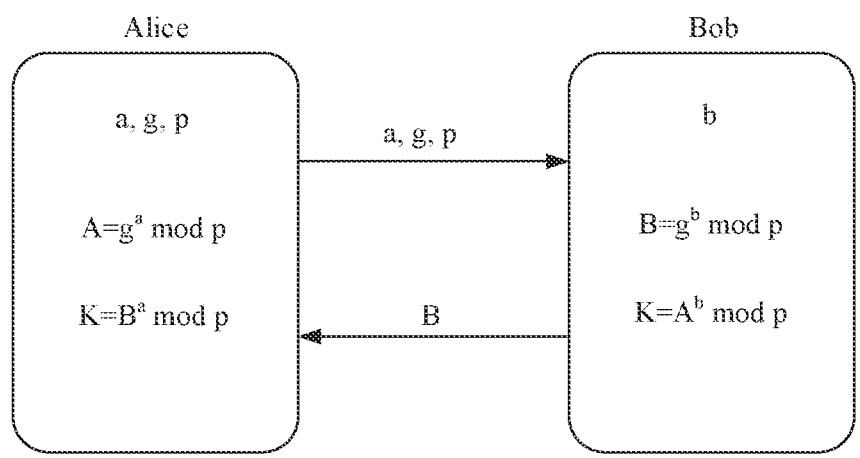
FIG. 1-B

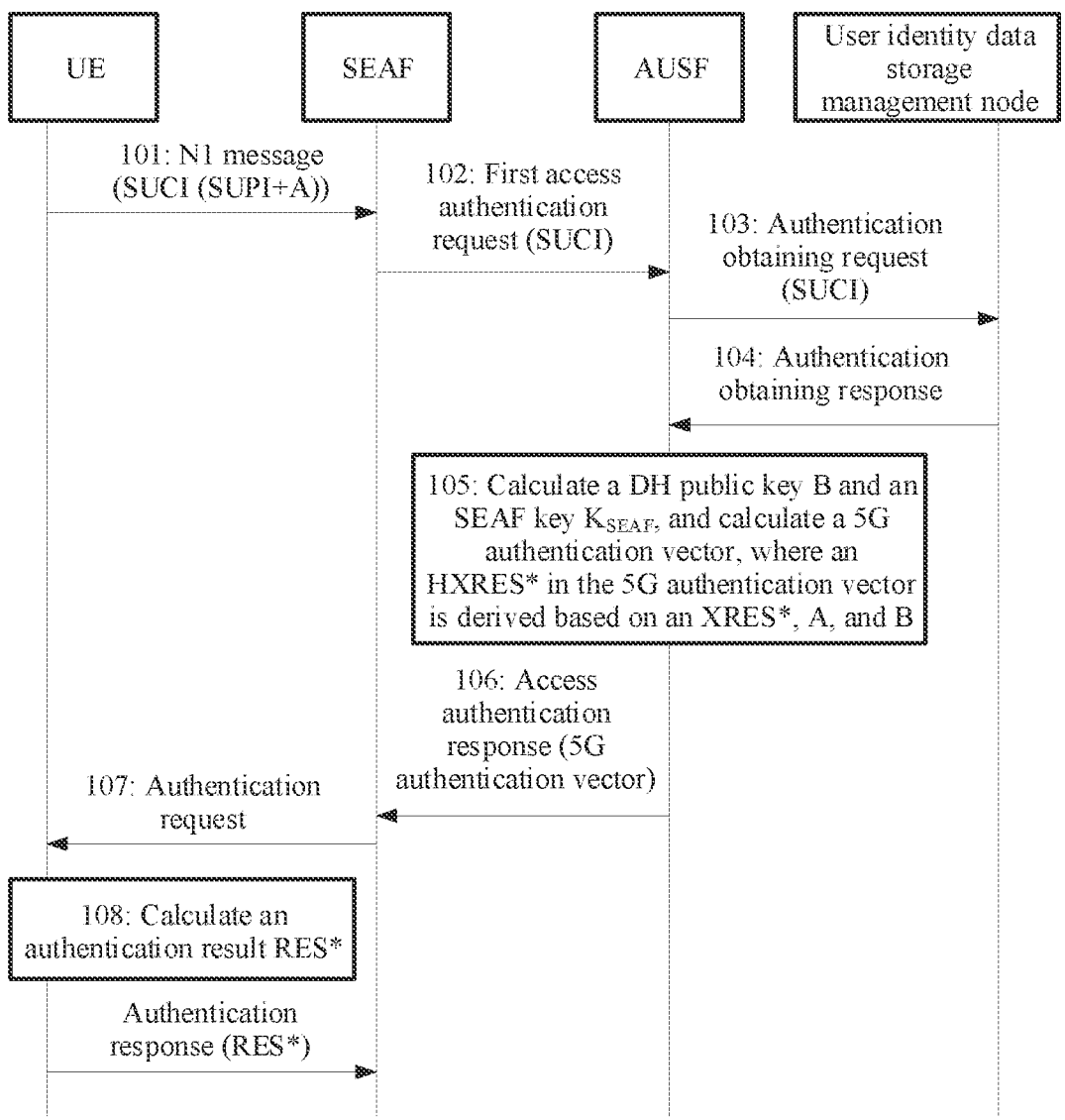
FIG. 1-C

COMMUNICATION METHOD AND RELATED PRODUCT BASED ON KEY AGREEMENT AND AUTHENTICATION

CROSS-REFERENCE TO RELATED APPLICATIONS

This application is a continuation of International Application No. PCT/CN2018/125912, filed on Dec. 29, 2018, which is incorporated herein by reference in its entirety.

TECHNICAL FIELD

This application relates to the communication field, and specifically, to a communication method and related products such as a user terminal, a security anchor function, an authentication server function, and a computer-readable medium.

BACKGROUND

In many existing mobile communication networks (for example, a 3G network/4G network), a terminal and a network perform identity authentication based on a two-way authentication mechanism of a pre-shared key. The pre-shared key is a symmetric key that is placed in advance in a subscriber identity module card of the terminal and a home subscriber server (HSS) of a core network. A protocol used for user identity authentication is the authentication and key agreement (AKA) protocol described in 3GPP TS 333.401 discussed by the 3rd generation partnership project (3GPP) organization.

The Diffie-Hellman (DH) key technology may be used to create, by exchanging information on a common channel, a shared key that can be used for secure communication on the common channel. A DH key agreement procedure in a conventional technology is relatively complex. Consequently, complexity of system design is increased.

SUMMARY

Embodiments of this application provide a key agreement method and a related product.

According to a first aspect, a communication method provided in an embodiment of this application may include: User equipment (UE) sends an N1 message to a security anchor function (SEAF).

The N1 message carries a DH public parameter or a DH public parameter index, the N1 message further carries an encrypted identifier (SUCI) of the UE, and the SUCI is obtained by encrypting a DH public key A and a permanent identifier (SUPI) of the UE; or the N1 message carries a DH public key A, the N1 message further carries a DH public parameter or a DH public parameter index, the N1 message further carries an SUCI of the UE, and the SUCI is obtained by encrypting an SUPI of the UE.

The UE receives an authentication request that carries a random number RAND and that is sent by the SEAF.

The UE sends, to the SEAF, an authentication response used to respond to the authentication request, where the authentication response carries an authentication result RES* (response) calculated based on a root key K and the random number RAND.

It can be learned that in the foregoing solution, the N1 message carries the DH parameter, reflecting integration of a DH key agreement procedure and a 5G AKA authentication procedure. The integration of the two procedures helps reduce complexity of the DH key agreement procedure (for example, compared with a scenario in which the DH key agreement procedure and the 5G AKA authentication procedure are completely separately performed, the integration of the two procedures helps reduce the complexity of the DH key agreement procedure), and helps reduce complexity of system design.

Further, if the DH public key A is encrypted into the SUCI, parameter security is further improved.

In some possible implementations, the authentication request may further carry a DH public key B. The method may further include: The UE derives a DH symmetric key $K_{DH}$ based on the DH public parameter and the DH public key B; and the UE derives an SEAF key $K_{SEAF}$ based on $K_{DH}$ and an AUSF key $K_{AUSF}$, where the AUSF key $K_{AUSF}$ is calculated based on the root key K and the random number RAND.

According to a second aspect, an embodiment of this application further provides another communication method. The method includes:

An SEAF receives an N1 message from UE, where the N1 message carries an encrypted identifier SUCI of the UE, the N1 message further carries a DH public parameter or a DH public parameter index, and the SUCI is obtained by encrypting a permanent identifier SUPI of the UE and a DH public key A; or the N1 message carries a DH public key A, the N1 message further carries a DH public parameter or a DH public parameter index, the N1 message further carries an SUCI of the UE, and the SUCI is obtained by encrypting a permanent identifier SUPI of the UE.

The SEAF sends a first access authentication request to an authentication server function (AUSF), where the first access authentication request carries the DH public parameter or the DH public parameter index; and when the SUCI carried in the N1 message is obtained by encrypting the SUPI of the UE and the public key A, the first access authentication request further carries the SUCI; or when the SUCI carried in the N1 message is obtained by encrypting the SUPI of the UE, the first access authentication request may further carry the DH public key A and the SUCI.

It can be learned that in the foregoing solution, the N1 message carries the DH parameter, reflecting integration of a DH key agreement procedure and a 5G AKA authentication procedure. The integration of the two procedures helps reduce complexity of the DH key agreement procedure (for example, compared with a scenario in which the DH key agreement procedure and the 5G AKA authentication procedure are completely separately performed, the integration of the two procedures helps reduce the complexity of the DH key agreement procedure), and helps reduce complexity of system design.

Further, if the DH public key A is encrypted into the SUCI, parameter security is further improved.

In some possible implementations, the method may further include: The SEAF receives a first access authentication response that is used to respond to the first access authentication request and that is sent by the AUSF, where the first access authentication response carries a 5G authentication vector and the SUPI.

The 5G authentication vector includes a hashed expected authentication result (HXRES*, hashed expected RES*), and the HXRES* is derived based on an expected authentication result (XRES*, expected RES*), the DH public key A, and a DH public key B.

The SEAF sends, to the UE, an authentication request carrying a random number RAND.

The SEAF receives, from the UE, an authentication response used to respond to the authentication request, where the authentication response carries an authentication result RES* calculated based on a root key K and the random number RAND.

The SEAF calculates a hashed authentication result (HRES*) based on the DH public key A, the DH public key B, and the RES*; and when the HRES* is the same as the HXRES* included in the 5G authentication vector, determines that DH agreement succeeds and access authentication performed by the SEAF on the UE succeeds; or when the HXRES* is different from the HRES*, determines that DH agreement fails and access authentication performed by the SEAF on the UE fails.

The SEAF sends a second access authentication request to the AUSF, where the second access authentication request carries the authentication result RES*.

The SEAF receives a second access authentication response sent by the AUSF, where the second access authentication response is used to respond to the second access authentication request, and the second access authentication response is used to indicate a result of access authentication performed by the AUSF on the UE based on the RES*.

If the HXRES* is derived based on the XRES*, the DH public key A, and the DH public key B, a depth of the integration of the DH key agreement procedure and the 5G AKA authentication procedure is improved, the complexity of the DH key agreement procedure is greatly reduced, and the complexity of the system design is reduced. In addition, security of the DH public key A and the DH public key B is further improved.

In some other possible implementations, the method may further include: The SEAF receives a first access authentication response that is used to respond to the first access authentication request and that is sent by the AUSF, where the first access authentication response carries a 5G authentication vector and the SUPI, the 5G authentication vector includes a hashed expected authentication result (HXRES*), and the HXRES* is derived based on an XRES*.

The SEAF sends, to the UE, an authentication request carrying a random number RAND.

The SEAF receives, from the UE, an authentication response used to respond to the authentication request, where the authentication response carries an authentication result RES* calculated based on a root key K and the random number RAND.

The SEAF calculates a hashed authentication result HRES* based on the RES*, and when the HRES* is the same as the HXRES* included in the 5G authentication vector, determines that access authentication performed by the SEAF on the UE succeeds; or when the HXRES* is different from the HRES*, determines that access authentication performed by the SEAF on the UE fails.

The SEAF sends a second access authentication request to the AUSF, where the second access authentication request carries the authentication result RES*.

The SEAF receives a second access authentication response sent by the AUSF, where the second access authentication response is used to respond to the second access authentication request, and the second access authentication response is used to indicate a result of access authentication performed by the AUSF on the UE based on the RES*.

According to a third aspect, an embodiment of this application further provides another communication method. The method includes:

An AUSF receives a first access authentication request from an SEAF, where the first access authentication request carries a DH public parameter or a DH public parameter index, the first access authentication request further carries an encrypted identifier SUCI of UE, and the SUCI is obtained by encrypting a permanent identifier SUPI of the UE and a DH public key A; or the first access authentication request carries an SUCI of UE and a DH public key A, the first access authentication request further carries a DH public parameter or a DH public parameter index, and the SUCI is obtained by encrypting an SUPI of the UE.

The AUSF sends an authentication obtaining request to a user identity data storage management node, where the authentication obtaining request carries the SUCI.

The AUSF receives an authentication obtaining response that is used to respond to the authentication obtaining request and that is sent by the user identity data storage management node, where the authentication obtaining response carries a 5G home network authentication vector, the authentication obtaining response further carries the DH public key A and the SUPI obtained by decrypting the SUCI, and the 5G home network authentication vector includes an expected authentication result (XRES*) and an AUSF key $K_{AUSF}$.

The AUSF calculates a DH public key B based on the DH public parameter, derives a DH symmetric key Km based on the DH public key A and the DH public key B, and derives an SEAF key $K_{SEAF}$ based on the DH symmetric key $K_{DH}$ and the AUSF key $K_{AUSF}$.

The AUSF calculates a 5G authentication vector based on the 5G home network authentication vector, where the 5G authentication vector includes a hashed expected authentication result HXRES*, and the HXRES* is derived based on the XRES*, the DH public key A, and the DH public key B.

The AUSF sends, to the SEAF, a first access authentication response used to respond to the first access authentication request, where the first access authentication response carries the 5G authentication vector.

The AUSF receives a second access authentication request from the SEAF, where the second access authentication request carries an authentication result RES* that is from the UE; and when the RES* is consistent with the XRES* included in the 5G home network authentication vector, determines that access authentication performed by the AUSF on the UE succeeds.

The AUSF sends, to the SEAF, a second access authentication response used to respond to the second access authentication request, where the second access authentication response is used to indicate a result of the access authentication performed by the AUSF on the UE.

Optionally, it should be noted that the home network is also sometimes referred to as a home network.

According to a fourth aspect, an embodiment of this application further provides another communication method. The method may include:

An AUSF receives a first access authentication request from an SEAF, where the first access authentication request carries a DH public parameter or a DH public parameter index, the first access authentication request further carries an encrypted identifier SUCI of UE, and the SUCI is obtained by encrypting a permanent identifier SUPI of the UE and a DH public key A; or the first access authentication request carries an SUCI of UE and a DH public key A, the first access authentication request further carries a DH public parameter or a DH public parameter index, and the SUCI is obtained by encrypting an SUPI of the UE.

The AUSF sends an authentication obtaining request to a user identity data storage management node, where the authentication obtaining request carries the SUCI.

The AUSF receives an authentication obtaining response that is used to respond to the authentication obtaining request and that is sent by the user identity data storage management node, where the authentication obtaining response carries a 5G home network authentication vector, the authentication obtaining response further carries the DH public key A and the SUPI obtained by decrypting the SUCI, and the 5G home network authentication vector includes an expected authentication result XRES* and an AUSF key $K_{AUSF}$.

The AUSF calculates a DH public key B based on the DH public parameter, derives a DH symmetric key Km based on the DH public key A and the DH public key B, and derives an SEAF key $K_{SEAF}$ based on the DH symmetric key Kan and the AUSF key $K_{AUSF}$.

The AUSF calculates a 5G authentication vector based on the 5G home network authentication vector, where the 5G authentication vector includes a hashed expected authentication result RXRES*, and the HXRES* is derived based on the XRES*.

The AUSF sends, to the SEAF, a first access authentication response used to respond to the first access authentication request, where the first access authentication response carries the 5G authentication vector and the DH public key A.

The AUSF receives a second access authentication request from the SEAF, where the second access authentication request carries a DH public key B and an authentication result RES* that is from the UE; when the RES* is consistent with the XRES* included in the 5G home network authentication vector, determines that access authentication performed by the AUSF on the UE succeeds; and when the DH public key B carried in the second access authentication request is the same as the DH public key B carried in the first access authentication response, determines that DH key agreement fails; or when the DH public key B carried in the second access authentication request is different from the DH public key B carried in the first access authentication response, determines that DH key agreement fails.

The AUSF sends, to the SEAF, a second access authentication response used to respond to the second access authentication request, where the second access authentication response is used to indicate a result of the access authentication performed by the AUSF on the UE.

According to a fifth aspect, an embodiment of this application further provides another communication on method. The method includes:

User equipment UE sends an N1 message to an SEAF, where the N1 message carries an encrypted identifier SUCI of the UE, and the SUCI is obtained based on a permanent identifier SUPI of the UE.

The UE receives an authentication request that carries a random number and a DH public key A and that is sent by the SEAF.

The UE derives a DH public keys B based on a DH public parameter and a DH private key b.

The UE derives a DH symmetric key $K_{DH}$ based on the DH public key A and the DH public key B.

The UE calculates an authentication result RES* and an AUSF key $K_{AUSF}$ based on a root key K and the random number.

The UE derives an SEAF key $K_{SEAF}$ based on Km and the AUSF key $K_{AUSF}$.

The UE sends, to the SEAF, an authentication response used to respond to the authentication request, where the authentication response carries the authentication result RES* calculated based on the root key K and the random number.

In some possible implementations, deriving the SEAF key $K_{SEAF}$ based on $K_{DH}$ and the AUSF key $K_{AUSF}$ may include: deriving an SEAF key $K\_{SEAF}$ based on $K_{DH}$ and the AUSF key $K_{AUSF}$; and deriving the SEAF key $K_{SEAF}$ based on $K_{DH}$ and $K\_{SEAF}$, where the authentication response further carries the DH public key B encrypted by using the SEAF key $K\_{SEAF}$.

According to a sixth aspect, an embodiment of this application further provides another communication method. The method may include:

An SEAF receives an N1 message from UE, where the N1 message carries an encrypted identifier SUCI of the UE, and the SUCI is obtained by encrypting a permanent identifier SUPI of the UE.

The SEAF sends, to an AUSF, a first access authentication request carrying the SUCI. The SEAF receives a first access authentication response that is used to respond to the first access authentication request and that is sent by the AUSF, where the first access authentication response carries a 5G authentication vector, a DH public key A, and the SUPI, the 5G authentication vector includes a hashed expected authentication result HXRES*, and the HXRES* is derived based on an XRES* and the DH public key A.

The SEAF sends, to the UE, an authentication request carrying a random number RAND.

The SEAF receives, from the UE, an authentication response used to respond to the authentication request, where the authentication response carries an authentication result RES* calculated based on a root key K and the random number RAND.

The SEAF calculates a hashed authentication result HRES* based on the DH public key A and the RES*; and when the HRES* is the same as the HXRES* included in the 5G authentication vector, determines that DH agreement succeeds and access authentication performed by the SEAF on the UE succeeds, or when the HXRES* is different from the HRES*, determines that DH agreement fails and access authentication performed by the SEAF on the UE fails.

The SEAF sends a second access authentication request to the AUSF, where the second access authentication request carries the authentication result RES*.

The SEAF receives a second access authentication response sent by the AUSF, where the second access authentication response is used to respond to the second access authentication request, and the second access authentication response is used to indicate a result of access authentication performed by the AUSF on the UE based on the RES*.

In some possible implementations, the authentication response further carries a DH public key B encrypted by using $K\_{SEAF}$; and the second access authentication request further carries the decrypted DH public key B.

According to a seventh aspect, an embodiment of this application further provides another communication method. The method includes:

An AUSF receives a first access authentication request from an SEAF, where the first access authentication request carries an encrypted identifier SUCI of UE, and the SUCI is obtained by encrypting a permanent identifier SUPI of the UE.

The AUSF sends an authentication obtaining request to a user identity data storage management node, where the authentication obtaining request carries the SUCI.

The AUSF receives an authentication obtaining response that is used to respond to the authentication obtaining request and that is sent by the user identity data storage management node, where the authentication obtaining response carries a 5G home network authentication vector, the authentication obtaining response further carries a DH public key A and the SUPI obtained by decrypting the SUCI, and the 5G home network authentication vector includes an expected authentication result XRES*.

The AUSF calculates the DH public key A based on a DH public parameter.

The AUSF calculates a 5G authentication vector based on the 5G home network authentication vector, where the 5G authentication vector includes a hashed expected authentication result HXRES*, and the HXRES* is derived based on the XRES* and the DH public key A.

The AUSF sends, to the SEAF, a first access authentication response used to respond to the first access authentication request, where the first access authentication response carries the 5G authentication vector and the DH public key A.

The AUSF receives a second access authentication request from the SEAF, where the second access authentication request carries an authentication result RES* that is from the UE; and when the RES* is consistent with the XRES* included in the 5G home network authentication vector, determines that access authentication performed by the AUSF on the UE succeeds.

The AUSF sends, to the SEAF, a second access authentication response used to respond to the second access authentication request, where the second access authentication response is used to indicate a result of the access authentication performed by the AUSF on the UE.

In some possible implementations, the 3G home network authentication vector further includes an AUSF key $K_{AUSF}$, and the second access authentication request further carries a DH public key B; and the method may further include: The AUSF derives a DH symmetric key $K_{DH}$ based on the DH public key B; and derives an SEAF key $K_{SEAF}$ based on the symmetric key $K_{DH}$ and the AUSF key $K_{AUSF}$.

According to an eighth aspect, an embodiment of this application further provides another communication method. The method includes:

An SEAF receives an N1 message from UE, where the N1 message carries an encrypted identifier SUCI of the UE, and the SUCI is obtained by encrypting a permanent identifier SUPI of the UE.

The SEAF sends, to an AUSF, a first access authentication request carrying the SUCI. The SEAF receives a first access authentication response that is used to respond to the first access authentication request and that is sent by the AUSF, where the first access authentication response carries a 5G authentication vector, a DH public key A, and the SUPI, the 5G authentication vector includes a hashed expected authentication result HXRES*, and the HXRES* is derived based on an XRES*.

The SEAF sends, to the UE, an authentication request carrying a random number RAND.

The SEAF receives, from the UE, an authentication response used to respond to the authentication request, where the authentication response carries an authentication result RES* calculated based on a root key K and the random number RAND.

The SEAF calculates a hashed authentication result HRES* based on the DH public key A and the RES*; and when the HRES* is the same as the HXRES* included in the 5G authentication vector, determines that access authentication performed by the SEAF on the UE succeeds; or when the HRES* is different from the HXRES* included in the 5G authentication vector, determines that access authentication performed by the SEAF on the UE fails.

The SEAF sends a second access authentication request to the AUSF, where the second access authentication request carries the authentication result RES*.

The SEAF receives a second access authentication response sent by the AUSF, where the second access authentication response is used to respond to the second access authentication request, and the second access authentication response is used to indicate a result of access authentication performed by the AUSF on the UE based on the RES*.

In some possible implementations, the authentication response further carries a DH public key B encrypted by using $K_{-SEAF}$; and the second access authentication request further carries the decrypted DH public key B.

According to a ninth aspect, an embodiment of this application further provides another communication method. The method includes:

An AUSF receives a first access authentication request from an SEAF, where the first access authentication request carries an encrypted identifier SUCI or a permanent identifier SUPI of UE, and the SUCI is obtained by encrypting the SUPI.

The AUSF sends an authentication obtaining request to a user identity data storage management node, where the authentication obtaining request carries the SUCI or the SUPI.

The AUSF receives an authentication obtaining response that is used to respond to the authentication obtaining request and that is sent by the user identity data storage management node, where the authentication obtaining response carries a 5G home network authentication vector, the authentication obtaining response further carries a DH public key A, and the 5G home network authentication vector includes an expected authentication result XRES*.

The AUSF calculates the DH public key A based on a DH public parameter.

The AUSF calculates a 5G authentication vector based on the 5G home network authentication vector, where the 5G authentication vector includes a hashed expected authentication result HXRES*, and the HXRES* is derived based on the XRES*.

The AUSF sends, to the SEAF, a first access authentication response used to respond to the first access authentication request, where the first access authentication response carries the 5G authentication vector and the DH public key A.

The AUSF receives a second access authentication request from the SEAF, where the second access authentication request carries a DH public key A and an authentication result RES* that is from the UE; when the RES* is consistent with the XRES* included in the 5G home network authentication vector, determines that access authentication performed by the AUSF on the UE succeeds: or when the RES* is inconsistent with the XRES* included in the 5G home network authentication vector, determines that access authentication performed by the AUSF on the UE fails: and when the DH public key A carried in the second access authentication request is the same as the DH public key A carried in the first access authentication response, determines that DH key agreement fails: or when the DH public key A carried in the second access authentication request is different from the DH public key A carried in the first access authentication response, determines that DH key agreement fails.

The AUSF sends, to the SEAF, a second access authentication response used to respond to the second access authentication request, where the second access authentication response is used to indicate a result of the access authentication performed by the AUSF on the UE.

In some possible implementations, the 5G home network authentication vector further includes an AUSF key $K_{AUSF}$, and the second access authentication request further carries a DH public key B; and the method may further include: The AUSF derives a DH symmetric key $K_{DH}$ based on the DH public key B; and derives an SEAF key $K_{SEAF}$ based on the symmetric key $K_{DH}$ and the AUSF key $K_{AUSF}$.

According to a tenth aspect, an embodiment of this application further provides user equipment UE. The user equipment includes:

a sending unit, configured to send an N1 message to a security anchor function (SEAF), where the N1 message carries a DH public parameter or a DH public parameter index, the N1 message further carries an encrypted identifier SUCI of the UE, and the SUCI is obtained by encrypting a permanent identifier SUPI of the UE and a DH public key A; or the N1 message carries a DH public key A, the N1 message further carries a DH public parameter or a DH public parameter index, the N1 message further carries an SUCI of the UE, and the SUCI is obtained by encrypting an SUPI of the UE; and a receiving unit, configured to receive an authentication request that carries a random number RAND and that is sent by the SEAF, where the sending unit is further configured to send, to the SEAF, an authentication response used to respond to the authentication request, where the authentication response carries an authentication result RES* calculated based on a root key K and the random number RAND.

In some possible implementations, the authentication request carries a DH public key B; and the UE further includes a processing unit, configured to derive a DH symmetric key $K_{DH}$ based on the DH public parameter and the DH public key B, where the UE derives an SEAF key $K_{SEAF}$ based on $K_{DH}$ and an AUSF key $K_{AUSF}$, and the AUSF key $K_{AUSF}$ is calculated based on the root key K and the random number RAND.

According to an eleventh aspect, an embodiment of this application further provides an SEAF. The SEAF includes:

a receiving unit, configured to receive an N1 message from UE, where the N1 message may carry an encrypted identifier SUCI of the UE, the N1 message further carries a DH public parameter or a DH public parameter index, and the SUCI is obtained by encrypting a permanent identifier SUPI of the UE and a DH public key A; or the N1 message carries a DH public key A, the N1 message further carries a DH public parameter or a DH public parameter index, the N1 message further carries an SUCI of the UE (or a 5G-GUTI of the UE), and the SUCI is obtained by encrypting a permanent identifier SUPI of the UE; and a sending unit, configured to send a first access authentication request to an authentication server function (AUSF), where the first access authentication request carries the DH public parameter or the DH public parameter index; and when the SUCI carried in the N1 message is obtained by encrypting the SUPI of the UE and the DH public key A, the first access authentication request further carries the SUCI; or when the SUCI carried in the N1 message is obtained by encrypting the SUPI of the UE, the first access authentication request further carries the DH public key A and the SUCI.

In some possible implementations, the SEAF further includes a processing unit;

the receiving unit is further configured to receive a first access authentication response that is used to respond to the first access authentication request and that is sent by the AUSF, where the first access authentication response carries a 5G authentication vector and the SUPI, the 5G authentication vector includes a hashed expected authentication result HXRES*, and the HXRES* is derived based on an XRES*, the DH public key A, and a DH public key B;

the sending unit is further configured to send, to the UE, an authentication request carrying a random number RAND;

the receiving unit is further configured to receive, from the UE, an authentication response used to respond to the authentication request, where the authentication response carries an authentication result RES* calculated based on a root key K and the random number RAND;

the processing unit is configured to: calculate a hashed authentication result HRES* based on the DH public key A, the DH public key B, and the RES*; and when the HRES* is the same as the HXRES* included in the 5G authentication vector, determine that DH agreement succeeds and access authentication performed by the SEAF on the UE succeeds; or when the HXRES* is different from the HRES*, determine that DH agreement fails and access authentication performed by the SEAF on the UE fails;

the sending unit is further configured to send a second access authentication request to the AUSF, where the second access authentication request carries the authentication result RES*; and the receiving unit is further configured to receive a second access authentication response sent by the AUSF, where the second access authentication response is used to respond to the second access authentication request, and the second access authentication response is used to indicate a result of access authentication performed by the AUSF on the UE based on the RES*.

In some possible implementations, the SEAF further includes a processing unit;

the receiving unit is further configured to receive a first access authentication response that is used to respond to the first access authentication request and that is sent by the AUSF, where the first access authentication response carries a 5G authentication vector and the SUPI, the 5G authentication vector includes a hashed expected authentication result HXRES*, and the HXRES* is derived based on an XRES*;

the sending unit is further configured to send, to the UE, an authentication request carrying a random number RAND;

the receiving unit is further configured to receive, from the UE, an authentication response used to respond to the authentication request, where the authentication response carries an authentication result RES* calculated based on a root key K and the random number RAND;

the processing unit is configured to: calculate a hashed authentication result HRES* based on the RES*; and when the HRES* is the same as the HXRES* included in the 5G authentication vector, determine that access authentication performed by the SEAF on the UE succeeds; or when the HXRES* is different from the HRES*, determine that access authentication performed by the SEAF on the UE fails;

the sending unit is further configured to send a second access authentication request to the AUSF, where the second access authentication request carries the authentication result RES*; and the receiving unit is further configured to receive a second access authentication response sent by the AUSF, where the second access authentication response is used to respond to the second access authentication request, and the second access authentication response is used to indicate a result of access authentication performed by the AUSF on the UE based on the RES*.

According to a twelfth aspect, an embodiment of this application further provides an AUSF. The AUSF includes:

a receiving unit, configured to receive a first access authentication request from an SEAF, where the first access authentication request carries a DH public parameter or a DH public parameter index, the first access authentication request further carries an encrypted identifier SUCI of UE, and the SUCI is obtained by encrypting a permanent identifier SUPI of the UE and a DH public key A; or the first access authentication request may carry an SUCI of UE (or a 5G-GUTI of the UE) and a DH public key A, the first access authentication request may further carry a DH public parameter or a DH public parameter index, and the SUCI is obtained by encrypting an SUPI of the UE;

a sending unit, configured to send an authentication obtaining request to a user identity data storage management node, where the authentication obtaining request carries the SUCI, where the receiving unit is further configured to receive an authentication obtaining response that is used to respond to the authentication obtaining request and that is sent by the user identity data storage management node, where the authentication obtaining response carries a 5G home network authentication vector, the authentication obtaining response further carries the DH public key A and the SUPI obtained by decrypting the SUCI, and the 5G home network authentication vector includes an expected authentication result XRES* and an AUSF key $K_{AUSF}$; and a processing unit, configured to: calculate a DH public key B based on the DH public parameter, derive a DH symmetric key $K_{DH}$ based on the DH public key A and the DH public key B, and derive an SEAF key $K_{SEAF}$ based on the DH symmetric key $K_{DH}$ and the AUSF key $K_{AUSF}$, where the processing unit is further configured to calculate a 5G authentication vector based on the 5G home network authentication vector, where the 5G authentication vector includes a hashed expected authentication result HXRES*, and the HXRES* is derived based on the XRES*, the DH public key A, and the DH public key B;

the sending unit is further configured to send, to the SEAF, a first access authentication response used to respond to the first access authentication request, where the first access authentication response carries the 5G authentication vector;

the receiving unit is further configured to receive a second access authentication request from the SEAF, where the second access authentication request carries an authentication result RES* that is from the UE; and when the RES* is consistent with the XRES* included in the 5G home network authentication vector, it is determined that access authentication performed by the AUSF on the UE succeeds; and the sending unit is further configured to send, to the SEAF, a second access authentication response used to respond to the second access authentication request, where the second access authentication response is used to indicate a result of the access authentication performed by the AUSF on the UE.

According to a thirteenth aspect, an embodiment of this application further provides an authentication server function AUSF. The AUSF includes:

a receiving unit, configured to receive a first access authentication request from an SEAF, where the first access authentication request carries a DH public parameter or a DH public parameter index, the first access authentication request further carries an encrypted identifier SUCI of UE, and the SUCI is obtained by encrypting a permanent identifier SUPI of the UE and a DH public key A; or the first access authentication request carries an SUCI of UE and a DH public key A, the first access authentication request further carries a DH public parameter or a DH public parameter index, and the SUCI is obtained by encrypting an SUPI of the UE;

a sending unit, configured to send an authentication obtaining request to a user identity data storage management node, where the authentication obtaining request carries the SUCI, where the receiving unit is further configured to receive an authentication obtaining response that is used to respond to the authentication obtaining request and that is sent by the user identity data storage management node, where the authentication obtaining response carries a 5G home network authentication vector, the authentication obtaining response further carries the DH public key A and the SUPI obtained by decrypting the SUCI, and the 5G home network authentication vector includes an expected authentication result XRES* and an AUSF key $K_{AUSF}$; and a processing unit, configured to: calculate a DH public key B based on the DH public parameter, derive a DH symmetric key Km based on the DH public key A and the DH public key B, and derive an SEAF key $K_{SEAF}$ based on the DH symmetric key $K_{DH}$ and the AUSF key $K_{AUSF}$, where the processing unit is further configured to calculate a 5G authentication vector based on the 5G home network authentication vector, where the 5G authentication vector includes a hashed expected authentication result HXRES*, and the HXRES* is derived based on the XRES*;

the sending unit is further configured to send, to the SEAF, a first access authentication response used to respond to the first access authentication request, where the first access authentication response carries the 5G authentication vector and the DH public key A;

the receiving unit is further configured to receive a second access authentication request from the SEAF, where the second access authentication request carries a DH public key B and an authentication result RES* that is from the UE;

the processing unit is further configured to: when the RES* is consistent with the XRES* included in the 5G home network authentication vector, determine that access authentication performed by the AUSF on the UE succeeds; and when the DH public key B carried in the second access authentication request is the same as the DH public key B carried in the first access authentication response, determine that DH key agreement fails; or when the DH public key B carried in the second access authentication request is different from the DH public key B carried in the first access authentication response, determine that DH key agreement fails; and the AUSF sends, to the SEAF, a second access authentication response used to respond to the second access authentication request, where the second access authentication response is used to indicate a result of the access authentication performed by the AUSF on the UE.

According to a fourteenth aspect, an embodiment of this application further provides user equipment UE. The user equipment includes:

a sending unit, configured to send an N1 message to an SEAF, where the N1 message carries an encrypted identifier SUCI of the UE, and the SUCI is obtained based on a permanent identifier SUPI of the UE;

a receiving unit, configured to receive an authentication request that carries a random number and a DH public key A and that is sent by the SEAF; and a processing unit, configured to: derive a DH public key B based on a DH public parameter and a DH private key b; derive a DH symmetric key $K_{DH}$ based on the DH public key A and the DH public key B; calculate an authentication result RES* and an AUSF key $K_{AUSF}$ based on a root key K and the random number; and derive an SEAF key $K_{SEAF}$ based on $K_{DH}$ and the AUSF key $K_{AUSF}$, where the sending unit is further configured to send, to the SEAF, an authentication response used to respond to the authentication request, where the authentication response carries the authentication result RES* calculated based on the root key K and the random number.

In some possible implementations, that the processing unit derives the SEAF key $K_{SEAF}$ based on $K_{DH}$ and the AUSF key $K_{AUSF}$ includes: deriving an SEAF key $K_{\_SEAF}$ based on $K_{DH}$ and the AUSF key $K_{AUSF}$; and deriving the SEAF key $K_{SEAF}$ based on $K_{DH}$ and $K_{\_SEAF}$, where the authentication response further carries the DH public key B encrypted by using the SEAF key $K_{\_SEAF}$.

According to a fifteenth aspect, an embodiment of this application further provides an SEAF. The SEAF includes:

a receiving unit, configured to receive an N1 message from UE, where the N1 message carries an encrypted identifier SUCI of the UE, and the SUCI is obtained by encrypting a permanent identifier SUPI of the UE;

a sending unit, configured to send, to an AUSF, a first access authentication request carrying the SUCI, where the receiving unit is further configured to receive a first access authentication response that is used to respond to the first access authentication request and that is sent by the AUSF, where the first access authentication response carries a 5G authentication vector, a DH public key A, and the SUPI, the 5G authentication vector includes a hashed expected authentication result HXRES*, and the HXRES* is derived based on an XRES* and the DH public key A;

the sending unit is further configured to send, to the UE, an authentication request carrying a random number RAND; and the receiving unit is further configured to receive, from the UE, an authentication response used to respond to the authentication request, where the authentication response carries an authentication result RES* calculated based on a root key K and the random number RAND; and a processing unit, configured to: calculate a hashed authentication result HRES* based on the DH public key A and the RES*, and when the HRES* is the same as the HXRES* included in the 5G authentication vector, determine that DH agreement succeeds and access authentication performed by the SEAF on the UE succeeds; or when the HXRES* is different from the HRES*, determine that DH agreement fails and access authentication performed by the SEAF on the UE fails, where the sending unit is further configured to send a second access authentication request to the AUSF, where the second access authentication request carries the authentication result RES*; and the receiving unit is further configured to receive a second access authentication response sent by the AUSF, where the second access authentication response is used to respond to the second access authentication request, and the second access authentication response is used to indicate a result of access authentication performed by the AUSF on the UE based on the RES*.

In some possible implementations, the authentication response further carries a DH public key B encrypted by using $K_{\_SEAF}$; and the second access authentication request further carries the decrypted DH public key B.

According to a sixteenth aspect, an embodiment of this application further provides an AUSF. The AUSF includes:

a receiving unit, configured to receive a first access authentication request from an SEAF, where the first access authentication request carries an encrypted identifier SUCI of UE, and the SUCI is obtained by encrypting a permanent identifier SUPI of the UE;

a sending unit, configured to send an authentication obtaining request to a user identity data storage management node, where the authentication obtaining request carries the SUCI, where the receiving unit is further configured to receive an authentication obtaining response that is used to respond to the authentication obtaining request and that is sent by the user identity data storage management node, where the authentication obtaining response carries a 5G home network authentication vector, the authentication obtaining response further carries a DH public key A and the SUPI obtained by decrypting the SUCI, and the 5G home network authentication vector includes an expected authentication result XRES*; and a processing unit, configured to: calculate the DH public key A based on a DH public parameter; and calculate a 5G authentication vector based on the 5G home network authentication vector, where the 5G authentication vector includes a hashed expected authentication result HXRES*, and the HXRES* is derived based on the XRES* and the DH public key A, where the sending unit is further configured to send, to the SEAF, a first access authentication response used to respond to the first access authentication request, where the first access authentication response carries the 5G authentication vector and the DH public key A;

the receiving unit is further configured to receive a second access authentication request from the SEAF, where the second access authentication request carries an authentication result RES* that is from the UE; and when the RES* is consistent with the XRES* included in the 5G home network authentication vector, it is determined that access authentication performed by the AUSF on the UE succeeds; and the sending unit is further configured to send, to the SEAF, a second access authentication response used to respond to the second access authentication request, where the second access authentication response is used to indicate a result of the access authentication performed by the AUSF on the UE.

In some possible implementations, the 5G home network authentication vector further includes an AUSF key $K_{AUSF}$, and the second access authentication request further carries a DH public key B; and the processing unit is further configured to: derive a DH symmetric key $K_{DH}$ based on the DH public key B; and derive an SEAF key $K_{SEAF}$ based on the symmetric key $K_{DH}$ and the AUSF key $K_{AUSF}$.

According to a seventeenth aspect, an embodiment of this application further provides art SEAF. The SEAF includes:
a receiving unit, configured to receive an N1 message from UE, where the N1 message carries an encrypted identifier SUCI of the UE, and the SUCI is obtained by encrypting a permanent identifier SUPI of the UE;
a sending unit, configured to send, to an AUSF, a first access authentication request carrying the SUCI, where
the receiving unit is further configured to receive a first access authentication response that is used to respond to the first access authentication request and that is sent by the AUSF, where the first access authentication response carries a 5G authentication vector, a DH public key A, and the SUPI, the 5G authentication vector includes a hashed expected authentication result HXRES*, and the HXRES* is derived based on an XRES*;
the sending unit is further configured to send, to the UE, an authentication request carrying a random number RAND; and
the receiving unit is further configured to receive, from the UE, an authentication response used to respond to the authentication request, where the authentication response carries an authentication result RES* calculated based on a root key K and the random number RAND; and
a processing unit, configured to: calculate a hashed authentication result HRES* based on the DH public key A and the RES*; and when the HRES* is the same as the HXRES* included in the 5G authentication vector, determine that access authentication performed by the SEAF on the UE succeeds; or when the HRES* is different from the HXRES* included in the 5G authentication vector, determine that access authentication performed by the SEAF on the UE fails, where
the sending unit is further configured to send a second access authentication request to the AUSF, where the second access authentication request carries the authentication result RES*; and
the receiving unit is further configured to receive a second access authentication response sent by the AUSF, where the second access authentication response is used to respond to the second access authentication request, and the second access authentication response is used to indicate a result of access authentication performed by the AUSF on the UE based on the RES*.

In some possible implementations, the authentication response further carries a DH public key B encrypted by using $K_{-SEAF}$; and the second access authentication request further carries the decrypted DH public key B.

According to an eighteenth aspect, an embodiment of this application further provides an AUSF. The AUSF includes:
a receiving unit, configured to receive a first access authentication request from an SEAF, where the first access authentication request carries an encrypted identifier SUCI or a permanent identifier SUPI of UE, and the SUCI is obtained by encrypting the SUPI;
a sending unit, configured to send an authentication obtaining request to a user identity data storage management node, where the authentication obtaining request carries the SUCI or the SUPI, where
the receiving unit is further configured to receive an authentication obtaining response that is used to respond to the authentication obtaining request and that is sent by the user identity data storage management node, where the authentication obtaining response carries a 5G home network authentication vector, the authentication obtaining response further carries a DH public key A, and the 5G home network authentication vector includes an expected authentication result XRES*; and
a processing unit, configured to: calculate the DH public key A based on a DH public parameter; and calculate a 5G authentication vector based on the 5G home network authentication vector, where the 5G authentication vector includes a hashed expected authentication result HXRES*, and the HXRES* is derived based on the XRES*, where
the sending unit is further configured to send, to the SEAF, a first access authentication response used to respond to the first access authentication request, where the first access authentication response carries the 5G authentication vector and the DH public key A;
the receiving unit is further configured to receive a second access authentication request from the SEAF, where the second access authentication request carries a DH public key A and an authentication result RES* that is from the UE;
the processing unit is further configured to: when the RES* is consistent with the XRES* included in the 5G home network authentication vector, determine that access authentication performed by the AUSF on the UE succeeds; or when the RES* is inconsistent with the XRES* included in the 5G home network authentication vector, determine that access authentication performed by the AUSF on the UE fails; and when the DH public key A carried in the second access authentication request is the same as the DH public key A carried in the first access authentication response, determine that DH key agreement fails; or when the DH public key A carried in the second access authentication request is different from the DH public key A carried in the first access authentication response, determine that DH key agreement fails; and
the sending unit is further configured to send, to the SEAF, a second access authentication response used to respond to the second access authentication request, where the second access authentication response is used to indicate a result of the access authentication performed by the AUSF on the UE.

In some possible implementations, the 5G home network authentication vector further includes an AUSF key $K_{AUSF}$, and the second access authentication request further carries a DH public key B; and the processing unit is further configured to: derive a DH symmetric key $K_{DH}$ based on the DH public key B; and derive an SEAF key $K_{SEAF}$ based on the symmetric key $K_{DH}$ and the AUSF key $K_{AUSF}$.

According to a nineteenth aspect, an embodiment of this application further provides a communication apparatus. The communication apparatus includes a processor and a memory that are coupled to each other; and the processor is configured to invoke a program stored in the memory, to complete some or all steps of any method performed by any device provided in the embodiments of this application.

According to a twentieth aspect, an embodiment of this application further provides a computer-readable storage medium. The computer-readable storage medium stores a program; and when the program is executed by a processor, some or all steps of any method performed by any device provided in the embodiments of this application are completed.

According to a twenty-first aspect, an embodiment of this application further provides a computer program product including instructions. When the computer program product runs on a computer device, the computer device is enabled to perform some or all steps of any method performed by any device provided in the embodiments of this application.

BRIEF DESCRIPTION OF DRAWINGS

FIG. 1-A is a schematic diagram of a network architecture according to an embodiment of this application;

FIG. 1-B is a schematic diagram of a DH key agreement derivation process according to an embodiment of this application;

FIG. 1-C is a schematic flowchart of a communication method according to an embodiment of this application;

DETAIL DESCRIPTION OF EMBODIMENTS

Figure 2:
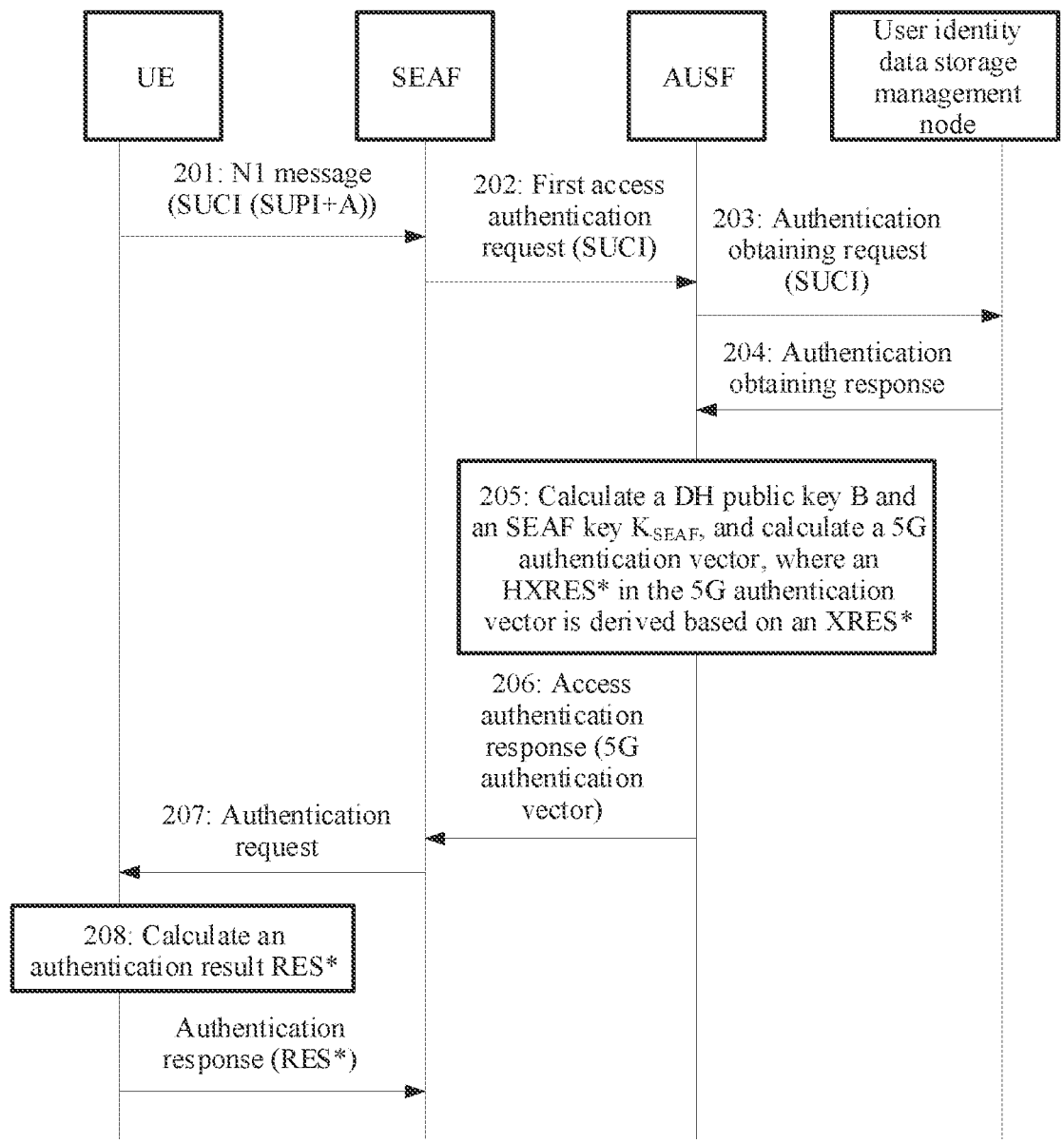
FIG. 2 is a schematic flowchart of another communication method according to an embodiment of this application.

The terms "include," "have," and any other variant thereof in the specification, claims, and accompanying drawings of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. In addition, in the specification, claims, and accompanying drawings of this application, the terms "first," "second," "third," "fourth," and the like are intended to distinguish between different objects but do not indicate a particular order.

The following first describes a related network architecture.

FIG. 1-A is a schematic diagram of an example of a 5G network architecture according to an embodiment of this application. In a 5G network, some function network elements (for example, a mobility management entity (MME)) in a 4G network are split, and a service-based architecture is defined. In the network architecture shown in FIG. 1-A, a function similar to that of the MME in the 4G network is split into an access and mobility management function (AMF), a session management function (SMF), and the like.

The following describes some other related network elements/entities.

User equipment (UE) accesses a data network (DN) and the like by accessing an operator network, and uses a service provided by an operator or a third party in the DN.

An access and mobility management function (AMF) is a control plane network element in a 3GPP network, and is mainly responsible for access control and mobility management when UE accesses an operator network. A security anchor function (SEAF) may be deployed in the AMF, or the SEAF may be deployed in another device different from the AMF. In FIG. 1-A, an example in which the SEAF is deployed in the AMF is used.

A session management function (SMF) is a control plane network element in a 3GPP network. The SMF is mainly responsible for managing a packet data unit (PDU) session of UE. The PDU session is a channel used to transmit a PDU, and UE and a DN may send a PDU to each other by using a PDU session. The SMF is responsible for management tasks such as establishment, maintenance, and deletion of a PDU session.

A data network (DN) is also referred to as a packet data network (PDN), and is a network located outside a 3GPP network. A plurality of DNs may be connected to the 3GPP network, and a plurality of services provided by an operator or a third party may be deployed in the DN. For example, a DN is a private network of a smart factory, a sensor installed in a workshop of the smart factory plays a role of UE, and a control server of the sensor is deployed in the DN. The UE communicates with the control server. After obtaining an instruction of the control server, the UE may transfer collected data to the control server based on the instruction. For another example, a DN is an internal office network of a company, a terminal used by an employee of the company may play a role of UE, and the UE may access internal information and other resources of the company.

A unified data management network element (UDM) is also a control plane network element in a 3GPP network, and the UDM is mainly responsible for storing subscription data, a credential, a permanent identifier (SUPI), and the like of a subscriber (UE) in the 3GPP network. The data may be used for authentication and authorization when the UE accesses the operator 3GPP network.

An authentication server function (AUSF) is also a control plane network element in a 3GPP network, and the AUSF is mainly used for first-level authentication (to be specific, authentication of the 3GPP network on a subscriber of the 3GPP network).

A network exposure function (NEF) is also a control plane network element in a 3GPP network. The NEF is mainly responsible for opening an external interface of the 3GPP network to a third party in a secure manner. When a network element such as an SMF needs to communicate with a third party network element, the NEF may be used as a relay for communication. The NEF can translate internal and external identifiers when the NEF is used as the relay. For example, when an SUPI of UE is sent from the 3GPP network to the third party, the NEF may translate the SUPI into an external identity (ID) corresponding to the SUPI. In addition, when an external identity ID is sent to the 3GPP network, the NEF may translate the external identity ID into a corresponding SUPI.

A network repository function (NRF) is also a control plane network element in a 3GPP network, and is mainly responsible for storing a profile of an accessible network function (NF), and providing a network function discovery service for another network element.

A user plane function (UPF) is a gateway for communication between a 3GPP network and a DN.

A policy control function (PCF) is a control plane function in a 3GPP network, and is configured to provide a policy of a PDU session for an SMF. The policy may include charging, quality of service (QoS), an authorization-related policy, and the like.

An access network (AN) is a sub-network of a 3GPP network. To access the 3GPP network, UE needs to first pass through the AN. In a radio access scenario, the AN is also referred to as a radio access network (RAN). Therefore, terms "RAN" and "AN" are usually used in a mixed manner without differentiation.

A 3GPP network is a network that complies with a 3GPP standard. In FIG. 1-A, parts other than UE and a DN may be considered as a 3GPP network. The 3GPP network is not only limited to a 5G network defined by the 3GPP, and may further include a 2G network, a 3G network, and a 4G network. Usually, the 3GPP network is operated by an operator. In addition, N1, N2, N3, N4, N6, and the like in the architecture shown in FIG. 1-A represent reference points between related network elements/network functions. Nausf, Namf, and the like represent service-oriented interfaces of related network functions.

The following briefly describes a function of a key.

Access control plays a very important role in a cellular network, can protect spectrum resources and communication resources, and is also a premise for providing a mobile communication service for user equipment. Currently, for example, access control of a 4G network is usually based on a same root key K stored in a subscriber identity module card of UE and on a network side, where the UE and the network side may perform mutual authentication by using the root key K. After the authentication is completed, the UE and the network side each derive, based on the root key K and related parameters, an encryption key and an integration protection key of air interface data and an encryption key and an integration protection key of control signaling.

Sometimes, there is a relatively high leakage probability of the root key K. A server of a USIM (Universal Subscriber Identity Module) card vendor was intruded and a large quantity of subscriber identity module card keys were stolen. Leakage of the root key K may cause a serious security problem. For example, an attacker may initiate a passive attack to obtain, through eavesdropping on an air interface, data transmitted by related UE.

The following describes a Diffie-Hellman key.

DH key exchange (Diffie-Hellman Key Exchange) may be used to create, by exchanging information on a common channel, a shared key that can be used to ensure secure communication on the common channel. The following describes a DH key exchange process by using an example.

Referring to FIG. 1-B, Alice and Bob write a finite cyclic group G and a generator g of the finite cyclic group G, where g is public and can be seen by any attacker.

Alice selects a random natural number a and sends A ($A=g^a$ mod p) to Bob. Bob also selects a random natural number b and sends B ($B=g^b$ mod p) to Alice.

Alice calculates a DH symmetric key $K_{DH}=B^a$ mod p. Bob calculates a DH symmetric key $K_{DH}=A^b$ mod p.

Alice and Bob agree on a group element $K_{DH}=g^{ab}$ mod p at the same time, where $K_{DH}$ may be used as a shared key, mod indicates a modulo operation, and p is a prime number. (g, p) is referred to as a DH public parameter.

To resolve a problem that the root key K in the subscriber identity module card is easily leaked, the embodiments of this application provide a solution that a DH key agreement process may be added in a process of generating an encryption key and an integrity protection key (where the DH key agreement process and a 5G AKA process are integrated), so that even if an attacker obtains the root key K, it is difficult to obtain the final encryption key and integrity protection key (session key), and therefore eavesdropping on an air interface is avoided.

Therefore, the embodiments of this application discuss a specific solution of how to combine the DH key agreement process and the 5G-AKA (5G Authentication and Key Agreement) authentication process.

The following provides descriptions in some specific embodiments by using examples.

FIG. 1-C is a schematic flowchart of a communication method according to an embodiment of this application. In the example shown in FIG. 1-C, UE initiates a 5G-AKA procedure integrated with a DH agreement procedure. The communication method may include the following steps.

101: The UE sends an N1 message to a security anchor function SEAF.

The N1 message carries a DH public parameter or a DH public parameter index, the N1 message further carries an encrypted identifier SUCI of the UE, and the SUCI is obtained by encrypting a permanent identifier SUPI of the UE and a DH public key A; or the N1 message carries a DH public key A, the N1 message further carries a DH public parameter or a DH public parameter index, the N1 message further carries an SUCI of the UE, and the SUCI is obtained by encrypting an SUPI of the UE.

102: The security anchor function SEAF receives the N1 message from the UE, and the SEAF sends a first access authentication request to an authentication server function AUSF.

The first access authentication request carries the DH public parameter or the DH public parameter index. When the SUCI carried in the N1 message is obtained by encrypting the SUPI of the UE, and the DH public key A, the first access authentication request further carries the SUCI; or when the SUCI carried in the N1 message is obtained by encrypting the SUPI of the UE, the first access authentication request further carries the DH public key A and the SUCI.

103: The AUSF receives the first access authentication request from the SEAF, and the AUSF sends an authentication obtaining request to a user identity data storage management node, where the authentication obtaining request carries the SUCI.

The first access authentication request carries the DH public parameter or the DH public parameter index, the first access authentication request further carries the encrypted identifier SUCI of the UE, and the SUCI is obtained by encrypting the permanent identifier SUPI of the UE and the DH public key A; or the first access authentication request carries the SUCI of the UE and the DH public key A, the first access authentication request further carries the DH public parameter or the DH public parameter index, and the SUCI is obtained by encrypting the SUPI of the UE.

104: The AUSF receives an authentication obtaining response that is used to respond to the authentication obtaining request and that is sent by the user identity data storage management node, where the authentication obtaining response carries a 5G home network authentication vector, the authentication obtaining response further carries the DH public key A and the SUPI obtained by decrypting the SUCI, and the 5G home network authentication vector includes an expected authentication result XRES* and an AUSF key $K_{AUSF}$.

105: The AUSF calculates a DH public key B based on the DH public parameter, derives a DH symmetric key $K_{DH}$ based on the DH public key A and the DH public key B, and derives an SEAF key $K_{SEAF}$ based on the DH symmetric key $K_{DH}$ and the AUSF key $K_{AUSF}$. The AUSF calculates a 5G authentication vector based on the 5G home network authentication vector, where the 5G authentication vector includes a hashed expected authentication result HXRES*, and the HXRES* is derived based on the XRES*, the DH public key A, and the DH public key B.

106: The AUSF sends, to the SEAF, a first access authentication response used to respond to the first access authentication request, where the first access authentication response carries the 5G authentication vector.

107: After receiving the first access authentication response that is used to respond to the first access authentication request and that is sent by the AUSF, the SEAF sends, to the UE, an authentication request carrying a random number RAND. The first access authentication response carries the 5G authentication vector and the SUPI, the 5G authentication vector includes the hashed expected authentication result HXRES*, and the HXRES* is derived based on the XRES*, the DH public key A, and the DH public key B.

108: The UE receives the authentication request that carries the random number RAND and that is sent by the SEAF, and the UE sends, to the SEAF, an authentication response used to respond to the authentication request, where the authentication response carries an authentication result RES* calculated based on a root key K and the random number RAND.

It can be learned that in the foregoing solution, the N1 message carries the DH parameter, reflecting integration of the DH key agreement procedure and the 5G AKA authentication procedure. The integration of the two procedures helps reduce complexity of the DH key agreement procedure (for example, compared with a scenario in which the DH key agreement procedure and the 5G AKA authentication procedure are completely separately performed, the integration of the two procedures helps reduce the complexity of the DH key agreement procedure), and helps reduce complexity of system design.

In some possible implementations, the authentication request may further carry the DH public key B. The method may further include: The UE derives the DH symmetric key $K_{DH}$ based on the DH public parameter and the DH public key B; and the UE derives the SEAF key $K_{SEAF}$ based on $K_{DH}$ and the AUSF key $K_{AUSF}$, where the AUSF key $K_{AUSF}$ is calculated based on the root key K and the random number RAND.

If the HXRES* is derived based on the XRES*, the DH public key A, and the DH public key B, a depth of the integration of the DH key agreement procedure and the 5G AKA authentication procedure is improved, the complexity of the DH key agreement procedure is greatly reduced, and the complexity of the system design is reduced. In addition, security of the DH public key A and the DH, public key B is further improved.

FIG. 2 is a schematic flowchart of another communication method according to an embodiment of this application. In the example shown in FIG. 2, UE initiates another 5G-AKA authentication procedure integrated with a DH agreement procedure. The communication method may include the following steps.

201: The UE sends an N1 message to a security anchor function (SEAF).

The N1 message carries a DH public parameter or a DH public parameter index, the N1 message further carries an encrypted identifier SUCI of the UE, and the SUCI is obtained by encrypting a permanent identifier SUPI of the UE and a DH public key A; or the N1 message carries a DH public key A, the N1 message further carries a DH public parameter or a DH public parameter index, the N1 message further carries an SUCI of the UE, and the SUCI is obtained by encrypting an SUPI of the UE.

202: The security anchor function SEAF receives the N1 message from the UE, and the SEAF sends a first access authentication request to an authentication server function AUSF.

The first access authentication request carries the DH public parameter or the DH public parameter index. When the SUCI carried in the N1 message is obtained by encrypting the SUPI of the UE and the DH public key A, the first access authentication request further carries the SUCI; or when the SUCI carried in the N1 message is obtained by encrypting the SUPI of the UE, the first access authentication request further carries the DH public key A and the SUCI.

203: The AUSF receives the first access authentication request from the SEAF, and the AUSF sends an authentication obtaining request to a user identity data storage management node, where the authentication obtaining request carries the SUCI.

The first access authentication request carries the DH public parameter or the DH public parameter index, the first access authentication request further carries the encrypted identifier SUCI of the UE, and the SUCI is obtained by encrypting the permanent identifier SUPI of the UE and the DH public key A; or the first access authentication request carries the SUCI of the UE and the DH public key A, the first access authentication request further carries the DH public parameter or the DH public parameter index, and the SUCI is obtained by encrypting the SUPI of the UE.

204: The AUSF receives an authentication obtaining response that is used to respond to the authentication obtaining request and that is sent by the user identity data storage management node, where the authentication obtaining response carries a 5G home network authentication vector, the authentication obtaining response further carries the DH public key A and the SUPI obtained by decrypting the SUCI, and the 5G home network authentication vector includes an expected authentication result XRES* and an AUSF key $K_{AUSF}$.

205: The AUSF calculates a DH public key B based on the DH public parameter, derives a DH symmetric key $K_{DH}$ based on the DH public key A and the DH public key B, and derives an SEAF key $K_{SEAF}$ based on the DH symmetric key $K_{DH}$ and the AUSF key $K_{AUSF}$. The AUSF calculates a 5G authentication vector based on the 5G home network authentication vector, where the 5G authentication vector includes a hashed expected authentication result HXRES*, and the HXRES* is derived based on the XRES*.

206: The AUSF sends, to the SEAF, a first access authentication response used to respond to the first access authentication request, where the first access authentication response carries the 5G authentication vector.

207: After receiving the first access authentication response that is used to respond to the first access authentication request and that is sent by the AUSF, the SEAF sends, to the UE, an authentication request carrying a random number RAND. The first access authentication response may carry the 5G authentication vector and the SUPI, the 5G authentication vector includes the hashed expected authentication result HXRES*, and the HXRES* is derived based on the XRES*.

208: The UE receives the authentication request that carries the random number RAND and that is sent by the SEM, and the UE sends, to the SEAF, an authentication response used to respond to the authentication request, where the authentication response carries an authentication result RES* calculated based on a root key K and the random number RAND.

It can be learned that in the foregoing solution, the N1 message carries the DH parameter, reflecting integration of the DH key agreement procedure and the 5G AKA authentication procedure. The integration of the two procedures helps reduce complexity of the DH key agreement procedure (for example, compared with a scenario in which the DH key agreement procedure and the 5G AKA authentication procedure are completely separately performed, the integration of the two procedures helps reduce the complexity of the DH key agreement procedure), and helps reduce complexity of system design.

In some possible implementations, the authentication request may further carry the DH public key B. The method may further include: The UE derives the DH symmetric key $K_{DH}$ based on the DH public parameter and the DH public key B; and the UE derives the SEAF key $K_{SEAF}$ based on $K_{DH}$ and the AUSF key $K_{AUSF}$, where the AUSF key $K_{AUSF}$ is calculated based on the root key K and the random number RAND.

This embodiment of this application relates to some messages, for example, the authentication obtaining request, the authentication obtaining response, the access authentication request, the access authentication response, the authentication request, and the authentication response. Names of these messages are examples, and specific names of these messages may be different in different scenarios. For ease of understanding and correspondence, for example, the access authentication request mentioned in the embodiments of this application may be referred to as a Nausf_UEAuthentication_Authenticate Request the authentication obtaining request mentioned in the embodiments of this application may be referred to as a Nausf_UEAuthentication_Get Request; the access authentication response mentioned in the embodiments of this application may be referred to as a Nausf_UEAuthentication_Authenticate Response; the authentication obtaining response mentioned in the embodiments of this application may be referred to as a Nausf_UEAuthentication_Get Response; the authentication request mentioned in the embodiments of this application may be referred to as an Auth-Req, and the authentication response mentioned in the embodiments of this application may be referred to as, for example, an Auth-Resp. Certainly, in some other scenarios, names of these messages may change, and are not listed one by one herein.

In some embodiments of this application, sometimes, for ease of description, Chinese names and English names of some messages are used in a mixed manner.

Figure 3A:
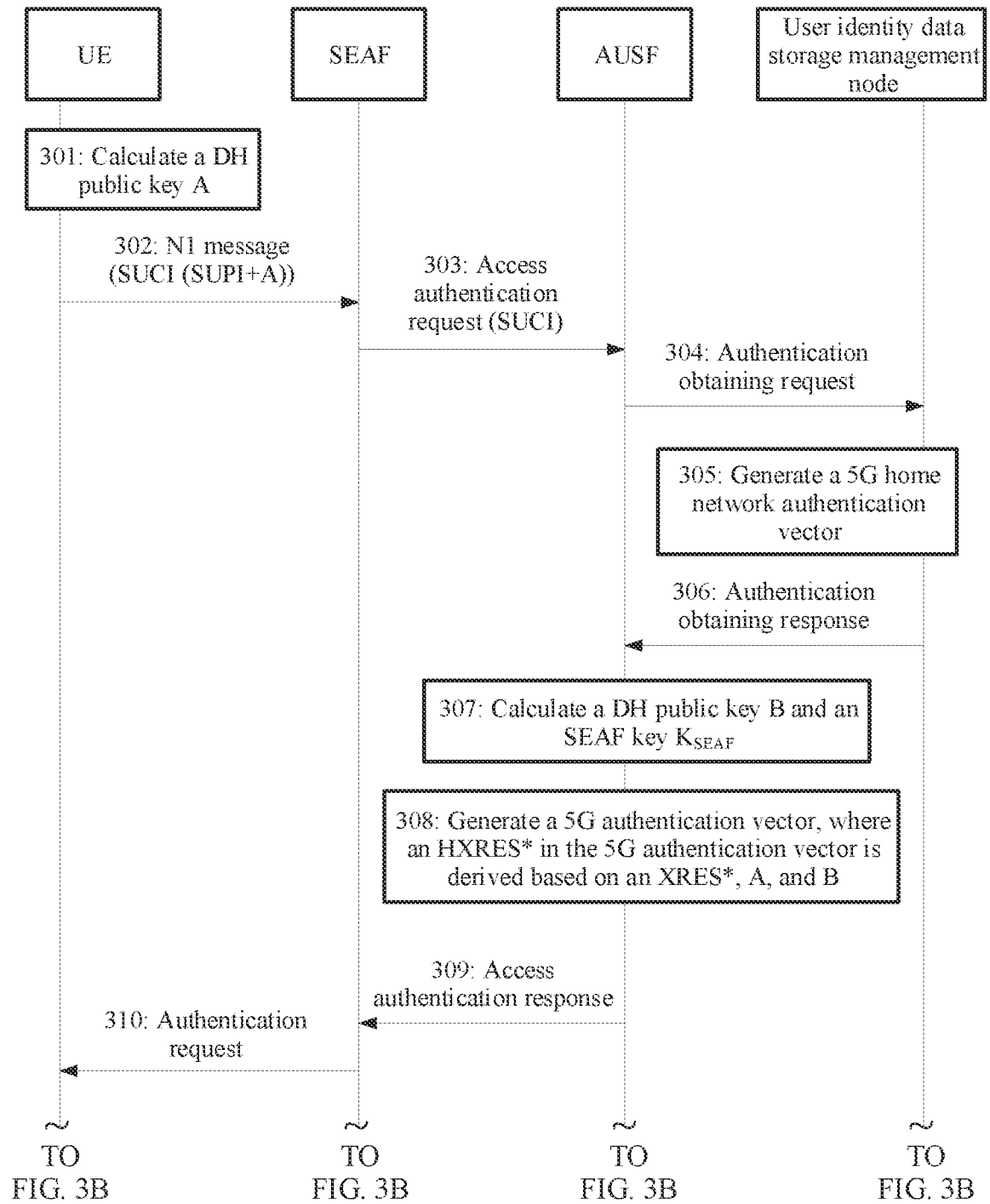
FIG. 3A and FIG. 3B are a schematic flowchart of another communication method according to an embodiment of this application.
Figure 3B:
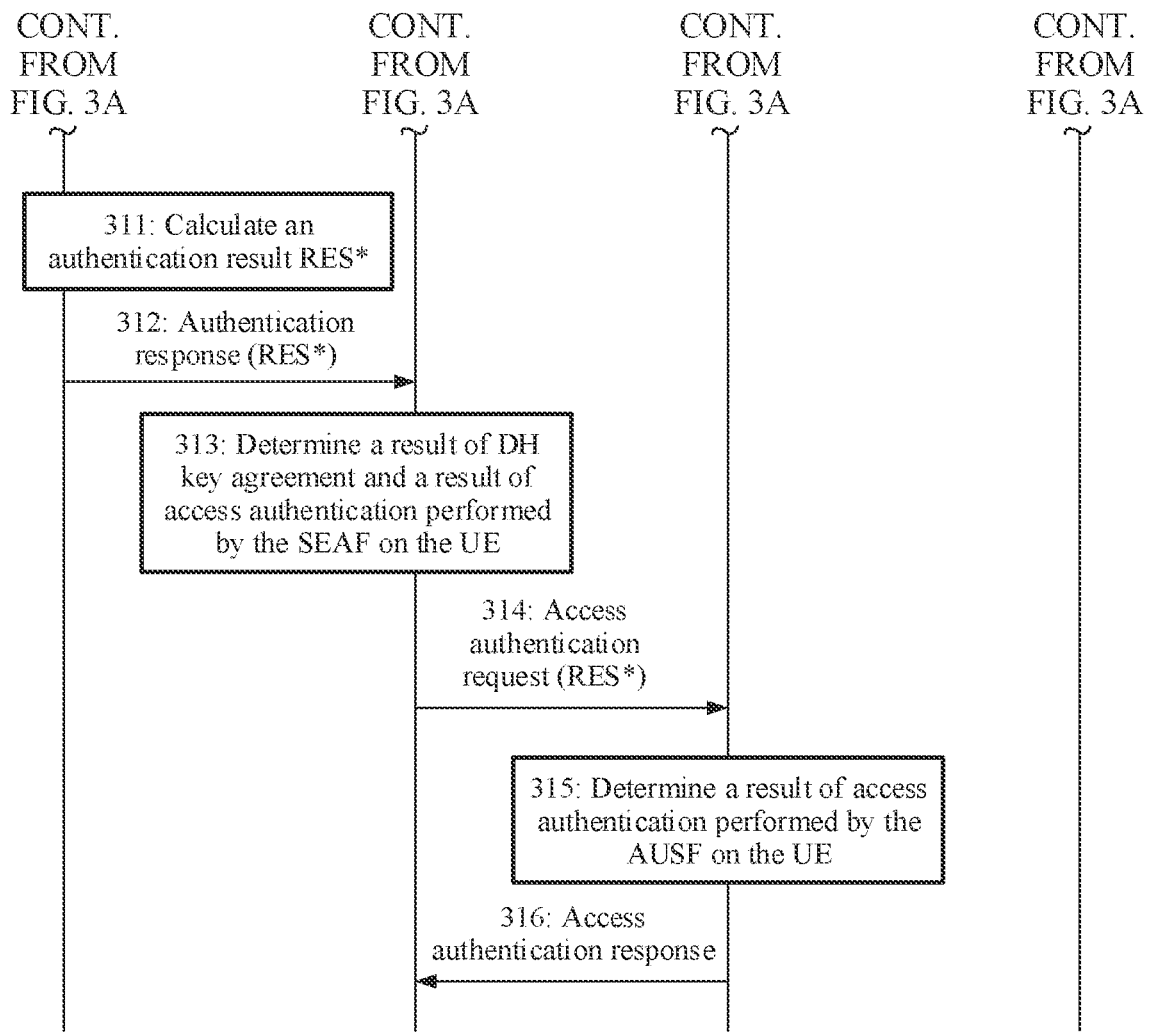

FIG. 3A and FIG. 3B are a schematic flowchart of a communication method according to an embodiment of this application. In the example shown in FIG. 3A and FIG. 3B, UE initiates a 5G-AKA procedure integrated with a DH agreement procedure. Some DH parameters are encrypted for protection. The communication method may include the following steps.

301: The UE selects a DH public parameter (g, p) and a DH private key a, and calculates a DH public key A based on the DH public parameter (g, p) and the DH private key a. For example, $A=g^a \bmod p$.

302: The UE sends an N1 message (N1 Message) to an SEAF. The N1 message carries an identifier (SUCI) encrypted by using a network side public key (identity protection public key), and the N1 message may further carry the DH public parameter (g, p) or an index. The index indicates a DH public parameter (DH Sys Parameters) index.

The DH public parameter index may be used to index to the DH public parameter (g, p). Therefore, when the UE intends to use the DH public parameter that has been shared in advance between a network side and the UE, the N1 message may carry the index rather than carrying the DH public parameter (g, p). The network side may index, based on the index, to the DH public parameter (g, p) that has been shared in advance between the network side and the UE.

In addition, the SUCI is obtained by encrypting a user identifier (SUPI) and the DH public key A by using the network side public key (where the network side public key is an identity protection public key different from a DH public key). For example, SUCI=En(SUPI∥A), where En indicates an encryption operation. A specific encryption algorithm used for the encryption operation En is not specifically limited herein in this embodiment of this application. For example, an elliptic curve integrated encryption scheme (ECIES) in TS 33.501 may be used; or certainly, another encryption algorithm may be used.

303: The SEAF sends an access authentication request to an AUSF, where the access authentication request may carry the SUCI, may further carry a serving network name (SN-name), and may further carry the DH public parameter (g, p) or the index. The SUCI carried in the access authentication request is the SUCI carried in the N1 message.

304: After receiving the access authentication request from the SEAF, the AUSF may send an authentication obtaining request (Nausf_UEAuthentication_Get Request)

to a user identity data storage management node (for example, a UDM/an ARPF/an SIDF). The authentication obtaining request may carry the SUCI, the SN-name, and the like that are from the SEAF.

305: After receiving the Nausf_UEAuthentication_Get Request from the AUSF, the user identity data storage management node decrypts the SUCI carried in the message to obtain the SUPI and the DH public key A, and generates a 5G home network authentication vector 5G HE AV) for the SUPI.

Specific steps for generating the 5G HE AV may be as follows.

A separation bit of an authentication management field (AMF) is first set to "1" (refer to TS 33.102). An AUSF key $K_{AUSF}$ and an expected authentication result XRES* that are corresponding to the SUPI are derived. Then, the 5G home network authentication vector (5G HE AV) is obtained based on a random number (RAND), an authentication token (AUTN), the expected authentication result (XRES*), and $K_{AUSF}$. For a specific method for generating the 5G HE AV, refer to a 5G-AKA part in TS 33.501.

306: The user identity data storage management node sends an authentication obtaining response to the AUSF, where the authentication obtaining response may carry (5G HE AV, SUPI, DH public key A, [DH public parameter]), and content in the symbol [ ] is selectively sent based on a requirement. For example, the content may be sent when the UE and the network side (for example, the SIDF) determine to use the DH public parameter that has been shared in advance. If the N1 message sent by the UE carries the DH public parameter (g, p), the foregoing message may not carry the DH public parameter. The authentication obtaining response may be referred to as, for example, a Nausf_UEAuthentication_Get Response.

307: The AUSF receives the authentication obtaining response, stores the XRES* in the 5G HE AV and the SUPI that are carried in the authentication obtaining response, and may store $K_{AUSF}$.

The AUSF selects a DH private key b, and then calculates a DH public key B based on the DH public parameter. For example, $B=g^b$ mod p. Then, the AUSF derives a DH symmetric key $K_{DH}$ based on the DH public key A obtained by the SIDF through decryption and the DH private key b. For example, $K_{DH}=A^b$ mod p. The AUSF further derives an SEAF key $K_{SEAF}$. For example, $K_{SEAF}=KDF(K_{DH}, K_{AUSF})$, where KDF indicates a key derivation function.

308: The AUSF calculates a 5G authentication vector (5G AV) based on the 5G HE AV (5G home network authentication vector) received from the user identity data storage management node. For example, a method for calculating the 5G AV based on the 5G HE AV may include: replacing the XRES* (expected authentication result) and $K_{AUSF}$ in the 5G HE AV with an HXRES* (hashed expected authentication result) and $K_{SEAF}$. For example, HXRES*=KDF (XRES*, A, B), where KDF indicates a key derivation function.

309: The AUSF sends an access authentication response to the SEAF, where the access authentication response carries, for example, the 5G AV, the SUPI, the DH public key A, and the DH public key B. The 5G AV includes (RAND, AUTN, HXRES*, $K_{SEAF}$). The access authentication response in this step may be referred to as, for example, a Nausf_UEAuthentication_Authenticate Response.

310: The SEAF sends an authentication request (Auth-Req) to the UE, where the Auth-Req may carry the RAND, the AUTN, a key selection indication (ngKSI), [a DH public key A], and a DH public key B. The ngKSI is used by the UE and an AMF to identify $K_{AMF}$ and correspond to a security context.

311: After receiving the Auth-Req from the SEAF, when the Auth-Req carries the DH public key A, the UE may first compare the DH public key A carried in the Auth-Req with the DH public key A calculated by the UE in step 301. If the two are the same, it may indicate that the DH public key A is not tampered with on the network side, and the procedure may continue. If the two are different, it may indicate that the DH public key A is tampered with on the network side. In this case, the UE may directly stop the procedure, or the UE may notify, to the SEAF by using a notification message, that the DH public key A is tampered with. Certainly, if the Auth-Req does not carry the DH public key A, the foregoing DH public key A comparison process is not performed.

The UE calculates an authentication result (RES*) and the AUSF key $K_{AUSF}$ based on a root key K, the RAND, and the like. In addition, the UE may derive the DH symmetric key $K_{DH}$ based on the received DH public key B of the network side and the DH public parameter. For example, $K_{DH}=B^a$ mod p.

Then, the UE derives the SEAF key $K_{SEAF}$ based on $K_{DH}$ and $K_{AUSF}$. For example, $K_{SEAF}=KDF(K_{DH}, K_{AUSF})$. The SEAF key $K_{SEAF}$ is subsequently used to derive a session key.

312: The UE sends an authentication response (Auth-Resp) to the SEAF, where the Auth-Resp carries, for example, the RES*, and the Auth-Resp may further carry the DH public key B and the like.

313: After receiving the Auth-Resp, when the Auth-Resp carries the DH public key B, the SEAF may first compare the DH public key B carried in the Auth-Resp with the DH public key B carried in the UE access authentication response received by the SEAF in step 309. If the two are the same (indicating, for example, that the DH public key B is not tampered with), the procedure may continue. If the two are different (indicating, for example, that the DH public key B may be tampered with), the SEAF may directly stop the procedure, or the SEAF may notify, to the UE by using a notification message, that the DH public key B is tampered with. Certainly, if the Auth-Resp does not carry the DH public key B, the foregoing DH public key B comparison process is not performed.

The SEAF calculates a hashed authentication result HRES* based on the previously received DH public key A (where the DH public key A may be sent by the AUSF to the SEAF) and based on the RES* and the DH public key B (where the DH public key B may also come from the AUSF) that are carried in the Auth-Resp. For example, HRES*=KDF(RES*, A, B).

Then, the SEAF compares a value of the hashed authentication result HRES* with a value of the hashed expected authentication result HXRES*. If the value of the HRES* is consistent with the value of the HXRES*, the SEAF determines that access authentication performed by the SEAF on the UE succeeds, and determines that DH key agreement succeeds. Otherwise, the SEAF determines that access authentication performed by the SEAF on the UE fails, and determines that DH key agreement fails.

314: When determining that the access authentication performed by the SEAF on the UE succeeds and determining that the DH key agreement succeeds, the SEAF sends, to the AUSF, a second access authentication request carrying the RES*, where the message may further carry the corresponding SUCI or SUPI. When considering that the access authentication on the UE fails and the DH key agreement fails, the SEAF may directly notify, to the UE, that the access authentication fails and the DH key agreement fails.

315: After receiving the second access authentication request, the AUSF compares whether the received authentication result RES* is consistent with the previously stored expected authentication result XRES*. If the RES* is consistent with the XRES*, the AUSF determines that access authentication performed by the AUSF on the UE succeeds. If the RES* is inconsistent with the XRES*, the AUSF determines that access authentication performed by the AUSF on the UE fails.

316: The AUSF sends a second access authentication response to the SEAF, where the second access authentication response is used to notify that the access authentication performed by the AUSF on the UE succeeds. The SEAF may further notify, to the UE, that the access authentication succeeds.

If the second access authentication request sent by the SEAF to the AUSF in step 314 carries the SUCI, the AUSF may include the SUPI in the second access authentication response that is used to respond to the second access authentication request and that is sent to the SEAF.

It can be learned that in the foregoing solution, the UE initiates the 5G-AKA procedure integrated with the DH agreement procedure, where the DH key agreement procedure and the 5G AKA authentication procedure are integrated. Integration of the two procedures helps reduce complexity of the DH agreement procedure (for example, compared with a scenario in which the DH key agreement procedure and the 5G AKA authentication procedure are completely separately performed, the integration of the two procedures helps reduce the complexity of the DH key agreement procedure), and helps reduce complexity of system design. In addition, the HXRES* is derived based on the XRES*, the DH public key A, and the DH public key B. Therefore, a depth of the integration of the DH key agreement procedure and the 5G AKA authentication procedure is improved, the complexity of the DH key agreement procedure is greatly reduced, and the complexity of the system design is further reduced. In addition, security of the DH public key A and the DH public key B is further improved.

Figure 4A:
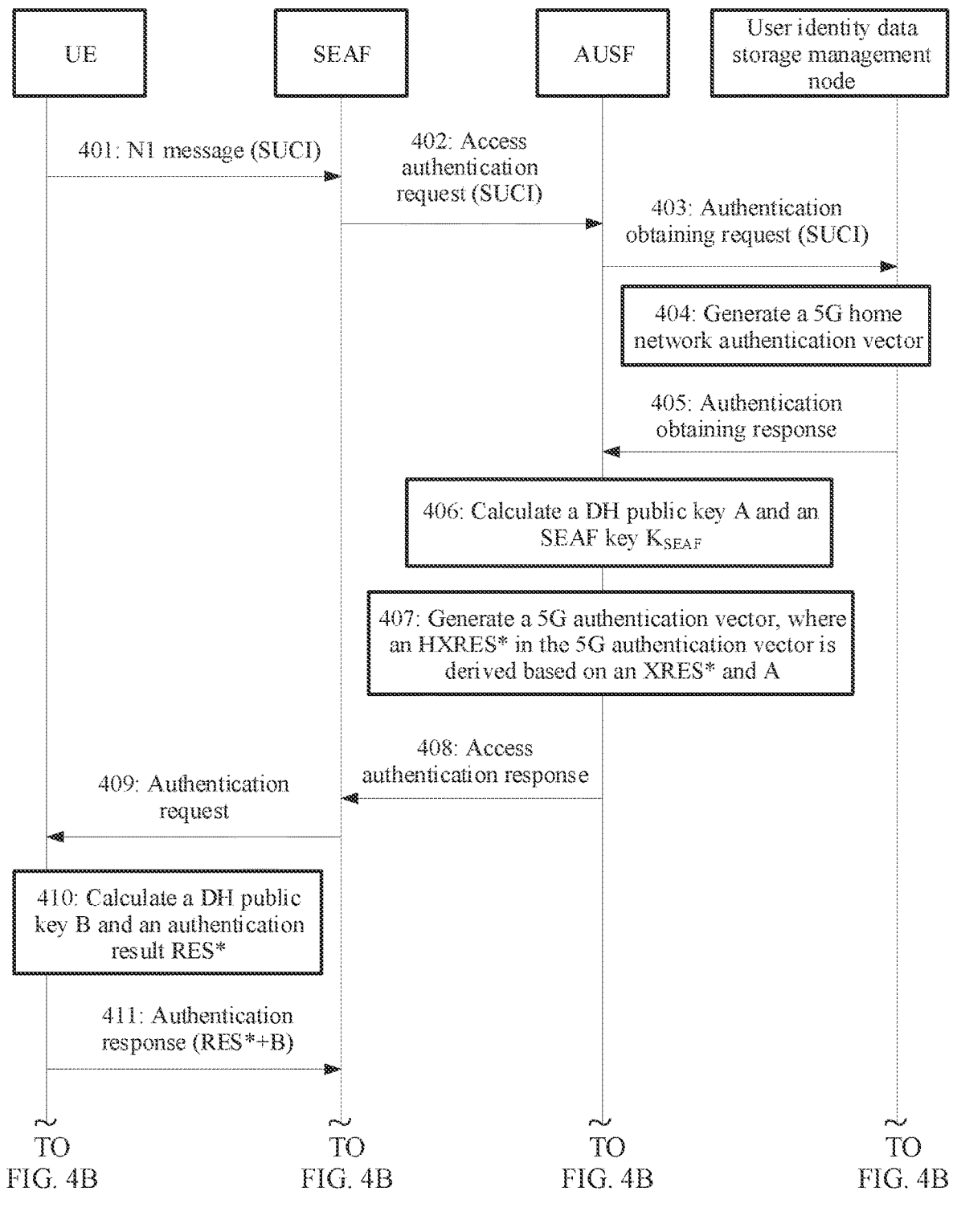
FIG. 4A and FIG. 4B are a schematic flowchart of another communication method according to an embodiment of this application.
Figure 4B:
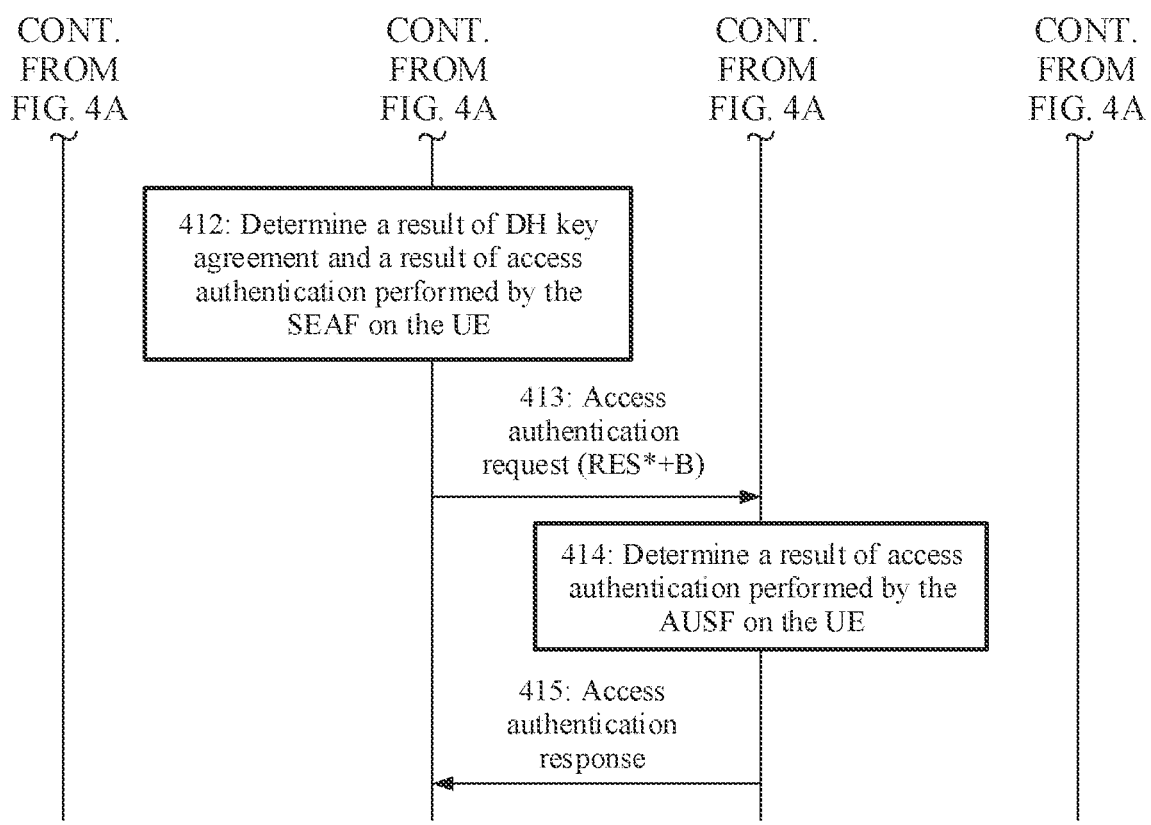

FIG. 4A and FIG. 4B are a schematic flowchart of a communication method according to an embodiment of this application. In the example shown in FIG. 4A and FIG. 4B, an AUSF initiates a 5G-AKA procedure integrated with a DH agreement procedure. Some DH parameters are encrypted for protection. The communication method may include the following steps.

401: UE sends an N1 message (N1 Message) to an SEAF, where the N1 message carries an SUCI. The SUCI is obtained by encrypting an SUPI by using a network side public key (where the network side public key is a user identity encryption public key different from a DH public key). For example, SUCI=En(SUPI), where En indicates an encryption operation. A specific encryption algorithm used for the encryption operation is not limited herein. For example, an ECIES in TS 33.501 may be used, or another encryption algorithm may be used.

402: The SEAF sends a Nausf_UEAuthentication_Authenticate Request to the AUSF, where the message may carry (SUCI, SN-name) and the like.

403: After receiving the Nausf_UEAuthentication_Authenticate Request, the AUSF sends a Nausf_UEAuthentication_Get Request to a user identity data storage management node (for example, a UDM/an ARPF/an SIDF). The message may carry (SUCI, SN-name).

404: After receiving the Nausf_UEAuthentication_Get Request, the user identity data storage management node decrypts the SUCI carried in the message to obtain the SUPI. The user identity data storage management node generates a 5G home network authentication vector (5G HE AV) for the SUPI obtained by decrypting the SUCI.

Specific steps for generating the 5G home network authentication vector may be as follows.

The user identity data storage management node may first set a separation bit of an authentication management field (AMF) to "1" (refer to TS 33.102). The user identity data storage management node derives a key $K_{AUSF}$ and an XRES* that are corresponding to the SUPI. Then, the user identity data storage management node obtains the authentication vector 5G HE AV based on a RAND, an AUTN, the XRES*, and $K_{AUSF}$. For a specific method for generating the authentication vector, refer to a 5G-AKA part in TS 33.501.

405: The user identity data storage management node sends an authentication obtaining response to the AUSF.

The Nausf_UEAuthentication_Get Response may carry (5G HE AV, [SUPI]), and content in the symbol [ ] may be carried only when the user identity data storage management node obtains the SUCI from the AUSF. If the user identity data storage management node obtains the SUPI from the AUSF, the SUPI may not be carried.

406: The AUSF stores the received XRES* and SUPI, and may store $K_{AUSF}$.

The AUSF selects a DH public parameter (g, p) and a DH private key a, and then calculates a DH public key A based on the DH public parameter (g, p) and the DH private key a. For example, $A=g^a \mod p$.

Further, the AUSF derives a key $K_{\_SEAF}$. For example, $K_{\_SEAF}=KDF(K_{AUSF})$.

407: The AUSF calculates a 5G AV based on the 5G HE AV received from the user identity data storage management node.

For example, a method for calculating the 5G AV based on the 5G HE AV may include: replacing the XRES* and $K_{AUSF}$ in the 5G HE AV with an HXRES* and $K_{\_SEAF}$. HXRES*=KDF(XRES*, A).

408: The AUSF sends a Nausf_UEAuthentication_Authenticate Response to the SEAF, where the message may carry, for example, (5G AV, SUPI, A), and the 5G AV includes (RAND, AUTN, HXRES*, $K_{\_SEAF}$).

409: The SEAF sends an authentication request (Auth-Req) to the UE, where the Auth-Req carries (RAND, AUTN, ngKSI, A). The ngKSI is used by the UE and an AMF to identify $K_{AMF}$ and correspond to a security context.

410: After receiving, from the SEAF, the Auth-Req that carries the RAND and the AUTN, the UE calculates an RES* and the AUSF key $K_{AUSF}$ based on a root key K of the UE, the RAND, and the like.

The UE further selects a DH private key b, and calculates a DH public key B of the UE based on the DH public parameter and the DH private key b. For example, the DH public key $B=g^b \mod p$.

In addition, the UE derives a DH symmetric key $K_{DH}$ based on the received DH public key A of a network side and the private key b of the UE. For example, $K_{DH}=A^b \mod p$.

Then, the UE derives the key $K_{\_SEAF}$ based on $K_{DH}$ and $K_{AUSF}$. For example, $K_{\_SEAF}=KDF(K_{DH}, K_{AUSF})$.

Then, the UE derives a key $K_{SEAF}$ based on $K_{DH}$ and $K_{\_SEAF}$. For example, $K_{SEAF}=KDF(K_{DH}, K_{\_SEAF})$.

411: The UE sends an Auth-Resp to the SEAF, where the Auth-Resp carries, for example, the RES*, the DH public key A, and the encrypted DH public key B. The DH public key B may be specifically encrypted by using the derived $K_{\_SEAF}$, for example, may be represented as En(B, $K_{\_SEAF}$).

412: After receiving the Auth-Resp, the SEAF calculates an HRES* based on the previously received DH public key A (for example, the DH public key A is sent by the AUSF to the SEAF) and the RES* carried in the Auth-Resp, and then compares a value of the HRES* and a value of the HXRES*. If the value of the HRES* is consistent with the value of the HXRES*, the SEAF determines that DH agreement succeeds and access authentication performed by the SEAF on the UE succeeds. Otherwise, the SEAF determines that DH agreement succeeds and access authentication performed by the SEAF on the UE fails.

In addition, the SEAF may further decrypt the encrypted DH public key B based on $K_{\_SEAF}$ ($K_{\_SEAF}$ in the 5G AV), to obtain the DH public key B through decryption.

413: The SEAF sends a Nausf_UEAuthentication_Authenticate Request to the AUSF, where the message may carry the RES* and the DH public key B, and may further carry a DH public key A.

414: After the AUSF receives the Nausf_UEAuthentication_Authenticate Request, when the Auth-Resp carries the DH public key A, the SEAF may first compare the DH public key A carried in the Nausf_UEAuthentication_Authenticate Request with the DH public key A derived by the SEAF in step 406. If the two are the same, it may indicate that the DH public key A is not tampered with, and the procedure may continue. If the two are different, it may indicate that the DH public key A is tampered with. In this case, the AUSF may directly stop the procedure, or the SEAF may notify, to the SEAF and the UE by using notification messages, that the DH public key A is tampered with. Certainly, if the Auth-Resp does not carry the DH public key A, the foregoing DH public key A comparison process is not performed.

The AUSF compares whether the received RES* is consistent with the previously stored XRES*. If the RES* is consistent with the XRES*, the AUSF determines that access authentication performed by the AUSF on the UE succeeds.

The AUSF derives the DH symmetric key $K_{DH}$ based on the received DH public key B. For example, $K_{DH}=B^a$ mod p.

In addition, the AUSF derives the key $K_{SEAF}$ based on the symmetric key $K_{DH}$ and $K_{AUSF}$. For example, $K_{SEAF}$=KDF ($K_{DH}$, $K_{AUSF}$).

415: The AUSF sends a Nausf_UEAuthentication_Authenticate Response to the SEM, to notify that the access authentication on the UE succeeds, where the message may carry the new key $K_{SEAF}$ derived in step 414, and $K_{SEAF}$ may be used to derive a session key.

It can be learned that in the foregoing solution, the AUSF initiates the 5G-AKA procedure integrated with the DH agreement procedure, where the DH key agreement procedure and the 5G AKA authentication procedure are integrated. Integration of the two procedures helps reduce complexity of the DH key agreement procedure (for example, compared with a scenario in which the DH key agreement procedure and the 5G AKA authentication procedure are completely separately performed, the integration of the two procedures helps reduce the complexity of the DH key agreement procedure), and helps reduce complexity of system design. In addition, the HXRES* is derived based on the XRES* and the DH public key A. Therefore, a depth of the integration of the DH key agreement procedure and the 5G AKA authentication procedure is further improved, the complexity of the DH key agreement procedure is greatly reduced, and the complexity of the system design is further reduced. In addition, security of the DH public key A is further improved.

Figure 5:
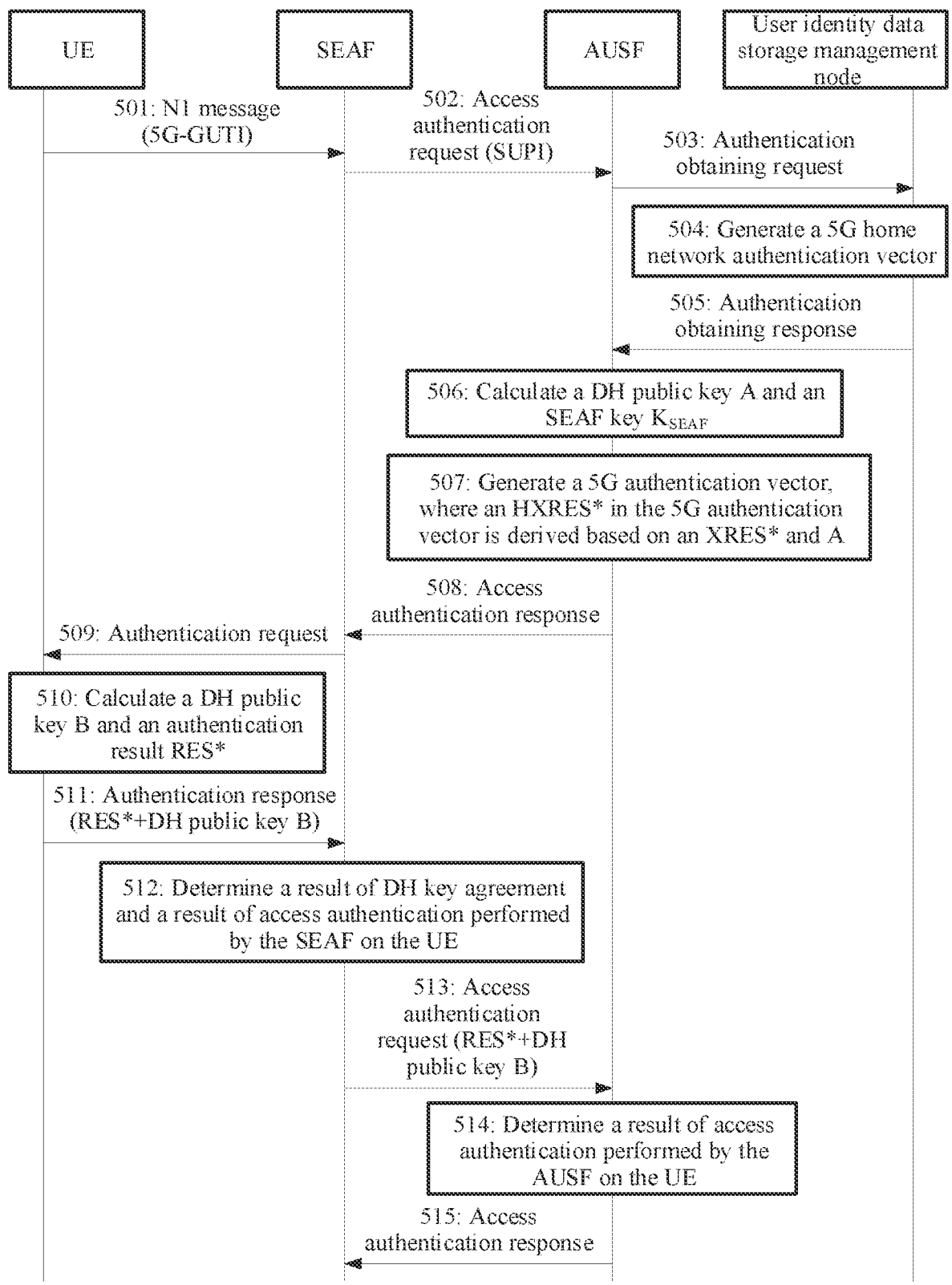
FIG. 5 is a schematic flowchart of another communication method according to an embodiment of this application.

FIG. 5 is a schematic flowchart of a communication method according to an embodiment of this application. In the example shown in FIG. 5, an AUSF initiates another 5G-AKA procedure integrated with a DH agreement procedure. Some DH parameters are encrypted for protection. The communication method may include the following steps.

501: UE sends an N1 message (N1 Message) to an SEAF, where the N1 message carries a 5G globally unique temporary identity (5G-GUTI) of the UE. The 5G-GUTI is a temporary user identity issued by a network side to the UE.

502: The SEAF sends a Nausf_UEAuthentication_Authenticate Request to the AUSF, where the message may carry (SUPI, SN-name). If the N1 message sent by the UE in step 501 carries the 5G-GUTI, in this step, the SEAF may first find, based on the 5G-GUTI, the SUPI corresponding to the 5G-GUTI (for example, the SEAF prestores the SUPI), and include the SUPI in the message sent to the AUSF.

503: After receiving the Nausf_UEAuthentication_Authenticate Request, the AUSF sends a Nausf_UEAuthentication_Get Request to a user identity data storage management node (for example, a UDM/an ARPF/an SiDF).

The message may carry (SUPI, SN-name). If the message sent by the SEAF to the AUSF in step 502 carries the SUPI, in this step, the message sent by the AUSF to the user identity data storage management node also carries the SUPI that is from the SEAF.

504: After receiving the Nausf_UEAuthentication_Get Request, the user identity data storage management node generates a 5G home network authentication vector (5G HE AV) for the SUPI carried in the Nausf_UEAuthentication_Get Request.

Specific steps for generating the 5G home network authentication vector may be as follows.

The user identity data storage management node may first set a separation bit of an authentication management field (AMF) to "1" (refer to TS 33.102). The user identity data storage management node derives a key KA-USF and an XRES* that are corresponding to the SUPI. Then, the user identity data storage management node obtains the authentication vector 5G HE AV based on a RAND, an AUTN, the XRES*, and $K_{AUSF}$. For a specific method for generating the authentication vector, refer to a 5G-AKA part in TS 33.501.

505: The user identity data storage management node sends an authentication obtaining request to the AUSF, where the authentication obtaining request may carry (5G HE AV).

506: After receiving the authentication obtaining request, the AUSF stores the XRES*, the SUPI, and the like carried in the authentication obtaining request, and may store $K_{AUSF}$.

The AUSF selects a DH public parameter (g, p) and a DH private key a, and then calculates a DH public key A based on the DH public parameter (g, p) and the DH private key a. For example, $A=g^a$ mod p.

Further, the AUSF derives a key $K_{\_SEAF}$. For example, $K_{\_SEAF}$=KDF($K_{AUSF}$).

507: The AUSF calculates a 5G AV based on the 5G HE AV received from the UDM/ARPF.

For example, a method tier calculating the 5G AV based on the 5G HE AV may include: replacing the XRES* and $K_{AUSF}$ in the 5G HE AV with an HXRES* and $K_{\_SEAF}$. HXRES*=KDF(XRES*, A).

508: The AUSF sends a Nausf_UEAuthentication_Authenticate Response to the SEAF, where the message may carry, for example, (5G AV, SUPI, A), and the 5G AV includes (RAND, AUTN, HXRES*, $K_{\_SEAF}$).

509: The SEAF sends an authentication request (Auth-Req) to the UE, where the Auth-Req carries (RAND, AUTN, ngKSI, A). The ngKSI is used by the UE and an AMF to identify $K_{AMF}$ and correspond to a security context.

510: After receiving, from the SEAF, the Auth-Req that carries the RAND and the AUTN, the UE calculates an RES* and $K_{AUSF}$ based on a root key K of the UE, the RAND, and, the like.

The UE further selects a DH private key b, and calculates a DH public key B of the UE based on the DH public parameter and the DH private key b. For example, the DH public key $B=g^b$ mod p.

In addition, the UE derives a DH symmetric key $K_{DH}$ based on the received DH public key A of the network side and the private key b of the UE. For example, $K_{DH}=A^b$ mod p.

Then, the UE derives the key $K_{SEAF}$ based on $K_{DH}$ and $K_{AUSF}$. For example, $K_{\_SEAF}=KDF(K_{DH}, K_{\_SEAF})$.

Then, the UE derives a key $K_{SEAF}$ based on $K_{DH}$ and $K_{\_SEAF}$. For example, $K_{SEAF}=KDF(K_{DH}, K_{\_SEAF})$.

511: The UE sends an Auth-Resp to the SEAF, where the Auth-Resp carries, for example, the RES*, the DH public key A, and the encrypted DH public key B. The DH public key B may be specifically encrypted by using the derived $K_{\_SEAF}$, for example, may be represented as En(B, $K_{\_SEAF}$).

512: After receiving the Auth-Resp, the SEAF calculates an HRES* based on the previously received DH public key A (for example, the DH public key A is sent by the AUSF to the SEAF) and the RES* carried in the Auth-Resp, and then compares a value of the HRES* and a value of the HXRES*. If the value of the HRES* is consistent with the value of the HXRES*, the SEAF determines that access authentication performed by the SEAF on the UE succeeds and DH agreement succeeds. Otherwise, the SEAF determines that access authentication performed by the SEAF on the UE fails and DH agreement fails.

In addition, the SEAF may decrypt the encrypted DH public key B based on $K_{\_SEAF}$, to obtain the DH public key B through decryption.

513: The SEAF sends a second access authentication request to the AUSF, where the message may carry the RES* and the DH public key B, and may further carry a DH public key A.

514: After the AUSF receives the second access authentication request, when the Auth-Resp carries the DH public key A, the SEAF may first compare the DH public key A carried in the Nansf_UEAuthentication_Authenticate Request with the DH public key A derived by the SEAF in step 506. If the two are the same, it may indicate that the DH public key A is not tampered with, and the procedure may continue. If the two are different, it may indicate that the DH public key A is tampered with. In this case, the AUSF may directly stop the procedure, or the SEAF may notify, to the SEAF and the UE by using notification messages, that the DH public key A is tampered with. Certainly, if the Auth-Resp does not carry the DH public key A, the foregoing DH public key A comparison process is not performed.

The AUSF compares whether the received RES* is consistent with the previously stored XRES*. If the RES* is consistent with the XRES*, the AUSF considers that access authentication on the UE succeeds.

The AUSF derives the DH symmetric key $K_{DH}$ based on the received DH public key B. For example, $K_{DH}=B^a$ mod p.

In addition, the AUSF derives the key $K_{SEAF}$ based on the symmetric key $K_{DH}$ and $K_{AUSF}$. For example, $K_{SEAF}=KDF(K_{DH}, K_{AUSF})$.

515: The AUSF sends a second access authentication response to the SEAF, to notify that the access authentication on the UE succeeds, where the message may carry the new key $K_{SEAF}$ derived in step 514, and $K_{SEAF}$ may be used to derive a session key.

It can be learned that in the foregoing solution, the AUSF initiates the 5G-AKA procedure integrated with the DH agreement procedure, where the DH key agreement procedure and the 5G AKA authentication procedure are integrated. Integration of the two procedures helps reduce complexity of the DH key agreement procedure (for example, compared with a scenario in which the DH key agreement procedure and the 5G AKA authentication procedure are completely separately performed, the integration of the two procedures helps reduce the complexity of the DH key agreement procedure), and helps reduce complexity of system design. In addition, the HXRES* is derived based on the XRES* and the DH public key A. Therefore, a depth of the integration of the DH key agreement procedure and the 5G AKA authentication procedure is further improved, the complexity of the DH key agreement procedure is greatly reduced, and the complexity of the system design is further reduced. In addition, security of the DH public key A is further improved.

Figure 6A:
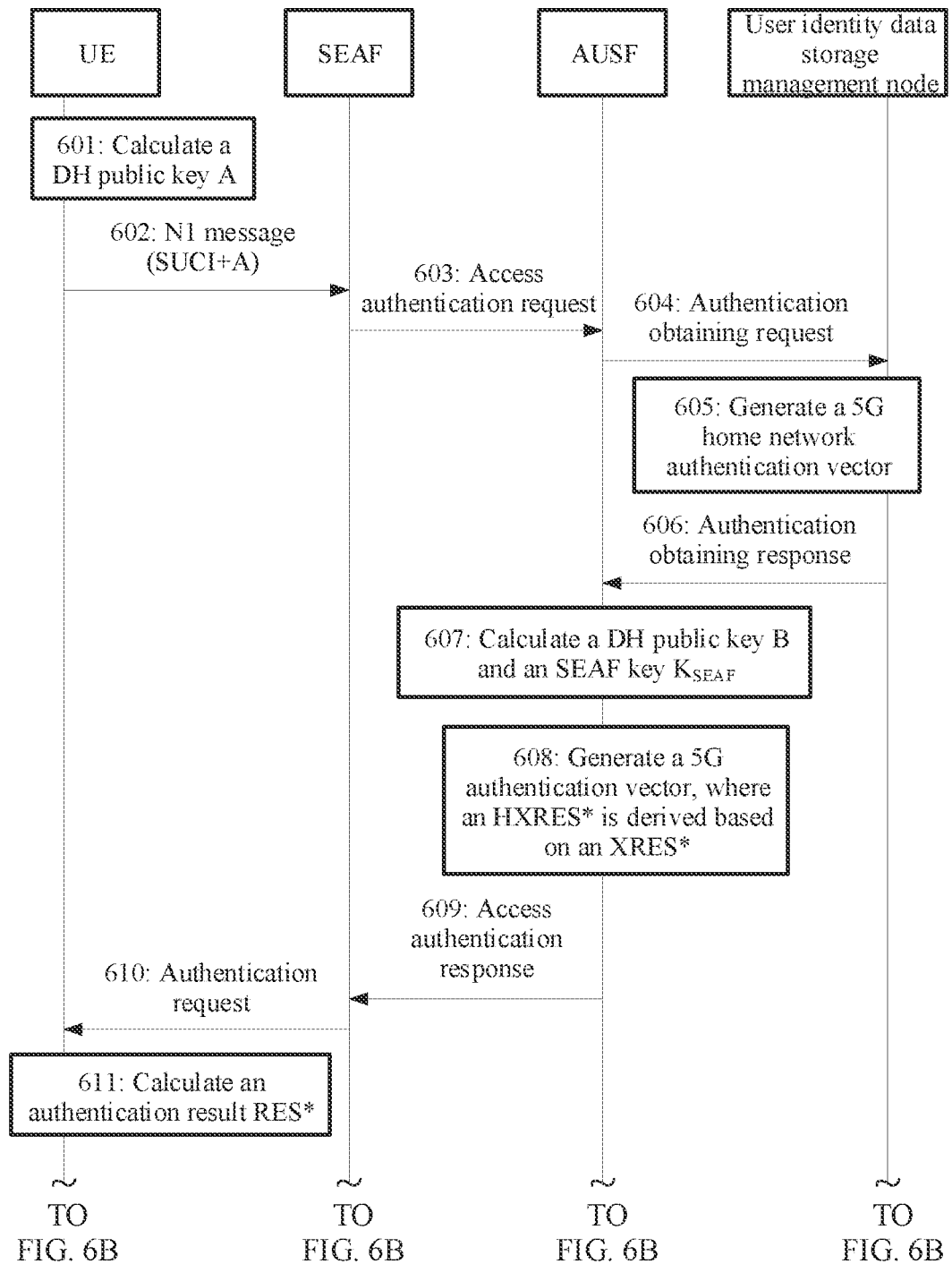
FIG. 6A and FIG. 6B are a schematic flowchart of another communication method according to an embodiment of this application.
Figure 6B:
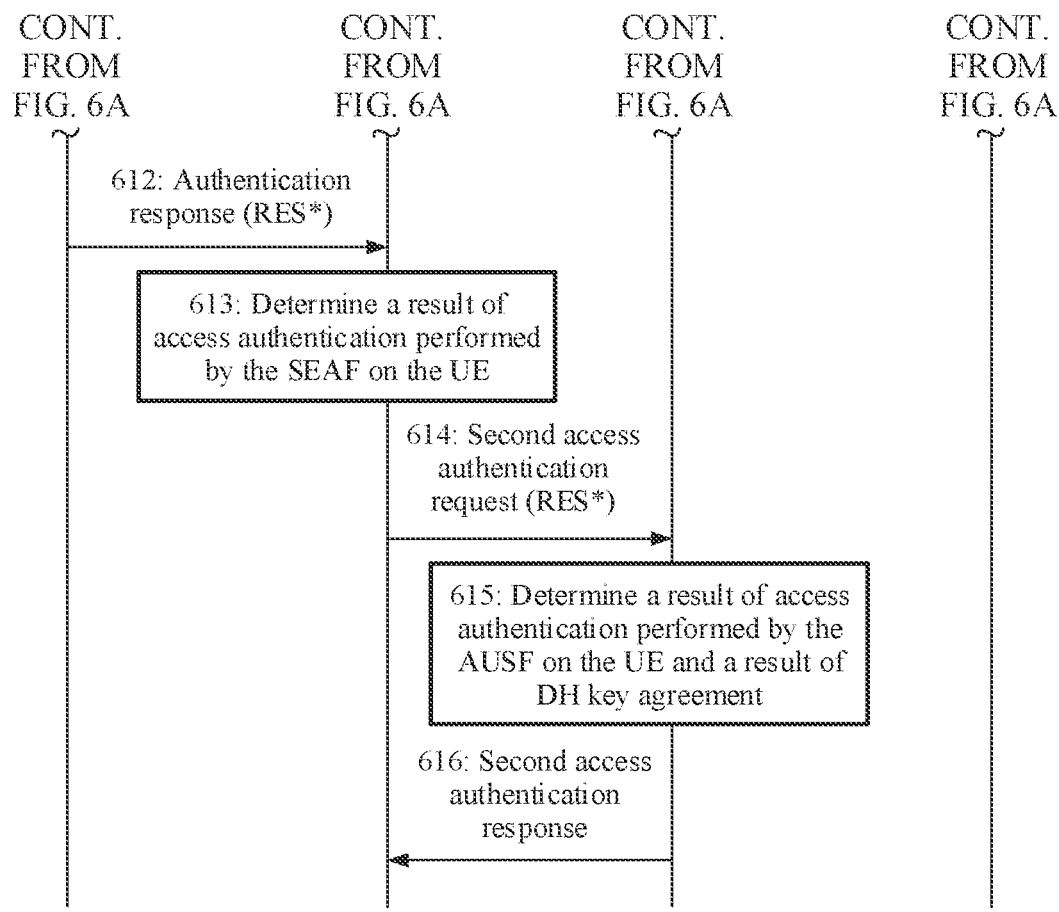

FIG. 6A and FIG. 6B are a schematic flowchart of a communication method according to an embodiment of this application. In the example shown in FIG. 6A and FIG. 6B, UE initiates a 5G-AKA procedure integrated with a DH agreement procedure. Some DH parameters are not encrypted for protection. The communication method may include the following steps.

601: The UE selects a DH public parameter (g, p) and a DH private key a, and calculates a DH public key A based on the DH public parameter (g, p) and the DH private key a. For example, $A=g^a$ mod p.

602: The UE sends an N1 message to an SEAF. The N1 message may carry an SUCI, may further carry the DH public parameter (g, p) or an index, and may further carry the DH public key A.

The index indicates a DH public parameter index.

The DH public parameter index may be used to index to the DH public parameter (g, p). Therefore, when the UE intends to use the DH public parameter that has been shared in advance between a network side and the UE, the N1 message may carry the index rather than carrying the DH public parameter (g, p). The network side may index, based on the index, to the DH public parameter (g, p) that has been shared in advance between the network side and the UE.

In addition, the SUCI may be obtained by encrypting a user identifier (SUPI) by using a network side public key (where the network side public key is an identity protection public key different from a DH public key). Specifically, for example, SUCI=En(SUPI), where En indicates an encryption operation. A specific encryption algorithm used for the encryption operation En is not specifically limited herein in this embodiment of this application. For example, an elliptic curve integrated encryption scheme (ECIES) in TS 33.501 may be used; or certainly, another encryption algorithm may be used for the encryption operation En herein.

603: The SEAF sends a Nausf_UEAuthentication_Authenticate Request to an AUSF, where the message may carry (SUCI, A, SN-name, (g, p) or index).

604: After receiving the Nausf_UEAuthentication_Authetiticate Request, the AUSF sends a Nausf_UEAuthentication_Get Request to a user identity data storage management node (for example, a UDM/an ARPF/an SIDF). The Nausf_UEAuthentication_Get Request carries (SUCI, SN-name, (g, p) or index). When the AUSF intends to use the DH public parameter (g, p) that has been shared in advance between the network side and the UE, the Nausf_UEAuthentication_Get Request may carry the index used to index to the DH public parameter (g, p) rather than carrying the DH public parameter (g, p).

605: After receiving the Nausf_UEAuthentication_Get Request from the AUSF, the user identity data storage management node decrypts the SUCI carried in the message to obtain the SUPI, and generates a 5G home network authentication vector (5G HE AV) for the SUPI.

Specific steps for generating the 5G HE AV may be as follows. A separation bit of an authentication management field (AMF) is first set to "1" (refer to TS 33.102). A key $K_{AUSF}$ and, an expected authentication result XRES* that are corresponding to the SUPI are derived. Then, the 5G HE AV is obtained based on a random number (RAND), an authentication token (AUTN), the expected authentication result (XRES*), and $K_{AUSF}$. For a specific method for generating the 5G HE AV, refer to a 5G-AKA part in TS 33.501.

606: The user identity data storage management node sends an authentication obtaining response to the AUSF. The authentication obtaining response may carry (5G HE AV, [SUPI], [DH public parameter]), and content in the symbol [ ] may be selectively sent based on a requirement. For example, the content is sent when the UE and the network side (for example, the SIDF) determine to use the DH public parameter that has been shared in advance. For example, if the N1 message sent by the UE carries the DH public parameter (g, p), the authentication obtaining response may not carry the DH public parameter.

607: The AUSF receives the authentication obtaining response, stores the XRES* in the 5G HE AV and the SUPI that are carried in the authentication obtaining response, and may store $K_{AUSF}$.

The AUSF selects a DH private key b, and then calculates a DH public key B based on the DH public parameter. For example, $B=g^b$ mod p. Then, the AUSF derives a symmetric key $K_{DH}$ based on the DH private key b and the DH public key A. For example, $K_{DH}=A^b$ mod p.

The AUSF further derives a key $K_{SEAF}$. For example, $K_{SEAF}=KDF(K_{DH}, K_{AUSF})$, where KDF indicates a key derivation function.

608: The AUSF calculates a 5G authentication vector (5G AV) based on the 5G HE AV (5G home network authentication vector) received from the user identity data storage management node. For example, a method for calculating the 5G AV based on the 5G HE AV may include: replacing the XRES* (expected authentication result) and $K_{AUSF}$ in the 5G HE AV with an HXRES* (hashed expected authentication result) and $K_{SEAF}$. Specifically, for example, HXRES*=KDF(XRES*).

609: The AUSF sends a UE access authentication response to the SEAF, where the UE access authentication response carries, for example, the 5G AV, the SUPI, the DH public key A, and the DH public key B. The 5G AV includes (RAND, AUTN, HXRES*, $K_{SEAF}$). The access authentication response in this step may be referred to as, for example, a Nausf_UEAuthentication_Authenticate Response.

610: The SEAF sends an authentication request (Auth-Req) to the UE, where the Auth-Req may carry the RAND, the AUTN, a key selection indication (ngKSI), [a DH public key A], and a DH public key B. The ngKSI is used by the UE and an AMF to identify $K_{AMF}$ and correspond to a security context.

611: After receiving the Auth-Req from the SEAF, when the Auth-Req carries the DH public key A, the UE may first compare the DH public key A carried in the Auth-Req with the DH public key A calculated by the UE in step 601. If the two are the same, it may indicate that the DH public key A is not tampered with on the network side, and the procedure may continue. If the two are different, it may indicate that the DH public key A is tampered with on the network side. In this case, the UE may directly stop the procedure, or the UE may notify, to the SEAF by using a notification message, that the DH public key A is tampered with. Certainly, if the Auth-Req does not carry the DH public key A, the foregoing DH public key A comparison process is not performed.

The UE calculates an authentication result (RES*) and the AUSF key $K_{AUSF}$ based on a root key K, the RAND, and the like. In addition, the UE may derive the DH symmetric key $K_{DH}$ based on the received DH public key B of the network side and the DH public parameter. For example, $K_{DH}=B^a$ mod p.

Then, the UE derives the key $K_{SEAF}$ based on $K_{DH}$ and $K_{AUSF}$. For example, $K_{SEAF}=KDF(K_{DH}, K_{AUSF})$. The SEAF key $K_{SEAF}$ is subsequently used to derive a session key.

612: The UE sends an authentication response (Auth-Resp) to the SEAF, where the Auth-Resp carries, for example, the RES*, and the Auth-Resp may further carry the DH public key B and the like.

613: After receiving the Auth-Resp, when the Auth-Resp carries the DH public key B, the SEAF may first compare the DH public key B carried in the Auth-Resp with the DH public key B carried in the UE access authentication response received by the SEAF in step 609. If the two are the same, it may indicate that the DH public key B is not tampered with, and the procedure may continue. If the two are different, it may indicate that the DH public key B is tampered with. In this case, the SEAF may directly stop the procedure, or the SEAF may notify, to the UE by using a notification message, that the DH public key B is tampered with. Certainly, if the Auth-Resp does not carry the DH public key B, the foregoing DH public key B comparison process is not performed.

The SEAF calculates a hashed authentication result HRES* based on the RES* carried in the Auth-Resp. Then, the SEAF compares a value of the hashed authentication result HRES* with a value of the hashed expected authentication result HXRES*. If the value of the HRES* is consistent with the value of the HXRES*, the SEAF determines that access authentication performed by the SEAF on the UE succeeds. Otherwise, the SEAF determines that access authentication performed by the SEAF on the UE fails. For example, HRES*=KDF(RES*).

614: When determining that the access authentication performed by the SEAF on the UE succeeds, the SEAF may send a second access authentication request to the AUSF, where the message may carry the RES*, and the message may further carry a DH public key B. When considering that the access authentication on the UE fails, the SEAF may directly notify, to the UE, that the access authentication fails.

615: After receiving the second access authentication request, the AUSF compares whether the received authentication result RES* is consistent with the previously stored expected authentication result XRES*. If the RES* is consistent with the XRES*, the AUSF may determine that access authentication performed by the AUSF on the UE succeeds. If the RES* is inconsistent with the XRES*, the AUSF may determine that access authentication performed by the AUSF on the UE fails. In addition, if determining that the received DH public key B is equal to the DH public key B that is previously sent by the AUSF, the AUSF may determine that DH key agreement succeeds. Otherwise, the AUSF may determine that DH key agreement fails.

616: The AUSF sends, to the SEAF, a second access authentication response used to respond to the second access authentication request, where the second access authentication response is used to notify that the access authentication on the UE succeeds. The SEAF may further notify, to the UE, that the access authentication succeeds.

It can be learned that in the foregoing solution, the UE initiates the 5G-AKA procedure integrated with the DH agreement procedure, where the DH key agreement procedure and the 5G AKA authentication procedure are integrated. Integration of the two procedures helps reduce complexity of the DH key agreement procedure, and helps reduce complexity of system design.

Figure 7A:
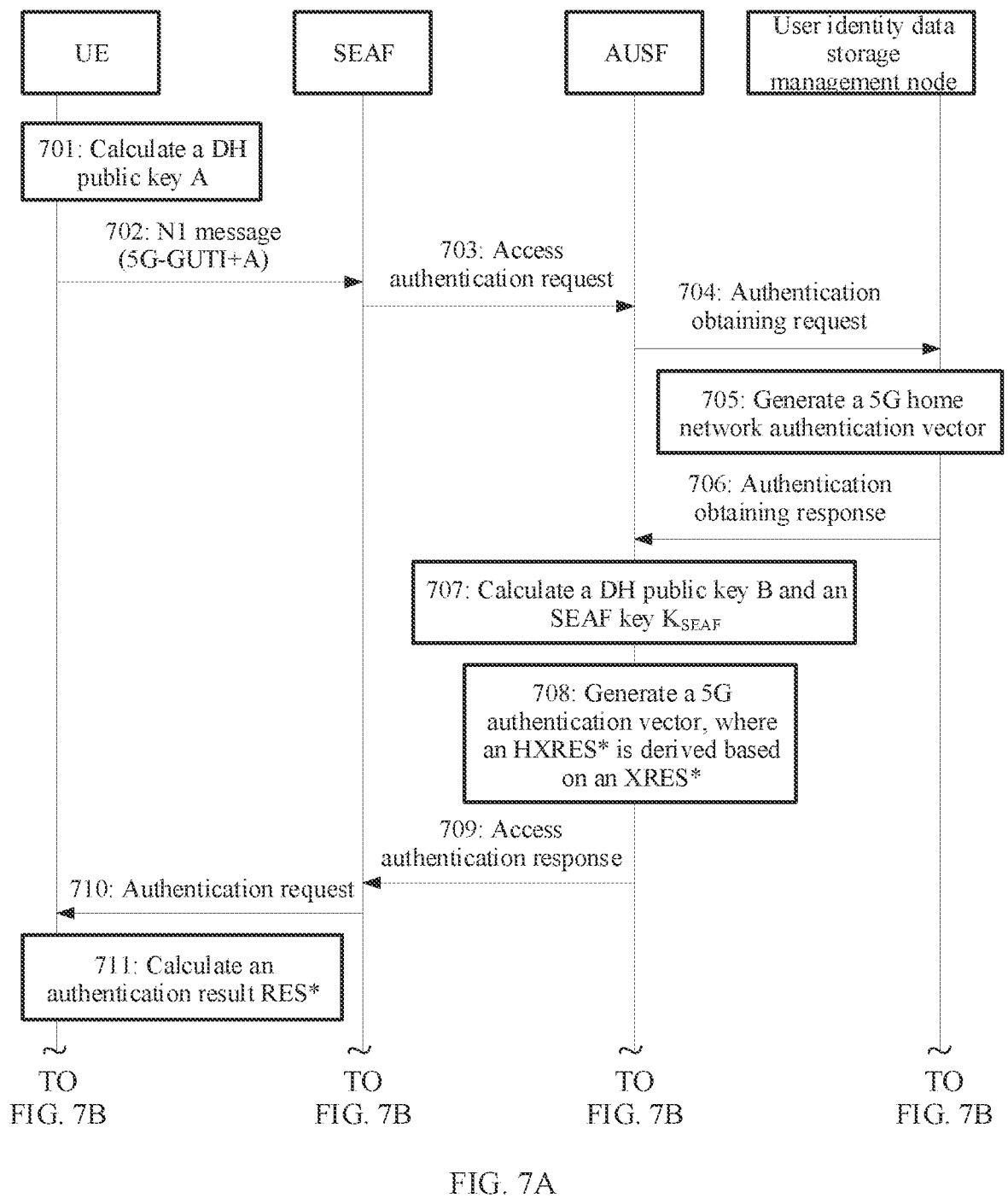
FIG. 7A and FIG. 7B are a schematic flowchart of another communication method according to an embodiment of this application.
Figure 7B:
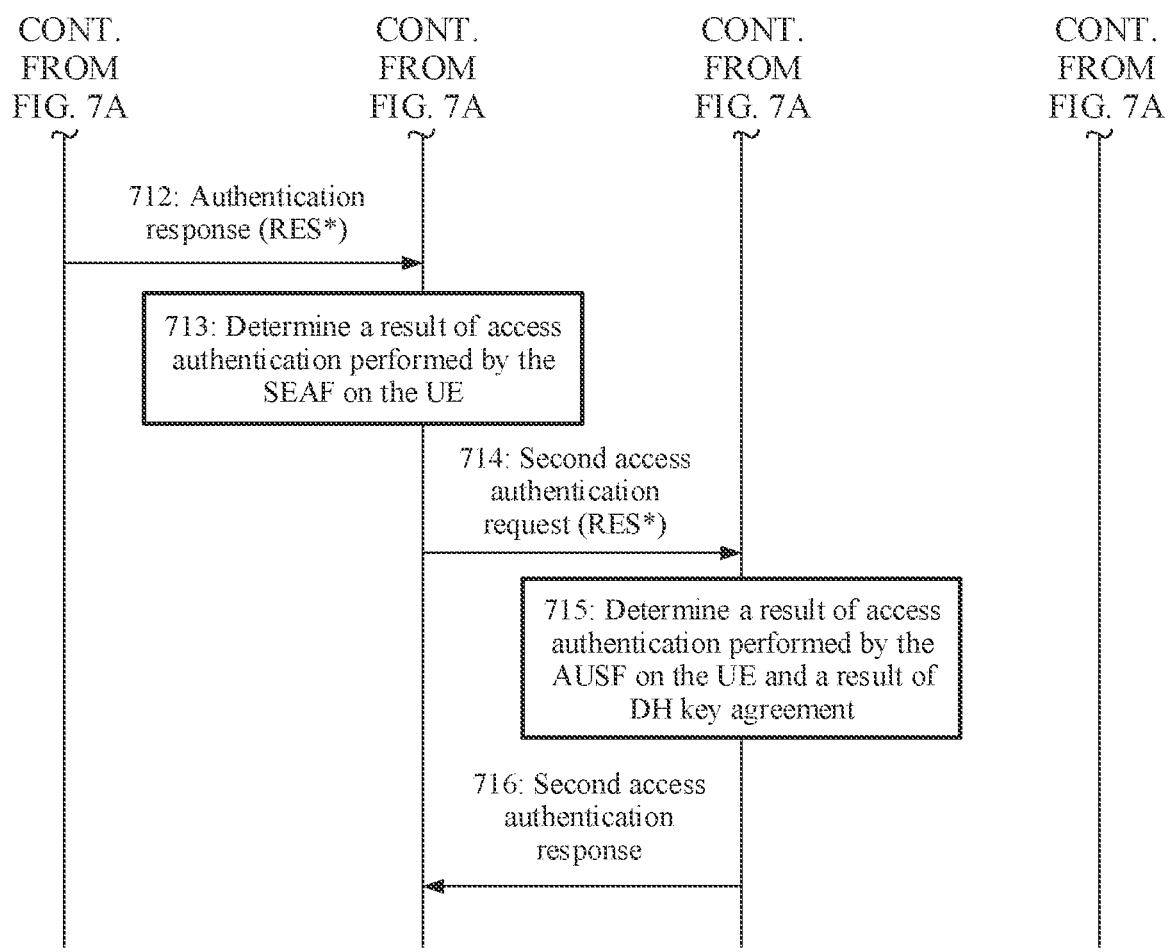

FIG. 7A and FIG. 7B are a schematic flowchart of a communication method according to an embodiment of this application. In the example shown in FIG. 7A and FIG. 7B, UE initiates a 5G-AKA procedure integrated with a DH agreement procedure. DH parameters are not encrypted for protection. The communication method may include the following steps.

701: The UE selects a DH public parameter (g, p) and a DH private key a, and calculates a DH public key A based on the DH public parameter (g, p) and the DH private key a. For example, $A = g^a \bmod p$.

702: The UE sends an N1 message to an SEAF. The N1 message may carry a 5G-GUTI, may further carry the DH public parameter (g, p) or an index, and may further carry the DH public key A.

The 5G-GUTI is a temporary user identity issued by a network side to the UE.

The index indicates a DH public parameter index.

The DH public parameter index may be used to index to the DH public parameter (g, p). Therefore, when the UE intends to use the DH public parameter that has been shared in advance between the network side and the UE, the N1 message may carry the index rather than carrying the DH public parameter (g, p). The network side may index, based on the index, to the DH public parameter (g, p) that has been shared in advance between the network side and the UE.

703: The SEAF sends a Nausf_UEAuthentication_Authenticate Request to an AUSF, where the message may carry (SUPI, SN-name, (g, p) or index, A). If the N1 message sent by the UE carries the 5G-GUTI, the SEAF may first find, based on the 5G-GUTI, the SUPI corresponding to the 5G-GUTI, and may include the SUPI in the message sent to the AUSF.

704: After receiving the Nausf_UEAuthentication_Authenticate Request, the AUSF sends a Nausf_UEAuthentication_Get Request to a user identity data storage management node (for example, a UDM/an ARPF/an SIDF). The Nausf_UEAuthentication_Get Request carries (SUPI, SN-name, (g, p) or index). When the AUSF intends to use the DH public parameter (g, p) that has been shared in advance between the network side and the UE, the message may carry the index used to index to the DH public parameter (g, p) rather than carrying the DH public parameter (g, p).

705: After receiving the Nausf_UEAuthentication_Get Request from the AUSF, the user identity data storage management node may generate a 5G home network authentication vector (5G HE AV) for the SUPI carried in the Nausf_UEAuthentication_Get Request.

Specific steps for generating the 5G HE AV may be as follows. A separation bit (separation bit) of an authentication management field (AMF) is first set to "1" (refer to TS 33.102). A key $K_{AUSF}$ and an expected authentication result XRES* that are corresponding to the SUPI are derived. Then, the 5G HE AV is obtained based on a random number (RAND), an authentication token (AUTN), the expected authentication result (XRES*), and $K_{AUSF}$. For a specific method for generating the 5G HE AV, refer to a 5G-AKA part in TS 33.501.

706: The user identity data storage management node sends an authentication obtaining response to the AUSF. The authentication obtaining response may carry (5G HE AV, [SUPI], [DH public parameter]), and content in the symbol [ ] may be selectively sent based on a requirement. For example, the content is sent when the UE and the network side (for example, the SIDF) determine to use the DH public parameter that has been shared in advance.

If the N1 message sent by the UE carries the DH public parameter (g, p), the authentication obtaining response may not carry the DH public parameter.

707: The AUSF receives the authentication obtaining response, stores the XRES* in the 5G HE AV and the SUPI that are carried in the authentication obtaining response, and may store $K_{AUSF}$.

The AUSF selects a DH private key b, and then calculates a DH public key B based on the DH public parameter. For example, $B = g^b \bmod p$. Then, the AUSF derives a symmetric key $K_{DH}$ based on the DH public key A obtained by the SIDF through decryption and the DH private key b. For example, $K_{DH} = A^b \bmod p$. The AUSF further derives a key $K_{SEAF}$. For example, $K_{SEAF} = KDF(K_{DH}, K_{AUSF})$, where KDF indicates a key derivation function.

708: The AUSF calculates a 5G authentication vector (5G AV) based on the 5G HE AV (5G home network authentication vector) received from the user identity data storage management node. For example, a method for calculating the 5G AV based on the 5G HE AV may include: replacing the XRES* (expected authentication result) and $K_{AUSF}$ in the 5G HE AV with an HXRES* (hashed expected authentication result) and $K_{SEAF}$. Specifically, for example, HXRES*=KDF(XRES*).

709: The AUSF sends an access authentication response to the SEAF, where the access authentication response carries, for example, the 5G AV, the SUPI, the DH public key A, and the DH public key B. The 5G AV includes (RAND, AUTN, HXRES*, $K_{SEAF}$). The access authentication response in step 709 may be referred to as, for example, a Nausf_UEAuthentication_Authenticate Response.

710: The SEAF sends an authentication request (Auth-Req) to the UE, where the Auth-Req may carry the RAND, the AUTN, a key selection indication (ngKSI), [a DH public key A], and a DH public key B. The ngKSI is used by the UE and an AMF to identify $K_{AMF}$ and correspond to a security context.

711: After receiving the Auth-Req from the SEAF, when the Auth-Req carries the DH public key A, the UE may first compare the DH public key A carried in the Auth-Req with the DH public key A calculated by the UE in step 701. If the two are the same, it may indicate that the DH public key A is not tampered with on the network side, and the procedure may continue. If the two are different, it may indicate that the DH public key A is tampered with on the network side. In this case, the UE may directly stop the procedure, or the UE may notify, to the SEAF by using a notification message, that the DH public key A is tampered with. Certainly, if the Auth-Req does not carry the DH public key A, the foregoing DH public key A comparison process is not performed.

The UE calculates an authentication result (RES*) and the AUSF key $K_{AUSF}$ based on a root key K, the RAND, and the like. In addition, the UE may derive the DH symmetric key $K_{DH}$ based on the received DH public key B of the network side and the DH public parameter. For example, $K_{DH}=B^a$ mod p.

Then, the UE derives the key $K_{SEAF}$ based on $K_{DH}$ and $K_{AUSF}$. For example, $K_{SEAF}=KDF(K_{DH}, K_{AUSF})$. The SEAF key $K_{SEAF}$ is subsequently used to derive a session key.

712: The UE sends an authentication response (Auth-Resp) to the SEAF, where the Auth-Resp carries, for example, the RES*, and the Auth-Resp may further carry the DH public key B and the like.

713: After receiving the Auth-Resp, when the Auth-Resp carries the DH public key B, the SEAF may first compare the DH public key B carried in the Auth-Resp with the DH public key B carried in the UE access authentication response received by the SEAF in step 709. If the two are the same, it may indicate that the DH public key B is not tampered with, and the procedure may continue. If the two are different, it may indicate that the DH public key B is tampered with. In this case, the SEAF may directly stop the procedure, or the SEAF may notify, to the UE by using a notification message, that the DH public key B is tampered with. Certainly, if the Auth-Resp does not carry the DH public key B, the foregoing DH public key B comparison process is not performed.

The SEAF calculates a hashed authentication result HRES* based on the RES* carried in the Auth-Resp. Then, the SEAF compares a value of the hashed authentication result HRES* with a value of the hashed expected authentication result HXRES*. If the value of the HRES* is consistent with the value of the HXRES*, the SEAF considers that access authentication on the UE succeeds. Otherwise, the SEAF considers that access authentication on the UE fails. For example, HRES*=KDF(RES*).

714: When determining that the access authentication on the UE succeeds, the SEAF sends a second access authentication request to the AUSF, where the message may carry the RES*, and the message may further carry a DH public key B. When considering that the access authentication on the UE fails, the SEAF may directly notify, to the UE, that the access authentication fails.

715: After receiving the second access authentication request, the AUSF compares whether the received authentication result RES* is consistent with the previously stored expected authentication result XRES*. If the RES* is consistent with the XRES*, the AUSF may determine that access authentication performed by the AUSF on the UE succeeds. If the RES* is inconsistent with the XRES*, the AUSF may determine that access authentication performed by the AUSF on the UE fails. In addition, if determining that the received DH public key B is equal to the DH public key B that is previously sent by the AUSF, the AUSF determines that DH key agreement succeeds. Otherwise, the AUSF determines that DH key agreement fails.

716: The AUSF sends, to the SEAF, a second access authentication response used to respond to the second access authentication request, where the second access authentication response is used to notify that the access authentication on the UE succeeds. The SEAF may further notify, to the UE, that the access authentication succeeds.

It can be learned that in the foregoing solution, the UE initiates the 5G-AKA procedure integrated with the DH agreement procedure, where the DH key agreement procedure and the 5G AKA authentication procedure are integrated. Integration of the two procedures helps reduce complexity of the DH key agreement procedure, and helps reduce complexity of system design.

Figure 8A:
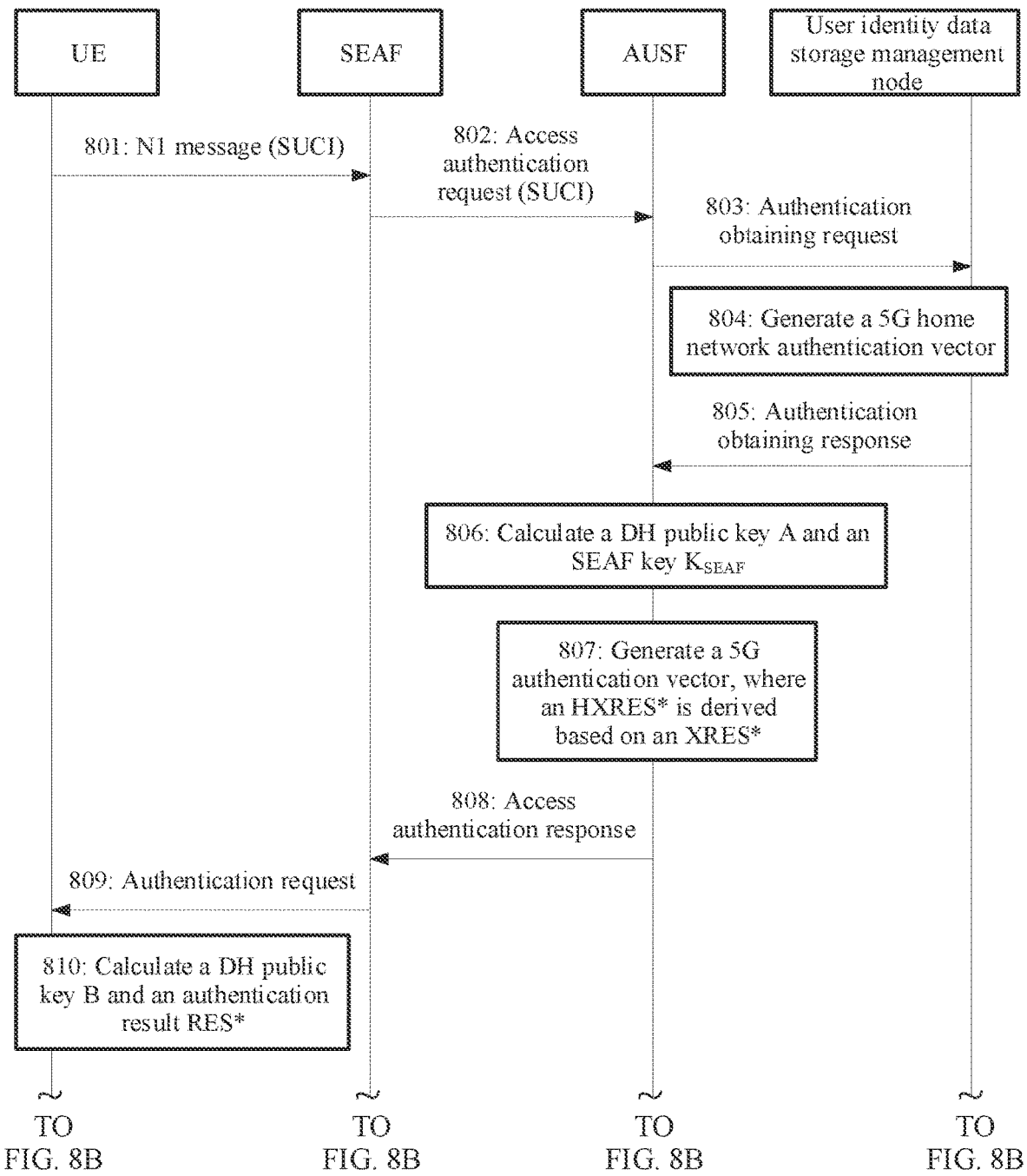
FIG. 8A and FIG. 8B are a schematic flowchart of another communication method according to an embodiment of this application.
Figure 8B:
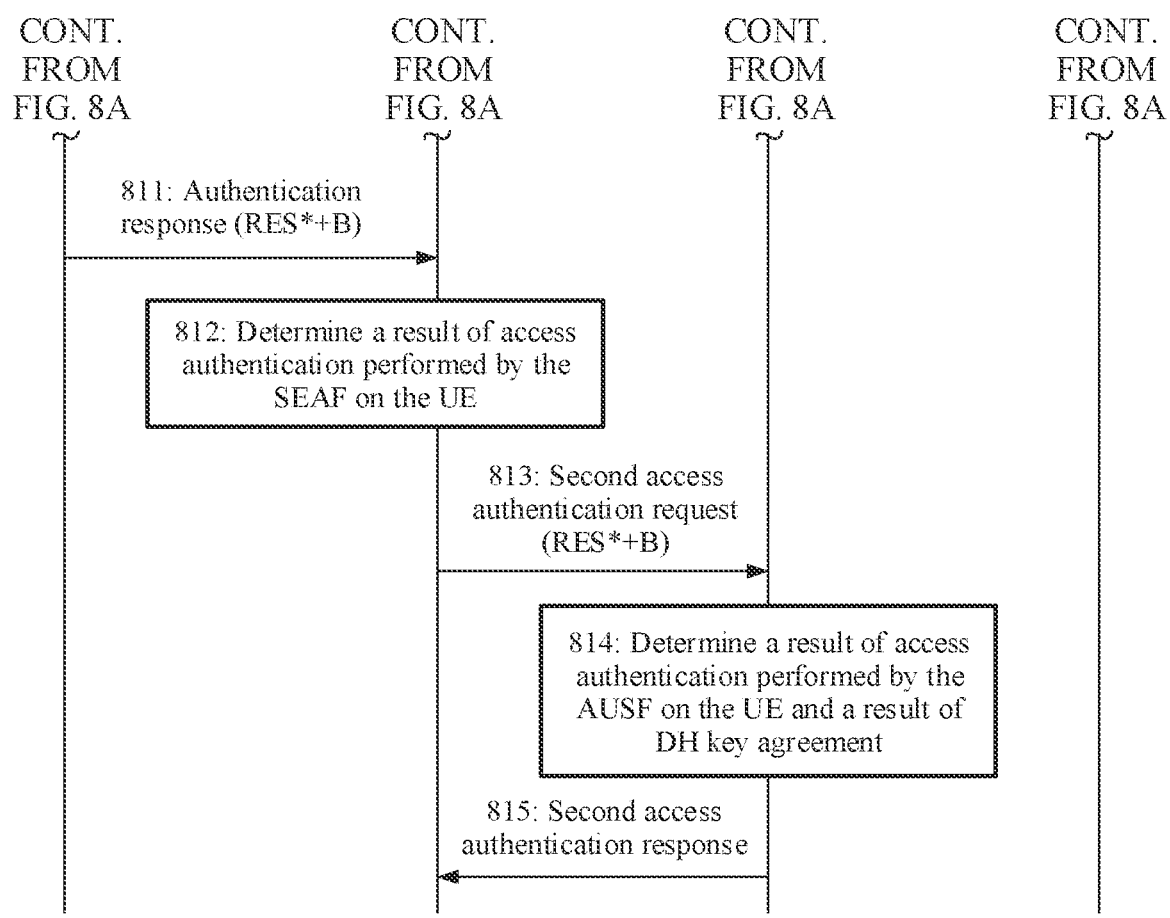

FIG. 8A and FIG. 8B are a schematic flowchart of a communication method according to an embodiment of this application. In the example shown in FIG. 8A and FIG. 8B, an AUSF initiates a 5G-AKA procedure integrated with a DH agreement procedure. Some DH parameters are not encrypted for protection. The communication method may include the following steps.

801: UE sends an N1 message (N1 Message) to an SEAF, where the N1 message carries an SUCI. The SUCI is obtained by encrypting an SUPI by using a network side public key (where the network side public key is a user identity encryption public key different from a DH public key). For example, SUCI=En(SUPI), where En indicates an encryption operation. A specific encryption algorithm used for the encryption operation is not limited herein. For example, an ECIES in TS 33.501 may be used, or another encryption algorithm may be used.

802: The SEAF sends a Nausf_UEAuthentication_Authenticate Request to the AUSF, where the message may carry (SUCI, SN-name).

803: After receiving the Nausf_UEAuthentication_Authenticate Request, the AUSF sends a Nausf_UEAuthentication_Get Request to a user identity data storage management node (for example, a UDM/an ARPF/an SIDF). The message may carry (SUCI, SN-name).

804: After receiving the Nausf_UEAuthentication_Get Request, the user identity data storage management node decrypts the SUCI carried in the message to obtain the SUPI. The user identity data storage management node further generates an authentication vector (5G HE AV) for the SUPI.

Specific steps for generating the authentication vector may be as follows.

The user identity data storage management node may first set a separation bit (separation bit) of an authentication management field (AMF) to "1" (refer to TS 33.102). The user identity data storage management node derives a key $K_{AUSF}$ and an XRES* that are corresponding to the SUPI. Then, the user identity data storage management node obtains the authentication vector 5G HE AV based on a RAND, an AUTN, the XRES*, and $K_{AUSF}$. For a specific method for generating the authentication vector, refer to a 5G AKA part in TS-33.501.

805: The user identity data storage management node sends an authentication obtaining request to the AUSF.

The authentication obtaining request (Nausf_UEAuthentication_Get Response) may carry (5G HE AV, [SUPI*]) and the like, and content in the symbol [ ] may be carried only when the user identity data storage management node obtains the SUCI from the AUSF. If the user identity data storage management node obtains the SUPI from the AUSF, the user identity data storage management node may not include the SUPI in the message.

806: The AUSF stores the received XRES* and SUPI, and may store $K_{AUSF}$.

The AUSF selects a DH public parameter (g, p) and a DH private key a, and then calculates a DH public key A based on the DH public parameter (g, p) and the DH private key a. For example, $A=g^a$ mod p.

Further, the AUSF derives a key $K_{SEAF}$. For example, $K_{SEAF}=KDF(K_{AUSF})$.

807: The AUSF calculates a 5G AV based on the 5G HE AV received from the UDM/ARPF.

For example, a method for calculating the 5G AV based on the 5G HE AV may include: replacing the XRES* and $K_{AUSF}$ in the 5G-HE AV with an HXRES* and $K_{SEAF}$, HXRES*=KDF(XRES*).

808: The AUSF sends a Nausf_UEAuthentication_Authenticate Response to the SEAF, where the message may carry, for example, (5G AV, SUPI, (g, p, A)), and the 5G AV includes (RAND. AUTN, HXRES*, $K_{SEAF}$).

809: The SEAF sends an authentication request (Auth-Req) to the UE, where the Auth-Req carries (RAND, AUTN, ngKSI, (g, p, A)) and the like. The ngKSI is used by the UE and an AMF to identify $K_{AMF}$ and correspond to a security context.

810: After receiving, from the SEAF, the Auth-Req that carries the RAND and the AUTN, the UE calculates an RES* and $K_{AUSF}$ based on a root key K of the UE, the RAND, and the like.

The UE further selects a DH private key b, and calculates a DH public key B of the UE based on the DH public parameter and the DH private key b. For example, the DH public key $B=g^b$ mod p. Further, the UE derives a symmetric key $K_{DH}$ based on the DH public key A received from the AUSF and the DH private key b of the UE. That is, $K_{DH}=A^b$ mod p.

Then, the UE derives the key $K_{SEAF}$ based on $K_{AUSF}$. That is, $K_{SEAF}$=KDF($K_{DH}$, $K_{AUSF}$).

811: The UE, sends an Auth-Resp to the SEAF, where the Auth-Resp carries, for example, the RES* and the DH public key B.

812: After receiving the Auth-Resp, the SEAF calculates an HRES* based on the RES* carried in the Auth-Resp, and then compares a value of the HRES* and a value of the HXRES*. If the value of the HRES* is consistent with the value of the HXRES*, the SEAF determines that access authentication performed by the SEAF on the UE succeeds. Otherwise, the SEAF determines that access authentication performed by the SEAF on the UE fails.

813: The SEAF sends a second access authentication request to the AUSF, where the second access authentication request may carry the RES*, a DH public key A, and the DH public key B.

814: After receiving the second access authentication request, the AUSF compares whether the received RES* is consistent with the previously stored XRES*. If the RES* is consistent with the XRES*, the AUSF considers that access authentication on the UE succeeds. In addition, if determining that the received DH public key A is equal to the DH public key A that is previously sent by the AUSF, the AUSF may determine that DH key agreement succeeds. Otherwise, the AUSF may determine that DH key agreement fails.

The AUSF derives the DH symmetric key $K_{DH}$ based on the received DH public key B. For example, $K_{DH}=B^a$ mod p.

In addition, the AUSF derives the key $K_{SEAF}$ based on the symmetric key $K_{DH}$ and $K_{AUSF}$. For example, $K_{SEAF}$=KDF($K_{DH}$, $K_{AUSF}$).

815: The AUSF sends, to the SEAF, a second access authentication response used to respond to the second access authentication request, where the second access authentication response is used to notify that the access authentication on the UE succeeds.

The message may carry the new key $K_{SEAF}$ derived in step 814, and $K_{SEAF}$ may be used to derive a session key.

It can be learned that in the foregoing solution, the AUSF initiates the 5G-AKA procedure integrated with the DH agreement procedure, where the DH key agreement procedure and the 5G AKA authentication procedure are integrated. Integration of the two procedures helps reduce complexity of the DH key agreement procedure, and helps reduce complexity of system design.

Figure 9A:
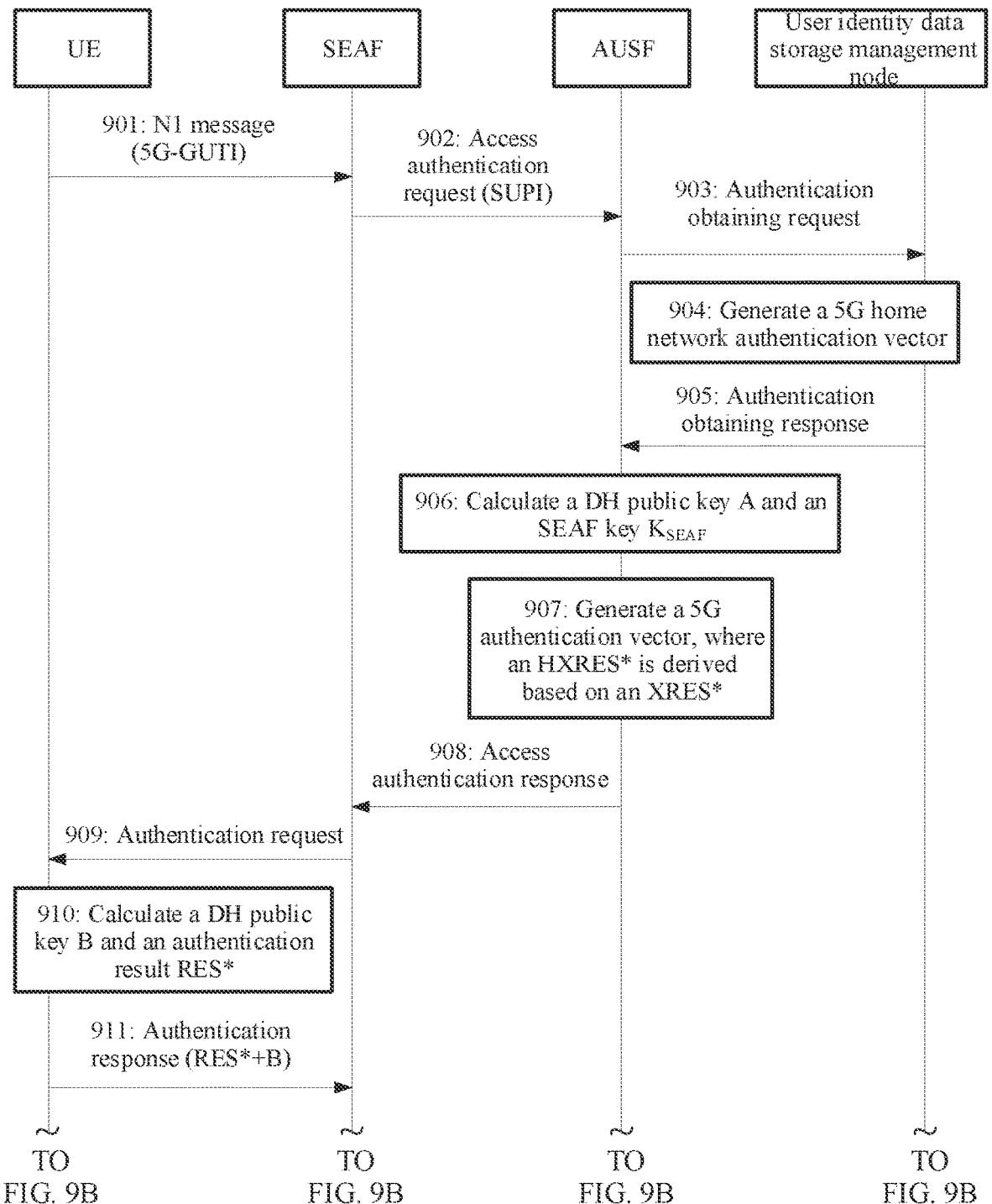
FIG. 9A and FIG. 9B are a schematic flowchart of another communication method according to an embodiment of this application.
Figure 9B:
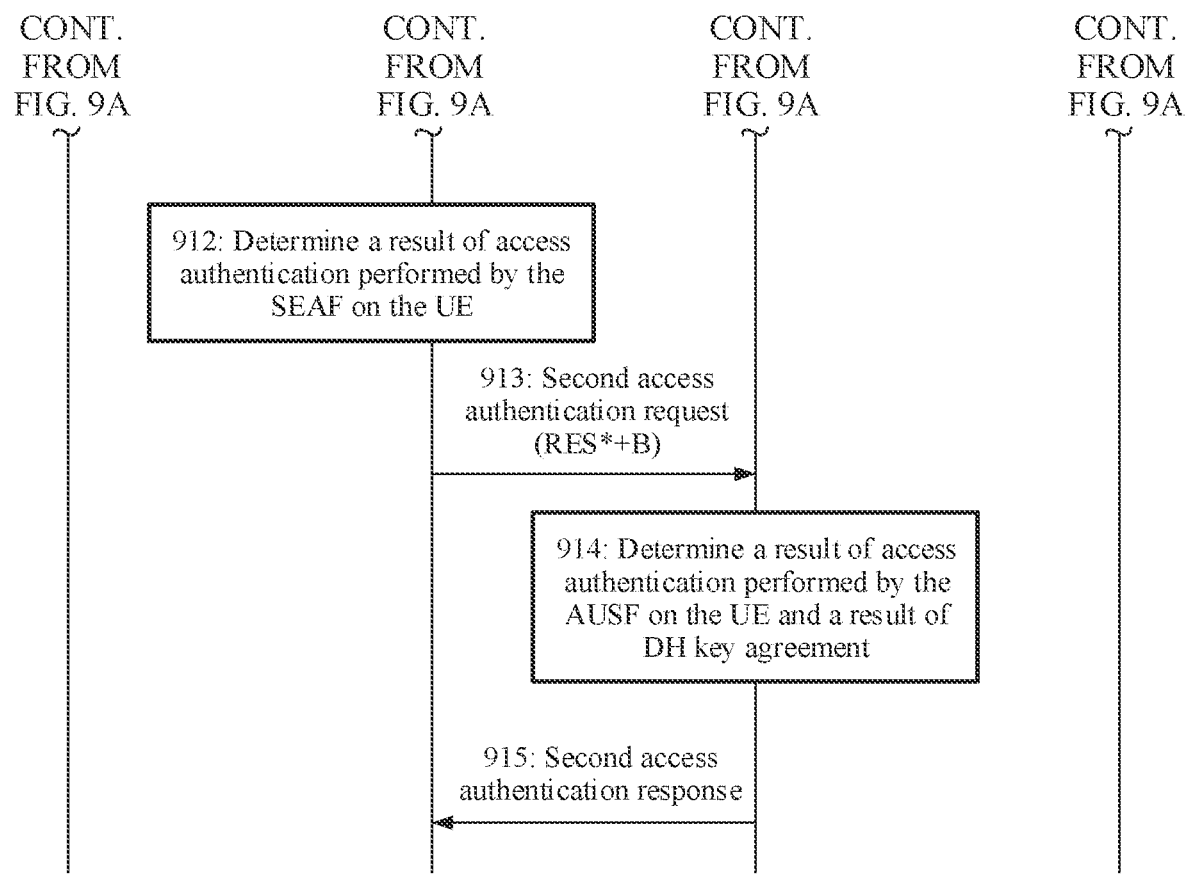

FIG. 9A and FIG. 9B are a schematic flowchart of a communication method according to an embodiment of this application. In the example shown in FIG. 9A and FIG. 9B, an AUSF initiates a 5G-AKA procedure integrated with a DH agreement procedure. DH parameters are not encrypted for protection. The communication method may include the following steps.

901: UE sends an N1 message (N1 Message) to an SEAF, where the N1 message carries a 5G-GUTI. The 5G-GUTI is a temporary user identity issued by a network side to the UE.

902: The SEAF sends a Nausf_UEAuthentication_Authenticate Request to the AUSF, where the message may carry (SUPI, SN-name).

If the N1 message sent by the UE in step 901 carries the 5G-GUTI, in this step, the SEAF may first find, based on the 5G-GUTI the SUPI corresponding to the 5G-GUTI, and include the SUPI in the message sent to the AUSF.

903: After receiving the Nausf_UEAuthentication_Authenticate Request, the AUSF sends a Nausf_UEAuthentication_Get Request to a user identity data storage management node (for example, a UDM/an ARPF/an SIDF). The message may carry (SUPI, SN-name).

904: After receiving the Nausf_UEAuthentication_Get Request, the user identity data storage management node further generates an authentication vector (5G HE AV) for the SUPI carried in the Nausf_UEAuthentication_Get Request.

Specific steps for generating the authentication vector may be as follows.

The user identity data storage management node may first set a separation bit of an authentication management field (AMF) to "1" (refer to TS 33.102). The user identity data storage management node derives a key $K_{AUSF}$ and an XRES* that are corresponding to the SUPI. Then, the user identity data storage management node obtains the authentication vector 5G HE AV based on a RAND, an AUTN, the XRES*, and $K_{AUSF}$. For a specific method for generating the authentication vector, refer to a 5G-AKA part in TS 33.501.

905: The user identity data storage management node sends an authentication obtaining request to the AUSF.

The authentication obtaining request (Nausf_UEAuthentication_Get Response) may carry (5G HE AV, [SUPI]) and the like, and content in the symbol may be carried only when the user identity data storage management node obtains the SUCI from the AUSF. If the user identity data storage management node obtains the SUPI from the AUSF, the user identity data storage management node may not include the SUPI in the message.

906: The AUSF stores the received XRES* and SUPI and may store $K_{AUSF}$.

The AUSF selects a DH public parameter (g, p) and a DH private key a, and then calculates a DH public key A based on the DH public parameter (g, p) and the DH private key a. For example, $A=g^a$ mod p.

Further, the AUSF derives a key $K_{SEAF}$. For example, $K_{SEAF}$=KDF($K_{AUSF}$).

907: The AUSF calculates a 5G AV based on the 5G HE AV received from the UDM/ARPF.

For example, a method for calculating the 5G AV based on the 5G HE AV may include: replacing the XRES* and $K_{AUSF}$ in the 5G HE AV with an HXRES* and $K_{SEAF}$. HXRES*=KDF(XRES*).

908: The AUSF sends a Nausf_UEAuthentication_Authenticate Response to the SEAF, where the message may carry, for example, (5G AV, SUPI, (g, p, A)), and the 5G AV includes (RAND, AUTN, HXRES*, $K_{SEAF}$).

909: The SEAF sends an authentication request (Auth-Req) to the UE, where the Auth-Req carries (RAND, AUTN, ngKSI, (g, p, A)) and the like. The ngKSI is used by the UE and an AMF to identify $K_{AMF}$ and correspond to a security context.

910: After receiving, from the SEAF, the Auth-Req that carries the RAND and the AUTN, the UE calculates an RES* and $K_{AUSF}$ based on a root key K of the UE, the RAND, and the like.

The UE further selects a DH private key b, and calculates a DH public key B of the UE based on the DH public parameter and the DH private key b. For example, the DH public key $B=g^b$ mod p. Further, the UE derives a symmetric key $K_{DH}$ based on the DH public key A received from the AUSF and the DH private key b of the UE. That is, $K_{DH}=A^b$ mod p.

Then, the UE derives the key $K_{SEAF}$ based on $K_{AUSF}$. That is, $K_{SEAF}=KDF(K_{DH}, K_{AUSF})$.

911: The UE sends an Auth-Resp to the SEAF, where the Auth-Resp carries, for example, the RES* and the DH public key B.

912: After receiving the Auth-Resp, the SEAF calculates an HRES* based on the RES* carried in the Auth-Resp, and then compares a value of the HRES* and a value of the HXRES*. If the value of the HRES* is consistent with the value of the HXRES*, the SEAF may determine that access authentication performed by the SEAF on the UE succeeds. Otherwise, the SEAF may determine that access authentication performed by the SEAF on the UE fails.

913: The SEAF sends a second access authentication request to the AUSF, where the second access authentication request may carry the RES*, a DH public key A, and the DH public key B.

914: After receiving the second access authentication request, the AUSF compares whether the received RES* is consistent with the previously stored XRES*. If the RES* is consistent with the XRES*, the AUSF considers that access authentication on the UE succeeds. In addition, if determining that the received DH public key A is equal to the DH public key A that is previously sent by the AUSF, the AUSF may determine that DH key agreement succeeds. Otherwise, the AUSF may determine that DH key agreement fails.

The AUSF derives the DH symmetric key $K_{DH}$ based on the received DH public key B. For example, $K_{DH}=B^a$ mod p.

In addition, the AUSF derives the key $K_{SEAF}$ based on the symmetric key $K_{DH}$ and $K_{AUSF}$. For example, $K_{SEAF}=KDF(K_{DH}, K_{AUSF})$.

915: The AUSF sends, to the SEM, a second access authentication response used to respond to the second access authentication request, where the second access authentication response may be used to notify that the access authentication on the UE succeeds. The second access authentication response may carry the new key $K_{SEAF}$ derived in step 914, and $K_{SEAF}$ may be used to derive a session key.

It can be learned that in the foregoing solution, the AUSF initiates the 5G-AKA procedure integrated with the DH agreement procedure, where the DH key agreement procedure and the 5G AKA authentication procedure are integrated. Integration of the two procedures helps reduce complexity of the DH key agreement procedure, and helps reduce complexity of system design.

Figure 10:
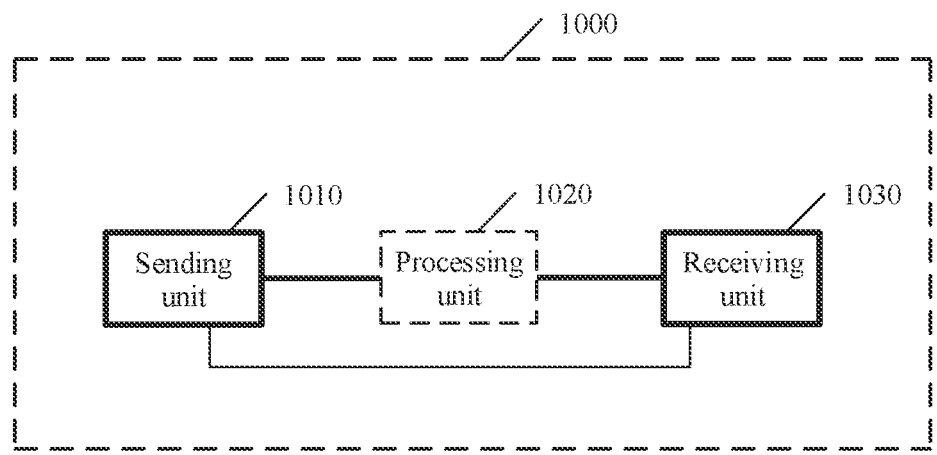
FIG. 10 is a schematic structural diagram of user equipment according to an embodiment of this application.

The following further describes some apparatuses:

Referring to FIG. 10, an embodiment of this application further provides user equipment UE 1000. The UE may include:

a sending unit 1010, configured to send an N1 message to a security anchor function SEAF, where the N1 message carries a DH public parameter or a DH public parameter index, the N1 message further carries an encrypted identifier SUCI of the UE, and the SUCI is obtained by encrypting a permanent identifier SUPI of the UE and a DH public key A; or the N1 message carries a DH public key A, the N1 message further carries a DH public parameter or a DH public parameter index, the N1 message further carries an SUCI of the UE, and the SUCI is obtained by encrypting an SUPI of the UE; and a receiving unit 1020, configured to receive an authentication request that carries a random number RAND and that is sent by the SEAF, where the sending unit is further configured to send, to the SEAF, an authentication response used to respond to the authentication request, where the authentication response carries an authentication result RES* calculated based on a root key K and the random number RAND.

In some possible implementations, the authentication request carries a DH public key B; and the UE further includes a processing unit 1030, and the processing unit 1030 is configured to derive a DH symmetric key $K_{DH}$ based on the DH public parameter and the DH public key B, where the UE derives an SEAF key $K_{SEAF}$ based on $K_{DH}$ and an AUSF key $K_{AUSF}$, and the AUSF key $K_{AUSF}$ is calculated based on the root key K and the random number RAND.

The units in the user equipment 1000 may cooperate to complete, for example, some or all of the steps completed by the UE in the procedures corresponding to FIG. 1-C to FIG. 9B.

Figure 11:
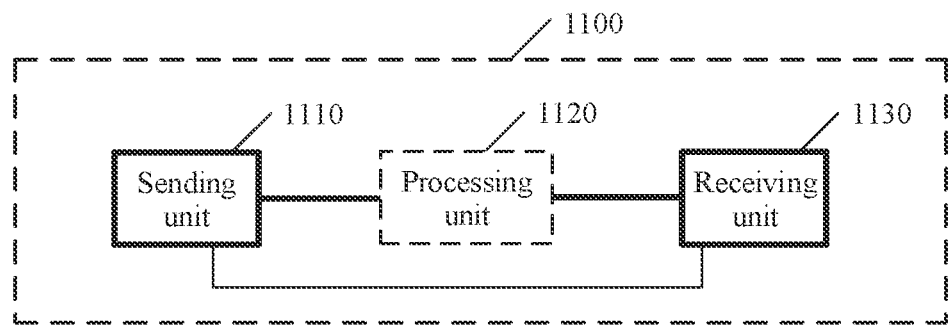
FIG. 11 is a schematic structural diagram of an SEAF according to an embodiment of this application.

Referring to FIG. 11, an embodiment of this application further provides a security anchor function SEAF 1100. The SEAF includes:

a receiving unit 1120, configured to receive an N1 message from UE, where the N1 message carries an encrypted identifier SUCI of the UE, the N1 message further carries a DH public parameter or a DH public parameter index, and the SUCI is obtained by encrypting a permanent identifier SUPI of the UE and a DH public key A; or the N1 message carries a DH public key A, the N1 message further carries a DH public parameter or a DH public parameter index, the N1 message further carries an SUCI of the UE, and the SUCI is obtained by encrypting a permanent identifier SUPI of the UE; and a sending unit 1110, configured to send a first access authentication request to an authentication server function AUSF, where the first access authentication request carries the DH public parameter or the DH public parameter index; and when the SUCI carried in the N1 message is obtained by encrypting the SUPI of the UE and the DH public key A, the first access authentication request further carries the SUCI; or when the SUCI carried in the N1 message is obtained by encrypting the SUPI of the UE, the first access authentication request further carries the DH public key A and the SUCI.

In some possible implementations, the SEAF further includes a processing unit 1130;

the receiving unit is further configured to receive a first access authentication response that is used to respond to the first access authentication request and that is sent by the AUSF, where the first access authentication response carries a 5G authentication vector and the SUPI, the 5G authentication vector includes a hashed expected authentication result HXRES*, and the HXRES* is derived based on an XRES*, the DH public key A, and a DH public key B;

the sending unit is further configured to send, to the UE, an authentication request carrying a random number RAND;

the receiving unit is further configured to receive, from the UE, an authentication response used to respond to the authentication request, where the authentication response carries an authentication result RES* calculated based on a root key K and the random number RAND;

the processing unit 1130 is configured to: calculate a hashed authentication result HRES* based on the DH public key A, the DH public key B, and the RES*; and when the HRES* is the same as the HXRES* included in the 5G authentication vector, determine that DH agreement succeeds and access authentication performed by the SEAF on the UE succeeds; or when the HXRES* is different from the HRES*, determine that DH agreement fails and access authentication performed by the SEAF on the UE fails;

the sending unit is further configured to send a second access authentication request to the AUSF, where the second access authentication request carries the authentication result RES*; and the receiving unit is further configured to receive a second access authentication response sent by the AUSF, where the second access authentication response is used to respond to the second access authentication request, and the second access authentication response is used to indicate a result of access authentication performed by the AUSF on the UE based on the RES*.

In some possible implementations, the SEAF further includes a processing unit;

the receiving unit is further configured to receive a first access authentication response that is used to respond to the first access authentication request and that is sent by the AUSF, where the first access authentication response carries a 5G authentication vector and the SUPI, the 5G authentication vector includes a hashed expected authentication result HXRES*, and the HXRES* is derived based on an XRES;

the sending unit is further configured to send, to the UE, an authentication request carrying a random number RAND;

the receiving unit is further configured to receive, from the UE, an authentication response used to respond to the authentication request, where the authentication response carries an authentication result RES* calculated based on a root key K and the random number RAND;

the processing unit is configured to: calculate a hashed authentication result HRES* based on the RES*; and when the HRES* is the same as the HXRES* included in the 5G authentication vector, determine that access authentication performed by the SEAF on the UE succeeds; or when the HXRES* is different from the HRES*, determine that access authentication performed by the SEAF on the UE fails;

the sending unit is further configured to send a second access authentication request to the AUSF, where the second access authentication request carries the authentication result RES*, and the receiving unit is further configured to receive a second access authentication response sent by the AUSF, where the second access authentication response is used to respond to the second access authentication request, and the second access authentication response is used to indicate a result of access authentication performed by the AUSF on the UE based on the RES*.

The units in the SEAF 1100 may cooperate to complete, for example, some or all of the steps completed by the SEAF in the procedures corresponding to FIG. 1-C to FIG. 9B.

Figure 12:
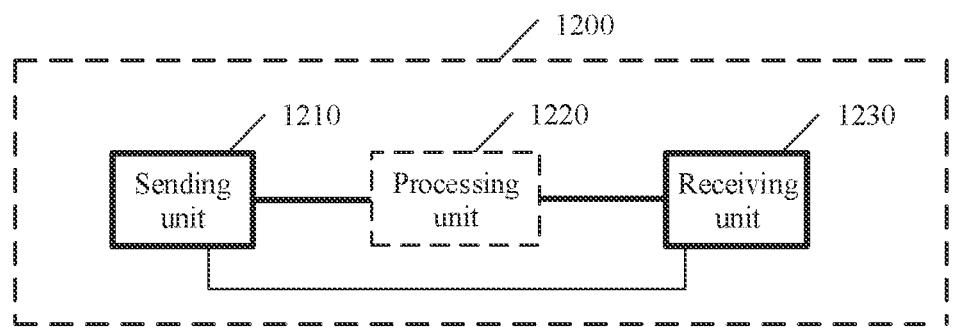
FIG. 12 is a schematic structural diagram of an AUSF according to an embodiment of this application.

Referring to FIG. 12, an embodiment of this application further provides an authentication server function AUSF 1200. The AUSF includes:

a receiving unit 1220, configured to receive a first access authentication request from an SEAF, where the first access authentication request carries a DH public parameter or a DH public parameter index, the first access authentication request further carries an encrypted identifier SUCI of UE, and the SUCI is obtained by encrypting a permanent identifier SUPI of the UE and a DH public key A; or the first access authentication request carries an SUCI of UE and a DH public key A, the first access authentication request further carries a DH public parameter or a DH public parameter index, and the SUCI is obtained by encrypting an SUPI of the UE;

a sending unit 1210, configured to send an authentication obtaining request to a user identity data storage management node, where the authentication obtaining request carries the SUCI, where the receiving unit is further configured to receive an authentication obtaining response that is used to respond to the authentication obtaining request and that is sent by the user identity data storage management node, where the authentication obtaining response carries a 5G home network authentication vector, the authentication obtaining response further carries the DH public key A and the SUPI obtained by decrypting the SUCI, and the 5G home network authentication vector includes an expected authentication result XRES* and an AUSF key $K_{AUSF}$; and a processing unit 1230, configured to: calculate a DH public key B based on the DH public parameter, derive a DH symmetric key $K_{DH}$ based on the DH public key A and the DH public key B, and derive an SEAF key $K_{SEAF}$ based on the DH symmetric key $K_{DH}$ and the AUSF key $K_{AUSF}$, where the processing unit is further configured to calculate a 5G authentication vector based on the 5G home network authentication vector, where the 5G authentication vector includes a hashed expected authentication result HXRES*, and the HXRES* is derived based on the XRES*, the DH public key A, and the DH public key B;

the sending unit is further configured to send, to the SEAF, a first access authentication response used to respond to the first access authentication request, where the first access authentication response carries the 5G authentication vector;

the receiving unit is further configured to receive a second access authentication request from the SEAF, where the second access authentication request carries an authentication result RES* that is from the UE; and when the RES* is consistent with the XRES* included in the 5G home network authentication vector, it is determined that access authentication performed by the AUSF on the UE succeeds; and the sending unit is further con figured to send, to the SEAF, a second access authentication response used to respond to the second access authentication request, where the second access authentication response is used to indicate a result of the access authentication performed by the AUSF on the UE.

The units in the AUSF 1200 may cooperate to complete, for example, some or all of the steps completed by the AUSF in the procedures corresponding to FIG. 1-C to FIG. 9B.

Figure 13:
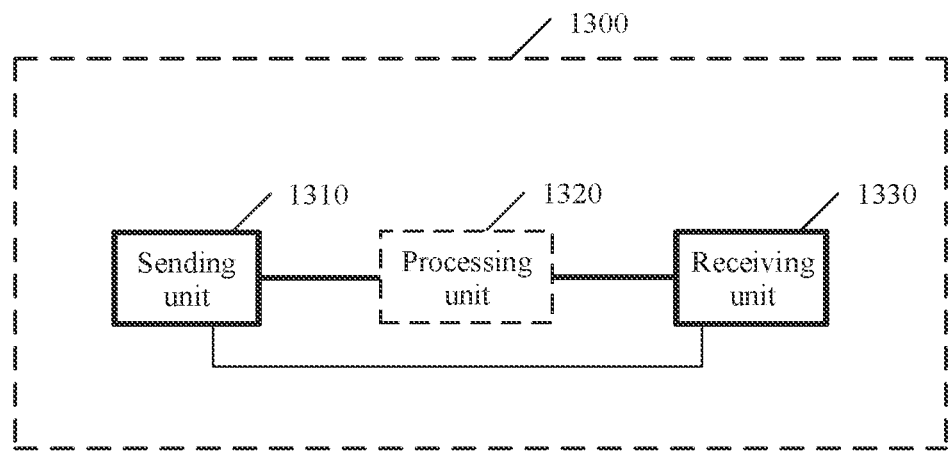
FIG. 13 is a schematic structural diagram of another AUSF according to an embodiment of this application.

Referring to FIG. 13, an embodiment of this application further provides an authentication server function AUSF 1300. The AUSF may include:

a receiving unit 1320, configured to receive a first access authentication request from an SEAF, where the first access authentication request carries a DH public parameter or a DH public parameter index, the first access authentication request further carries an encrypted identifier SUCI of UE, and the SUCI is obtained by encrypting a permanent identifier SUPI of the UE and a DH public key A; or the first access authentication request carries an SUCI of UE and a DH public key A, the first access authentication request further carries a DH public parameter or a DH public parameter index, and the SUCI is obtained by encrypting an SUPI of the UE;

a sending unit 1310, configured to send an authentication obtaining request to a user identity data storage management node, where the authentication obtaining request carries the SUCI, where the receiving unit is further configured to receive an authentication obtaining response that is used to respond to the authentication obtaining request and that is sent by the user identity data storage management node, where the authentication obtaining response carries a 5G home network authentication vector, the authentication obtaining response further carries the DH public key A and the SUPI obtained by decrypting the SUCI, and the 5G home network authentication vector includes an expected authentication result XRES* and an AUSF key $K_{AUSF}$; and a processing unit 1330, configured to: calculate a DH public key B based on the DH public parameter, derive a DH symmetric key K Du based on the DH public key A and the DH public key B, and derive an SEAF key $K_{SEAF}$ based on the DH symmetric key $K_{DH}$ and the AUSF key $K_{AUSF}$, where the processing unit is further configured to calculate a 5G authentication vector based on the 5G home network authentication vector, where the 5G authentication vector includes a hashed expected authentication result HXRES*, and the HXRES* is derived based on the XRES*;

the sending unit is further configured to send, to the SEAF, a first access authentication response used to respond to the first access authentication request, where the first access authentication response carries the 5G authentication vector and the DH public key A;

the receiving unit is further configured to receive a second access authentication request from the SEAF, where the second access authentication request carries a DH public key B and an authentication result RES* that is from the UE;

the processing unit is further configured to: when the RES* is consistent with the XRES* included in the 5G home network authentication vector, determine that access authentication performed by the AUSF on the UE, succeeds; and when the DH public key B carried in the second access authentication request is the same as the DH public key B carried in the first access authentication response, determine that DH key agreement fails; or when the DH public key B carried in the second access authentication request is different from the DH public key B carried in the first access authentication response, determine that DH key agreement fails; and the AUSF sends, to the SEAF, a second access authentication response used to respond to the second access authentication request, where the second access authentication response is used to indicate a result of the access authentication performed by the AUSF on the UE.

The units in the AUSF 1300 may cooperate to complete, for example, some or all of the steps completed by the AUSF in the procedures corresponding to FIG. 1-C to FIG. 9B.

Figure 14:
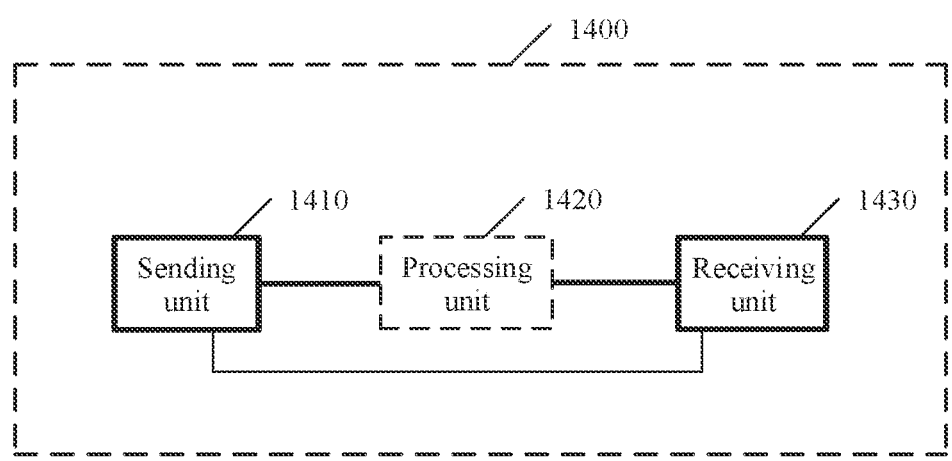
FIG. 14 is a schematic structural diagram of another user equipment according to an embodiment of this application.

Referring to FIG. 14, an embodiment of this application further provides user equipment UE 1400. The UE includes:

a sending unit 1410, configured to send an N1 message to an SEAF, where the N1 message carries an encrypted identifier SUCI of the UE, and the SUCI is obtained based on a permanent identifier SUPI of the UE;

a receiving unit 1420, configured to receive an authentication request that carries a random number and a DH public key A and that is sent by the SEAF; and a processing unit 1430, configured to: derive a DH public key B based on a DH public parameter and a DH private key b; derive a DH symmetric key Km based on the DH public key A and the DH public key B; calculate an authentication result RES* and an AUSF key $K_{AUSF}$ based on a root key K and the random number; and derive an SEAF key $K_{SEAF}$ based on $K_{DH}$ and the AUSF key $K_{AUSF}$, where the sending unit is further configured to send, to the SEAF, an authentication response used to respond to the authentication request, where the authentication response carries the authentication result RES* calculated based on the root key K and the random number.

In some possible implementations, that the processing unit derives the SEAF key $K_{SEAF}$ based on $K_{DH}$ and the AUSF key $K_{AUSF}$ includes: deriving an SEAF key $K_{\_SEAF}$ based on $K_{DH}$ and the AUSF key $K_{AUSF}$; and deriving the SEAF key $K_{SEAF}$ based on $K_{DH}$ and $K_{\_SEAF}$, where the authentication response further carries the DH public key B encrypted by using the SEAF key $K_{\_SEAF}$.

The units in the UE 1400 may cooperate to complete, for example, some or all of the steps completed by the UE in the procedures corresponding to FIG. 1-C to FIG. 9B.

Figure 15:
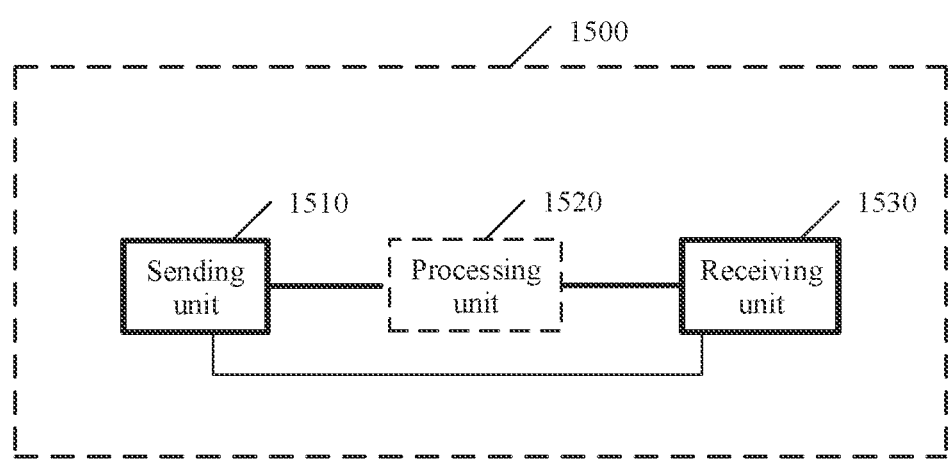
FIG. 15 is a schematic structural diagram of another SEAF according to an embodiment of this application.

Referring to FIG. 15, an embodiment of this application further provides an SEAF 1500, The SEAF may include:

a receiving unit 1520, configured to receive an N1 message from UE, where the N1 message carries an encrypted identifier SUCI of the UE, and the SUCI is obtained by encrypting a permanent identifier SUPI of the UE;

a sending unit 1510, configured to send, to an AUSF, a first access authentication request carrying the SUCI, where the receiving unit is further configured to receive a first access authentication response that is used to respond to the first access authentication request and that is sent by the AUSF, where the first access authentication response carries a 5G authentication vector, a DH public key A, and the SUPI, the 5G authentication vector includes a hashed expected authentication result HXRES*, and the HXRES* is derived based on an XRES* and the DH public key A;

the sending unit is further configured to send, to the UE, an authentication request carrying a random number RAND; and the receiving unit is further configured to receive, from the UE, an authentication response used to respond to the authentication request, where the authentication response carries an authentication result RES* calculated based on a root key K and the random number RAND; and a processing unit 1530, configured to: calculate a hashed authentication result HRES* based on the DH public key A and the RES*; and when the HRES* is the same as the HXRES* included in the 5G authentication vector, determine that DH agreement succeeds and access authentication performed by the SEAF on the UE succeeds; or when the HXRES* is different from the HRES*, determine that DH agreement fails and access authentication performed by the SEAF on the UE fails, where the sending unit is further configured to send a second access authentication request to the AUSF, where the second access authentication request carries the authentication result RES*; and the receiving unit is further configured to receive a second access authentication response sent by the AUSF, where the second access authentication response is used to respond to the second access authentication request, and the second access authentication response is used to indicate a result of access authentication performed by the AUSF on the UE based on the RES*.

In some possible implementations, the authentication response further carries a DH public key B encrypted by using $K_{-SEAF}$; and the second access authentication request further carries the decrypted DH public key B.

The units in the SEAF 1500 may cooperate to complete, for example, some or all of the steps completed by the SEAF in the procedures corresponding to FIG. 1-C to FIG. 9B.

Figure 16:
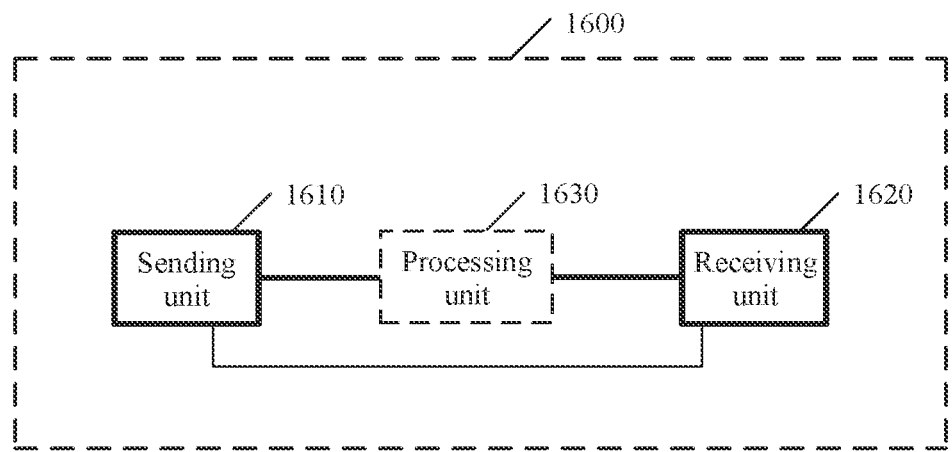
FIG. 16 is a schematic structural diagram of another AUSF according to an embodiment of this application.

Referring to FIG. 16, an embodiment of this application further provides an AUSF 1600. The AUSF may include:

a receiving unit 1620, configured to receive a first access authentication request from an SEAF, where the first access authentication request carries an encrypted identifier SUCI of UE, and the SUCI is obtained by encrypting a permanent identifier SUPI of the UE;

a sending unit 1610, configured to send an authentication obtaining request to a user identity data storage management node, where the authentication obtaining request carries the SUCI, where the receiving unit is further configured to receive an authentication obtaining response that is used to respond to the authentication obtaining request and that is sent by the user identity data storage management node, where the authentication obtaining response carries a 5G home network authentication vector, the authentication obtaining response further carries a DH public key A and the SUPI obtained by decrypting the SUCI, and the 5G home network authentication vector includes an expected authentication result XRES*; and a processing unit 1630, configured to: calculate the DH public key A based on a DH public parameter; and calculate a 5G authentication vector based on the 5G home network authentication vector, where the 5G authentication vector includes a hashed expected authentication result HXRES*, and the HXRES* is derived based on the XRES* and the DH public key A, where the sending unit is further configured to send, to the SEAF, a first access authentication response used to respond to the first access authentication request, where the first access authentication response carries the 5G authentication vector and the DH public key A;

the receiving unit is further configured to receive a second access authentication request from the SEAF, where the second access authentication request carries an authentication result RES* that is from the UE; and when the RES* is consistent with the XRES* included in the 5G home network authentication vector, it is determined that access authentication performed by the AUSF on the UE succeeds; and the sending unit is further configured to send, to the SEAF, a second access authentication response used to respond to the second access authentication request, where the second access authentication response is used to indicate a result of the access authentication performed by the AUSF on the UE.

In some possible implementations, the 5G home network authentication vector further includes an AUSF key $K_{AUSF}$, and the second access authentication request further carries a DH public key B; and the processing unit 1630 is further configured to: derive a DH symmetric key $K_{DH}$ based on the DH public key B; and derive an SEAF key $K_{SEAF}$ based on the symmetric key $K_{DH}$ and the AUSF key $K_{AUSF}$.

The units in the SEAF 1600 may cooperate to complete, for example, some or all of the steps completed by the SEAF in the procedures corresponding to FIG. 1-C to FIG. 9B.

Figure 17:
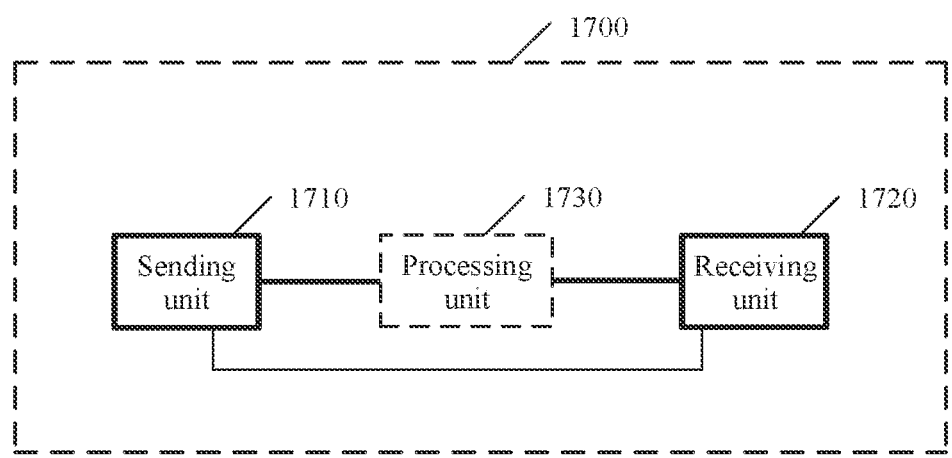
FIG. 17 is a schematic structural diagram of another SEAF according to an embodiment of this application.

Referring to FIG. 17, an embodiment of this application further provides an SEAF 1700. The SEAF includes: a receiving unit 1720, configured to receive an N1 message from UE, where the N1 message carries an encrypted identifier SUCI of the UE, and the SUCI is obtained by encrypting a permanent identifier SUPI of the UE;

a sending unit 1710, configured to send, to an AUSF, a first access authentication request carrying the SUCI, where the receiving unit is further configured to receive a first access authentication response that is used to respond to the first access authentication request and that is sent by the AUSF, where the first access authentication response carries a 5G authentication vector, a DH public key A, and the SUPI, the 5G authentication vector includes a hashed expected authentication result HXRES*, and the HXRES* is derived based on an XRES*;

the sending unit is further configured to send, to the UE, an authentication request carrying a random number RAND; and the receiving unit is further configured to receive, from the UE, an authentication response used to respond to the authentication request, where the authentication response carries an authentication result RES* calculated based on a root key K and the random number RAND; and a processing unit 1730, configured to: calculate a hashed authentication result HRES* based on the DH public key A and the RES*; and when the HRES* is the same as the HXRES* included in the 5G authentication vector, determine that access authentication performed by the SEAF on the UE succeeds; or when the HRES* is different from the HXRES* included in the 5G authentication vector, determine that access authentication performed by the SEAF on the UE fails, where the sending unit is further configured to send a second access authentication request to the AUSF, where the second access authentication request carries the authentication result RES*; and the receiving unit is further configured to receive a second access authentication response sent by the AUSF, where the second access authentication response is used to respond to the second access authentication request, and the second access authentication response is used to indicate a result of access authentication performed by the AUSF on the UE based on the RES*.

In some possible implementations, the authentication response further carries a DH public key B encrypted by using $K_{-SEAF}$; and the second access authentication request further carries the decrypted DH public key B.

The units in the SEAF 1700 may cooperate to complete, for example, some or all of the steps completed by the SEAF in the procedures corresponding to FIG. 1-C to FIG. 9B.

Figure 18:
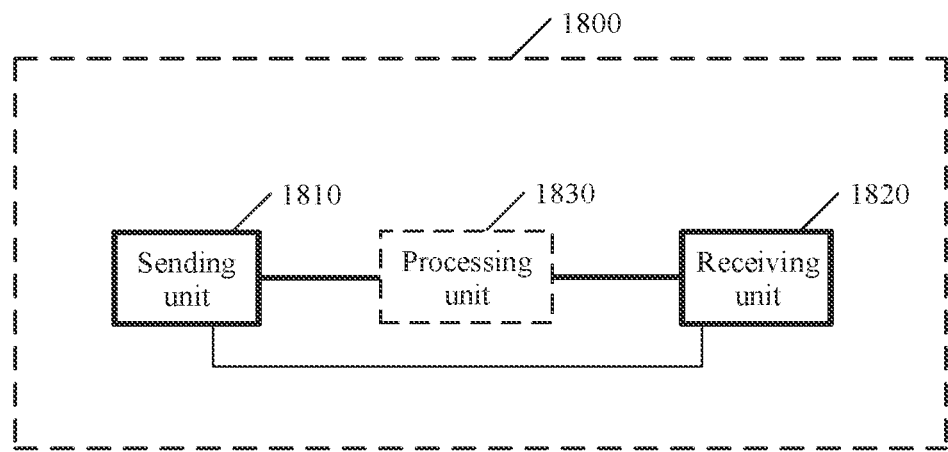
FIG. 18 is a schematic structural diagram of another AUSF according to an embodiment of this application.

Referring to FIG. 18, an embodiment of this application further provides an AUSF 1800. The AUSF includes:

a receiving unit 1820, configured to receive a first access authentication request from an SEAF, where the first access authentication request canes an encrypted identifier SUCI or a permanent identifier SUPI of UE, and the SUCI is obtained by encrypting the SUPI;

a sending unit 1810, configured to send an authentication obtaining request to a user identity data storage management node, where the authentication obtaining request carries the SUCI or the SUPI, where the receiving unit is further configured to receive an authentication obtaining response that is used to respond to the authentication obtaining request and that is sent by the user identity data storage management node, where the authentication obtaining response carries a 5G home network authentication vector, the authentication obtaining response further carries a DH public key A, and the 5G home network authentication vector includes an expected authentication result XRES*; and a processing unit 1830, configured to: calculate the DH public key A based on a DH public parameter; and calculate a 5G authentication vector based on the 5G home network authentication vector, where the 5G authentication vector includes a hashed expected authentication result HXRES*, and the HXRES* is derived based on the XRES*, where the sending unit is further configured to send, to the SEAF, a first access authentication response used to respond to the first access authentication request, where the first access authentication response carries the 5G authentication vector and the DH public key A;

the receiving unit is further configured to receive a second access authentication request from the SEAF, where the second access authentication request carries a DH public key A and an authentication result RES* that is from the UE;

the processing unit is further configured to: when the RES* is consistent with the XRES* included in the 5G home network authentication vector, determine that access authentication performed by the AUSF on the UE succeeds; or when the RES* is inconsistent with the XRES* included in the 5G home network authentication vector, determine that access authentication performed by the AUSF on the UE fails; and when the DH public key A carried in the second access authentication request is the same as the DH public key A carried in the first access authentication response, determine that DH key agreement fails; or when the DH public key A carried in the second access authentication request is different from the DH public key A carried in the first access authentication response, determine that DH key agreement fails; and the sending unit is further configured to send, to the SEAF, a second access authentication response used to respond to the second access authentication request, where the second access authentication response is used to indicate a result of the access authentication performed by the AUSF on the UE.

In some possible implementations, the 5G home network authentication vector further includes an AUSF key $K_{AUSF}$, and the second access authentication request further carries a DH public key B; and the processing unit 1830 is further configured to: derive a DH symmetric key $K_{DH}$ based on the DH public key B; and derive an SEAF key $K_{SEAF}$ based on the symmetric key $K_{DH}$, and the AUSF key $K_{AUSF}$.

The units in the AUSF 1800 may cooperate to complete, for example, some or all of the steps completed by the AUSF in the procedures corresponding to FIG. 1-C to FIG. 9B.

Figure 19:
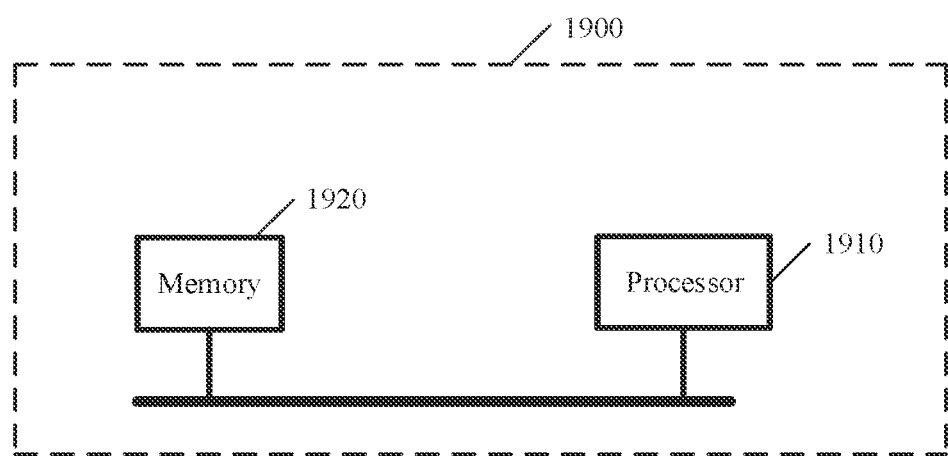
FIG. 19 is a schematic structural diagram of a communication apparatus according to an embodiment of this application.

Referring to FIG. 19, an embodiment of this application further provides a communication apparatus 1900. The communication apparatus includes a processor 1910 and a memory 1920 that are coupled to each other; and the processor is configured to invoke a program stored in the memory, to complete some or all steps of any method performed by any device provided in the embodiments of this application.

Specifically, when the processor performs some or all of the steps performed by the UE in the foregoing method embodiments, the communication apparatus 1900 is UE. When the processor performs some or all of the steps performed by the SEAF in the foregoing method embodiments, the communication apparatus 1900 is an SEAF. When the processor performs some or all of the steps performed by the AUSF in the foregoing method embodiments, the communication apparatus 1900 is an AUSF. The rest may be deduced by analogy.

In some solutions of the foregoing embodiments of the present invention, a DH parameter on a UE side is protected by using an SEPI protection method. That is, the DH parameter (for example, a DH public key A) is embedded into generation of an SUCI. In addition, a DH parameter on a network side is embedded into generation processes of an HXRES and an HRES, and whether the DH parameter on the network side is tampered with is determined by comparing the HRES and the HXRES. A DH key agreement process is combined with a 5G-AKA authentication process. This helps implement forward secrecy and effectively avoid eavesdropping on an air interface. In addition, through protection of the DH exchange parameter, malicious tampering from a third party is avoided, and a problem that agreements keys of UE and an AUSF may be inconsistent although authentication between the UE and the AUSF succeeds is resolved.

An embodiment of this application further provides a computer-readable storage medium. The computer-readable storage medium stores a computer program. The computer program is executed by related hardware, to complete and perform any light source evaluation method provided in the embodiments of the present invention. In addition, an embodiment of this application further provides a computer-readable storage medium. The computer-readable storage medium stores a computer program. The computer program is executed by related hardware, to complete and perform any method provided in the embodiments of the present invention.

An embodiment of this application further provides a computer program product. When the computer program product runs on a computer, the computer is enabled to perform any light source evaluation method provided in the embodiments of the present invention. In addition, an embodiment of this application further provides a computer program product. When the computer program product runs on a computer, the computer is enabled to perform any method provided in the embodiments of the present invention.

In the foregoing embodiments, descriptions of the embodiments have respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described sequence of the actions, because according to this application, some steps may be performed in another sequence or simultaneously. It should be further appreciated by persons skilled in the art that the embodiments described in this specification all belong to optional embodiments, and the involved actions and modules are not necessarily required by this application.

In the several embodiments provided in this application, it should be understood that the disclosed apparatus may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a storage medium accessible to a computer. Based on such an understanding, the technical solutions of this application essentially, or the part contributing to the conventional technology, or all or some of the technical solutions may be implemented in a form of a software product. The computer software product is stored in a computer-readable storage medium and includes several instructions for instructing a computer device (which may be a personal computer, a server, a network device, or the like, and may be specifically a processor in the computer device) to perform all or some of the steps of the methods in the embodiments of this application. The storage medium may include any medium that can store program code, such as a USB flash drive, a removable hard disk, a magnetic disk, an optical disc, a read-only memory (ROM), or a random access memory (RAM).

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A communication method, comprising:
sending, by user equipment (UE), an N1 message to a security anchor function (SEAF), wherein:
the N1 message carries a Diffie-Hellman (DH) public parameter or a DH public parameter index, the N1 message further carries an encrypted identifier of the UE, and the encrypted identifier is obtained by encrypting a permanent identifier of the UE and a first DH public key;
receiving, by the UE, an authentication request that carries a random number and that is sent by the SEAF, wherein the authentication request carries a second DH public key;
sending, by the UE to the SEAF, an authentication response used to respond to the authentication request, wherein the authentication response carries an authentication result calculated based on a root key and the random number;
deriving, by the UE, a DH symmetric key based on the DH public parameter and the second DH public key; and
deriving, by the UE, an SEAF key based on the DH symmetric key and an authentication server function (AUSF) key, wherein the AUSF key is calculated based on the root key and the random number.

2. A communication method, comprising: receiving, by a security anchor function (SEAF), an N1 message from UE, wherein:
the N1 message carries an encrypted identifier of the UE, the N1 message further carries a Diffie-Hellman (DH) public parameter or a DH public parameter index, and the encrypted identifier is obtained by encrypting a permanent identifier of the UE and a first DH public key; and sending, by the SEAF, a first access authentication request to an authentication server function (AUSF), wherein the first access authentication request carries the DH public parameter or the DH public parameter index, and wherein the first access authentication request further caries the encrypted identifier;
receiving, by the SEAF, a first access authentication response that is used to respond to the first access authentication request and that is sent by the AUSF, wherein the first access authentication response carries a 5G authentication vector and the permanent identifier of the UE, the 5G authentication vector comprises a hashed expected authentication result, and the hashed expected authentication result is derived based on an expected authentication result, the first DH public key, and a second DH public key;
sending, by the SEAF to the UE, an authentication request carrying a random number; and
receiving, by the SEAF from the UE, an authentication response used to respond to the authentication request, wherein the authentication response carries an authentication result calculated based on a root key and the random number.

3. The method according to claim 2, wherein the method further comprises:
calculating, by the SEAF, a hashed authentication result based on the first DH public key, the second DH public key, and the authentication result;
when the hashed authentication result is the same as the hashed expected authentication result comprised in the 5G authentication vector, determining that DH agreement succeeds and access authentication performed by the SEAF on the UE succeeds;
or when the hashed expected authentication result is different from the hashed authentication result, determining that DH agreement fails and access authentication performed by the SEAF on the UE fails;
sending, by the SEAF, a second access authentication request to the AUSF, wherein the second access authentication request carries the authentication result; and
receiving, by the SEAF, a second access authentication response sent by the AUSF, wherein the second access authentication response is used to respond to the second access authentication request, and the second access authentication response is used to indicate a result of access authentication performed by the AUSF on the UE based on the authentication result.

4. The method according to claim 2, wherein the method further comprises:
sending, by the SEAF to the UE, an authentication request carrying a random number;
calculating, by the SEAF, a hashed authentication result based on the authentication result;
when the hashed authentication result is the same as the hashed expected authentication result comprised in the 5G authentication vector, determining that access authentication performed by the SEAF on the UE succeeds;
or when the hashed expected authentication result is different from the hashed authentication result, determining that access authentication performed by the SEAF on the UE fails;
sending, by the SEAF, a second access authentication request to the AUSF, wherein the second access authentication request carries the authentication result; and
receiving, by the SEAF, a second access authentication response sent by the AUSF, wherein the second access authentication response is used to respond to the second access authentication request, and the second access authentication response is used to indicate a result of access authentication performed by the AUSF on the UE based on the authentication result.

5. User equipment (UE), comprising:
at least one processor; and
one or more memories coupled to the at least one processor and storing programming instructions for execution by the at least one processor to:
send an N1 message to a security anchor function (SEAF), wherein:
the N1 message carries a Diffie-Hellman (DH) public parameter or a DH public parameter index, the N1 message further carries an encrypted identifier of the UE, and the encrypted identifier is obtained by encrypting a permanent identifier of the UE and a first DH public key;
receive an authentication request that carries a random number and that is sent by the SEAF, wherein the authentication request carries a second DH public key;
send, to the SEAF, an authentication response used to respond to the authentication request, wherein the authentication response carries an authentication result calculated based on a root key and the random number; and
derive a DH symmetric key based on the DH public parameter and the second DH public key, wherein the UE derives an SEAF key based on the DH symmetric key and an authentication server function (AUSF) key, and the AUSF key is calculated based on the root key and the random number.

* * * * *